(12) United States Patent
Muradore et al.

(10) Patent No.: US 9,547,183 B2
(45) Date of Patent: *Jan. 17, 2017

(54) METHOD FOR DETERMINING AN OPHTHALMIC LENS

(71) Applicant: ESSILOR INTERNATIONAL (COMPAGNIE GENERALE D'OPTIQUE), Charenton le Pont (FR)

(72) Inventors: Fabien Muradore, Charenton le Pont (FR); Hélène De Rossi, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 183 days.

This patent is subject to a terminal disclaimer.

(21) Appl. No.: 14/358,952

(22) PCT Filed: Nov. 15, 2012

(86) PCT No.: PCT/EP2012/072679
§ 371 (c)(1),
(2) Date: May 16, 2014

(87) PCT Pub. No.: WO2013/072396
PCT Pub. Date: May 23, 2013

(65) Prior Publication Data
US 2014/0293216 A1    Oct. 2, 2014

(30) Foreign Application Priority Data

Nov. 16, 2011 (EP) ..................... 11306501

(51) Int. Cl.
G02C 7/06    (2006.01)
G02C 7/02    (2006.01)

(52) U.S. Cl.
CPC ............ *G02C 7/066* (2013.01); *G02C 7/027* (2013.01); *G02C 7/028* (2013.01); *G02C 7/061* (2013.01)

(58) Field of Classification Search
CPC .......................................... G02C 7/024–7/028
(Continued)

(56) References Cited

U.S. PATENT DOCUMENTS 5,270,746 A    12/1993    Kato
6,318,859 B1   11/2001    Baudart
(Continued)

FOREIGN PATENT DOCUMENTS

DE    42 42 267    6/1994
EP    0461624      12/1991
(Continued)

OTHER PUBLICATIONS

Sheedy, James E. and Darryl Meister; Introduction to Ophthalmic Optics. San Diego: Carl Zeiss Vision, 2008. p. 29. Print.*
(Continued)

*Primary Examiner* — Zachary Wilkes
(74) *Attorney, Agent, or Firm* — Cozen O'Connor

(57) ABSTRACT

The invention relates to a method for determining an ophthalmic lens wherein: a first and a second reference axes are determined, the first reference axis is comprised between $[\gamma_T-20°, \gamma_T+20°]$ with $\gamma_T$ being the mean axis of astigmatism over a first temporal portion, and the second reference axis is comprised between $[\gamma_N-20°, \gamma_N+20°]$ with $\gamma_N$ being the mean axis of astigmatism over a second nasal portion; a combined reference axis is determined as a linear combination of the first and second reference axes; over the first portion, the sphere value along the combined reference axis is greater than the sphere value along a perpendicular axis to the combined reference axis; and over the second portion,
(Continued)

the sphere value along the combined reference axis is greater than the sphere value along a perpendicular axis to the combined reference axis.

18 Claims, 36 Drawing Sheets

(58) Field of Classification Search
USPC .............. 351/159.41–159.42, 159.74–159.77
See application file for complete search history.

(56) References Cited

U.S. PATENT DOCUMENTS

| 6,382,789 | B1 | 5/2002 | Baudart | |
|---|---|---|---|---|
| 7,210,780 | B1 | 5/2007 | Bourdoncle et al. | |
| 7,249,850 | B2* | 7/2007 | Donetti | G02C 7/025 |
| | | | | 351/159.52 |
| 8,434,025 | B2* | 4/2013 | Fisher | G02C 7/024 |
| | | | | 351/159.74 |
| 8,523,633 | B2* | 9/2013 | Schneider | B24B 13/00 |
| | | | | 351/159.01 |
| 2007/0035696 | A1 | 2/2007 | Altheimer et al. | |
| 2012/0016644 | A1 | 1/2012 | DeRossi | |
| 2013/0335699 | A1* | 12/2013 | De Rossi | G02C 7/025 |
| | | | | 351/159.42 |

FOREIGN PATENT DOCUMENTS

| EP | 0990939 | 4/2000 |
|---|---|---|
| EP | 2207118 | 7/2010 |
| WO | WO 98-12590 | 3/1998 |

OTHER PUBLICATIONS

G.H. Guilino, "Design Philosophy for Progressive Addition Lenses", Applied Optics, Optical Society of America, Washington, DC, vol. 32, No. 1, pp. 111-117, Jan. 1, 1993, XP000331309.

B.Bourdoncle et al., "Ray Tracing Through Progressive Ophthalmic Lenses", 1990 International Lens Design Conference, D.T.Moore ed., Proc. Soc. Photo. Opt. Instrum. Eng.

Y.LeGrand, "La Distortion En Optique De Lunetterie", Annales d'Optique Oculaire $5^{ADDAC;Ageme}$ année No. 1, Jan. 1956.

* cited by examiner

METHOD FOR DETERMINING AN OPHTHALMIC LENS

RELATED APPLICATIONS

This is a U.S. National Stage of International Application No. PCT/EP2012/072679 filed on Nov. 15, 2012, and claims the priority of European Application No. 11306501 filed on Nov. 16, 2011, the disclosure contents of which is hereby incorporated herein by reference.

FIELD OF THE INVENTION

The invention relates to a method for determining an ophthalmic lens, notably a progressive ophthalmic lens. The invention further relates to an ophthalmic lens, a method for manufacturing a pair of ophthalmic lens, a set of apparatuses for manufacturing a pair of ophthalmic lenses, a set of data, a computer program product and a computer readable medium associated to this method. The invention also relates to a semi-finished lens blank and to a method for manufacturing such a blank.

BACKGROUND OF THE INVENTION

A wearer may be prescribed a positive or negative optical power correction. For presbyopic wearers, the value of the power correction is different for far vision and near vision, due to the difficulties of accommodation in near vision. The prescription thus comprises a far-vision power value and an addition representing the power increment between far vision and near vision. The addition is qualified as pre-scribed addition. Ophthalmic lenses suitable for presbyopic wearers are multifocal lenses, the most suitable being progressive multifocal lenses.

The ophthalmic prescription can include a prescribed astigmatism. Such a prescription is produced by the ophthalmologist in the form of a pair formed by an axis value (in degrees) and an amplitude value (in diopters). The amplitude value represents the difference between minimal and maximal power in a given direction which enables to correct the visual defect of a wearer. According to the chosen convention, the axis represents the orientation of one of two powers with relation to a reference axis and in the sense of rotation chosen. Usually, the TABO convention is used. In this convention, the reference axis is horizontal and the sense of rotation is anticlockwise for each eye, when looking to the wearer. An axis value of +45° therefore represents an axis oriented obliquely, which when looking to the wearer, extends from the quadrant located up on the right to the quadrant located down on the left. Such an astigmatism prescription is measured on the wearer looking in far vision. The term <<astigmatism>> is used to designate the pair (amplitude, angle); despite this use not being strictly correct, this term is also used to refer to the amplitude of the astigmatism. The person skilled in the art can understand from the context which meaning is to be considered. It is also known for the person skilled in the art that the prescribed power and astigmatism of a wearer are usually called sphere SPH, cylinder CYL and axis. FIG. 1 is a schematic illustration of the prescription expressed in TABO referential desired for the left eye of a wearer. The axis of the prescription (65° here) gives the direction of the smallest power which is, in this case, 3.50 δ whereas the highest power is along the direction which is perpendicular to the axis of the prescription and its value corresponds to +3.50 δ+0.25 δ=3.75 δ. The mean power (also called the mean sphere SM) is the arithmetical average of the smallest power and the highest power and is equal to 3.625 δ.

As explained above, the most suitable lenses for presbyopic wearers are progressive multifocal lenses. However, such lenses induce optical defects that must be minimised in order to satisfy the wearer. When an image perceived by a wearer is formed through a lens, several phenomena degrading the imaging performances of a lens occur. Power defect, astigmatism defect and high order aberrations are example of optical defects which impact the optical quality of the image, then reducing its sharpness and its contrast. The optical defects also modify the appearance of the object perceived by the wearer. Indeed, an object may appear distorted (the shape of the image is modified) and/or delocalized compared to the object.

When designing a progressive multifocal lens, it is therefore sought to reduce as much as possible the optical defects even though it is not possible to cancel them completely because of the power increment. Thus, it is also sought to spread the defects in such a way that the wearer's vision is the least affected by the remaining optical defects.

The person skilled in the art knows how to compensate for optical defects which comprise among others the power defect and astigmatism defect as described in EP-A-0,990,939, U.S. Pat. No. 5,270,746 (EP-A-0,461,624) and WO-A-98 12590. The lens designer has to handle two contradicting constraints when compensating the optical defects. On the one hand, he needs to design large central zones to provide the wearer with comfortable vision, when reading for instance. This can be done by pushing away the optical defects in lateral zones of the vision field thereby producing important gradients in the periphery of the vision field which impact dynamic vision. On the other hand, the designer needs to limit the gradients in the periphery of the vision field to improve dynamic vision; this being detrimental to the size of the central vision zone. Known methods oblige to a compromise between central and peripheral vision performances.

Moreover, the above-mentioned methods do only consider optical criteria which first of all improve or degrade the sharpness of the image perceived by the wearer. For instance, criteria of power, astigmatism and higher order of aberration are dealt with. The lens designer will make a compromise among those criteria to limit distortion of the image perceived through the lens. Thereby, the lenses are typically a compromise between sharpness and image deformation.

SUMMARY OF THE INVENTION

One object of the present invention is to alleviate at least partly the above mentioned drawbacks.

More particularly, the invention aims to improve the comfort of wearing an ophthalmic lens for the wearer for whom the lens is intended by improving the performance of the lens relative to image deformation, i.e. distortion while guaranteeing a good sharpness.

This object is achieved in accordance with one aspect of the present invention directed to a method for determining an ophthalmic lens, the lens comprising a main meridian separating the lens in a nasal area and a temporal area, the method comprising the steps of:

choosing a target optical function suited to the wearer, the target optical function defining, for each gaze direction when the lens is worn, a refractive power, a module of astigmatism and an axis of astigmatism, each gaze direction corresponding to a lowering angle and to an azimuth angle;

defining a first surface of the lens and a second surface of the lens, each surface having in each point a mean sphere value, a cylinder value and a cylinder axis, defining at least one first portion in the temporal area and at least one second portion in the nasal area;

for the first and second portions of the first surface, determining respectively a first or a second reference axes, the first reference axis being set to a value comprised between $[\gamma_T-20°, \gamma_T+20°]$ with $\gamma_T$ being the mean axis of astigmatism of the target optical function for gaze directions intersecting the first surface over the first temporal portion, and the second reference axis being set to a value comprised between $[\gamma_N-20°, \gamma_N+20°]$ with $\gamma_N$ being the mean axis of astigmatism of the target optical function for gaze directions intersecting the first surface over the second nasal portion;

determining a combined reference axis as a linear combination of the first and second reference axes: $\Gamma=\alpha_1*\Gamma_1+\alpha_2*\Gamma_2$, where $\alpha_1$ and $\alpha_2$ are weights;

modifying the first surface so that:
- over the first portion, the sphere value along the combined reference axis is greater than the sphere value along a perpendicular axis to the combined reference axis; and
- over the second portion, the sphere value along the combined reference axis is greater than the sphere value along a perpendicular axis to the combined reference axis.

According to an embodiment, the combined reference axis is determined by applying equal weights to the first and the second reference axes.

According to another embodiment, the combined reference axis is determined by applying total weight to the first reference axis.

According to another embodiment, the combined reference axis is determined by applying total weight to the second reference axis.

According to another embodiment, the first surface is modified so that the first surface is a toric surface with a cylinder axis in each point set to the combined reference axis.

According to embodiments, the mean axis of astigmatism of the target optical function is the mean axis of prescribed astigmatism or the mean axis of total astigmatism or the mean axis of residual astigmatism for gaze directions intersecting the first surface over the portion considered.

According to an embodiment, the method further comprises a step of modifying the second surface to meet the target optical function.

According to an embodiment, the first reference axis is set to the mean axis of astigmatism over the first temporal portion and wherein the second reference axis is set to the mean axis of astigmatism over the second nasal portion.

According to another embodiment, each respective reference axis is defined by optical optimization to minimize the distortion over the respective portion.

Another aspect of the invention relates to an ophthalmic lens having, when being worn and for each gaze direction, a refractive power, a module of astigmatism and an axis of astigmatism, each gaze direction corresponding to a lowering angle and to an azimuth angle, the lens comprising a first surface and a second surface, each surface having in each point a mean sphere value, a cylinder value and a cylinder axis, the cylinder axis being the axis of the maximum sphere, the lens comprising a main meridian separating the lens in a nasal area and a temporal area, wherein the first surface has:
- in at least one first portion of the temporal area, a cylinder axis being comprised between $[\gamma-20'; \gamma+20°]$; and
- in at least one second portion of the nasal area, a cylinder axis being comprised between $[\gamma-20'; \gamma+20°]$, with $\gamma$ being a weighted average value of axis of astigmatism: $\gamma=\alpha_1*\gamma_T+\alpha_2*\gamma_N$, where $\alpha_1$ and $\alpha_2$ are weights, and where $\gamma_T$ is the mean axis of astigmatism of the lens over the first portion of the temporal area and $\gamma_N$ is the mean axis of astigmatism of the lens over the second portion of the nasal area.

According to an embodiment, the weighted average value of axis of astigmatism is equal to a medium value of the mean axis of astigmatism of the lens over the first portion of the temporal area and of the mean axis of astigmatism of the lens over the second portion of the nasal area.

According to another embodiment, the weighted average value of axis of astigmatism is equal to the mean axis of astigmatism of the lens over the second portion of the nasal area.

According to another embodiment, the weighted average value of axis of astigmatism is equal to the mean axis of astigmatism of the lens over the first portion of the temporal area.

According to an embodiment, the first surface has a cylinder axis in the second portion of the nasal area equal to the cylinder axis in the first portion of the temporal area. According to an embodiment, the first surface is a toric surface.

According to embodiments, the mean axis of astigmatism is the axis of prescribed astigmatism or is the mean axis of residual astigmatism of the lens in the portions considered or is the mean axis of total astigmatism of the lens in the portions considered, the total astigmatism being the combination between the residual astigmatism and the prescribed astigmatism.

According to an embodiment, the ophthalmic lens is a progressive lens.

Another aspect of the invention relates to a computer program product comprising one or more stored sequence of instruction that is accessible to a processor and which, when executed by the processor, causes the processor to carry out the steps of the method of the invention. The invention also relates to a computer readable medium carrying out one or more sequences of instructions of the computer program product of the invention.

Another aspect of the invention relates to a set of data comprising data relating to a first surface of a lens determined according to the method of the invention.

Another aspect of the invention relates to a method for manufacturing a progressive ophthalmic lens, comprising the steps of:
providing data relative to the eyes of a wearer,
transmitting the data relative to the wearer,
determining a first surface of a lens according to the method of the invention,
transmitting data relative to the first surface,
carrying out an optical optimization of the lens based on the transmitted data relative to the first surface,
transmitting the result of the optical optimization,
manufacturing the progressive ophthalmic lens according to the result of the optical optimization.

Another aspect of the invention relates to a set of apparatuses for manufacturing a progressive ophthalmic lens, wherein the apparatuses are adapted to carry out steps of such method.

Another aspect of the invention relates to a method for determining a semi-finished lens blank comprising the steps of:
- defining a first surface and a second unfinished surface, the first surface having in each point a mean sphere value and a cylinder value and a cylinder axis;
- choosing target optical functions suited for a given prescription set, the target optical function defining, for each gaze direction when the lens is worn, a refractive power, a module of astigmatism and an axis of astigmatism, each gaze direction corresponding to a lowering angle and to an azimuth angle;
- defining a main meridian separating the first surface in a nasal area and a temporal area;
- defining at least one first portion in the temporal area and at least one second portion in the nasal area;
- for the first and second portions of the first surface, determining respectively a first or a second reference axes, the first reference axis being set to a value comprised between $[\gamma_T-20°, \gamma_T+20°]$ with $\gamma_T$ being the mean axis of astigmatism of the target optical function for gaze directions intersecting the first surface over the first temporal portion, and the second reference axis being set to a value comprised between $[\gamma_N-20°, \gamma_N+20°]$ with $\gamma_N$ being the mean axis of astigmatism of the target optical function for gaze directions intersecting the first surface over the second nasal portion;
- determining a combined reference axis as a linear combination of the first and second reference axes: $\Gamma=\alpha_1*\Gamma_1+\alpha_2*\Gamma_2$, where $\alpha_1$ and $\alpha_2$ are weights;
- determining the first surface so that:
  - over the first portion, the sphere value along the combined reference axis is greater than the sphere value along a perpendicular axis to the combined reference axis; and
  - over the second portion, the sphere value along the combined reference axis is greater than the sphere value along a perpendicular axis to the combined reference axis.

According to an embodiment, the combined reference axis is determined by applying equal weights to the first and the second reference axes.

According to another embodiment, the combined reference axis is determined by applying total weight to the first reference axis.

According to another embodiment, the combined reference axis is determined by applying total weight to the second reference axis.

According to an embodiment, the first surface is determined as a toric surface with a cylinder axis in each point set to the combined reference axis.

Another aspect of the invention relates to a method for manufacturing a progressive ophthalmic lens, comprising the steps of:
- providing data relative to a wearer;
- choosing a target optical function based on the data provided for the wearer, the target optical function defining, for each gaze direction when the lens is worn, a refractive power, a module of astigmatism and an axis of astigmatism, each gaze direction corresponding to a lowering angle and to an azimuth angle;
- selecting a semi-finished lens blank determined according to the method of the invention, with a first surface having a cylinder axis in each point comprised between $[\gamma_{AX\,mean}-20°; \gamma_{AX\,mean}+20]$ with $\gamma_{AX\,mean}$ being a mean value of cylinder axis over the first and the second portions in the temporal area and in the nasal area;
- determining a positioning of the semi-finished lens blank to align the mean value of cylinder axis of the front surface with the combined reference axis;
- calculating a second surface of the lens based on the chosen target optical function and on data relating to the first surface;
- placing the semi-finished lens blank on a blocker in the determined position;
- surfacing the second surface of the lens according to the result of the calculation.

Further features and advantages of the invention will appear from the following description of embodiments of the invention, given as non-limiting examples, with reference to the accompanying drawings listed hereunder.

Figure 1:
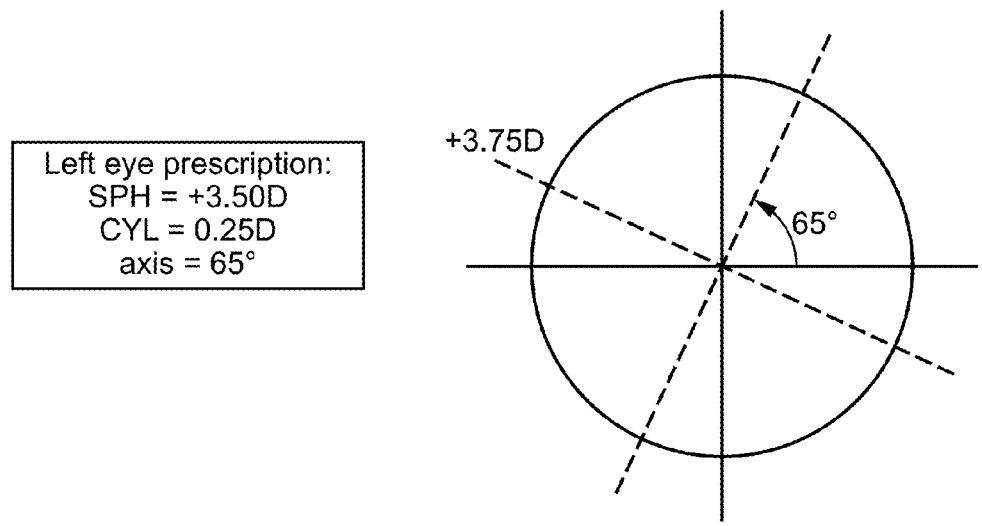
FIG. 1 shows a schematic illustration of the prescription desired for the left eye of a wearer expressed in TABO convention.

It can be appreciated that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

A method for determining an ophthalmic lens is proposed. This method enables an improved distortion without degrading the performance in term of correction of the optical power and astigmatism. This results in an increased comfort for the wearer.

A lens may comprises two non-rotationally symmetrical aspheric surfaces, for instance but not limited to, progressive surface, regressive surface, toric or atoric surfaces.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in dioptres.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in dioptres.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labeled $SPH_{min}$ and $SPH_{max}$ can be deduced according to the kind of surface considered.

When the surface considered is the object side surface, the expressions are the following:

$$SPH_{min} = (n-1) * CURV_{min} = \frac{n-1}{R_{max}}$$

and $$SPH_{max} = (n-1) * CURV_{max} = \frac{n-1}{R_{min}}$$

where n is the index of the constituent material of the lens.

If the surface considered is an eyeball side surface, the expressions are the following:

$$SPH_{min} = (1-n) * CURV_{min} = \frac{1-n}{R_{max}}$$

and $$SPH_{max} = (1-n) * CURV_{max} = \frac{1-n}{R_{min}}$$

where n is the index of the constituent material of the lens.

As it is known, a mean sphere $SPH_{mean}$ at any point on an aspherical surface can also be defined by the formula:

$$SPH_{mean} = \tfrac{1}{2}(SPH_{min} + SPH_{max})$$

The expression of the mean sphere therefore depends on the surface considered:

if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

A cylinder CYL is also defined by the formula $CYL = |SPH_{max} - SPH_{min}|$.

The characteristics of any aspherical face of the lens may be expressed by means of the local mean spheres and cylinders. A surface can be considered as locally aspherical when the cylinder is at least 0.25 diopters.

Figure 2:
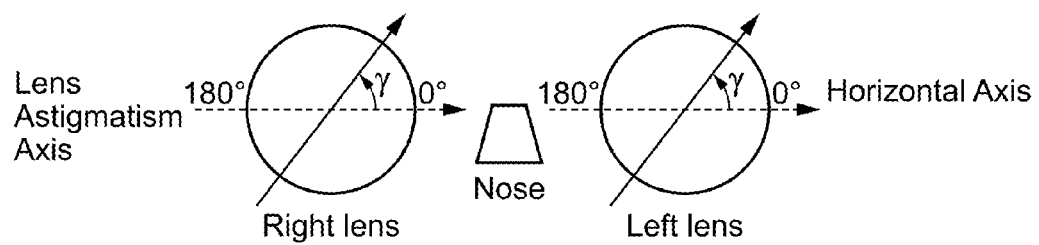
FIG. 2 illustrates the astigmatism axis γ of a lens in the TABO convention.

For an aspherical surface, a local cylinder axis $\gamma_{AX}$ may further be defined. FIG. 2 illustrates the astigmatism axis $\gamma$ as defined in the TABO convention and FIG. 3 illustrates the cylinder axis $\gamma_{AX}$ in a convention defined to characterize an aspherical surface.

The cylinder axis $\gamma_{AX}$ is the angle of the orientation of the maximum curvature $CURV_{max}$ with relation to a reference axis and in the chosen sense of rotation. In the above defined convention, the reference axis is horizontal (the angle of this reference axis is 0°) and the sense of rotation is anticlockwise for each eye, when looking to the wearer (0°≤$\gamma_{AX}$≤180°). An axis value for the cylinder axis $\gamma_{AX}$ of +45° therefore represents an axis oriented obliquely, which when looking to the wearer, extends from the quadrant located up on the right to the quadrant located down on the left.

Figure 3:
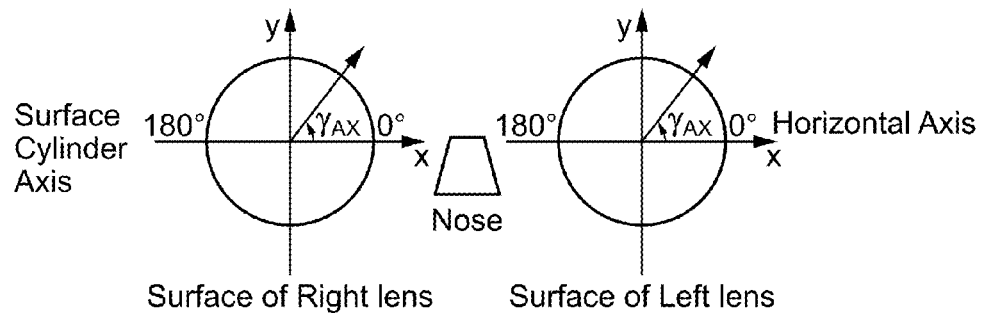
FIG. 3 illustrates the cylinder axis $\gamma_{AX}$ in a convention used to characterize an aspherical surface.
Figure 4:
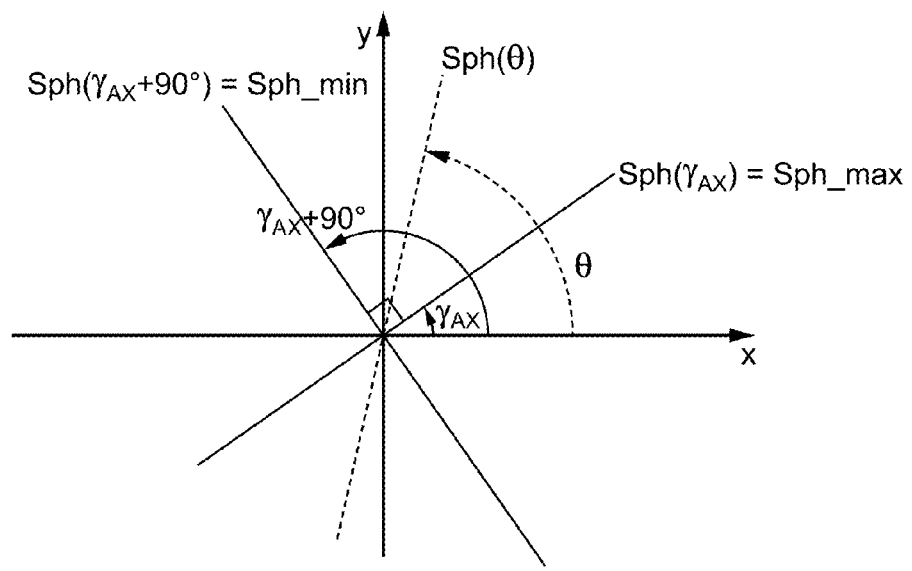
FIG. 4 illustrates the local sphere along any axis.

In addition, based on the knowledge of the value of the local cylinder axis $\gamma_{AX}$, Gauss formula enables to express the local sphere SPH along any axis θ, θ being a given angle in the referential defined in FIG. 3. The axis θ is shown in FIG. 4.

$$SPH(\theta) = SPH_{max} \cos^2(\theta - \gamma_{AX}) + SPH_{min} \sin^2(\theta - \gamma)$$

As expected, when using the Gauss formula, $SPH(\gamma_{AX}) = SPH_{max}$ and $SPH(\gamma_{AX} + 90°) = SPH_{min}$.

Figure 5:
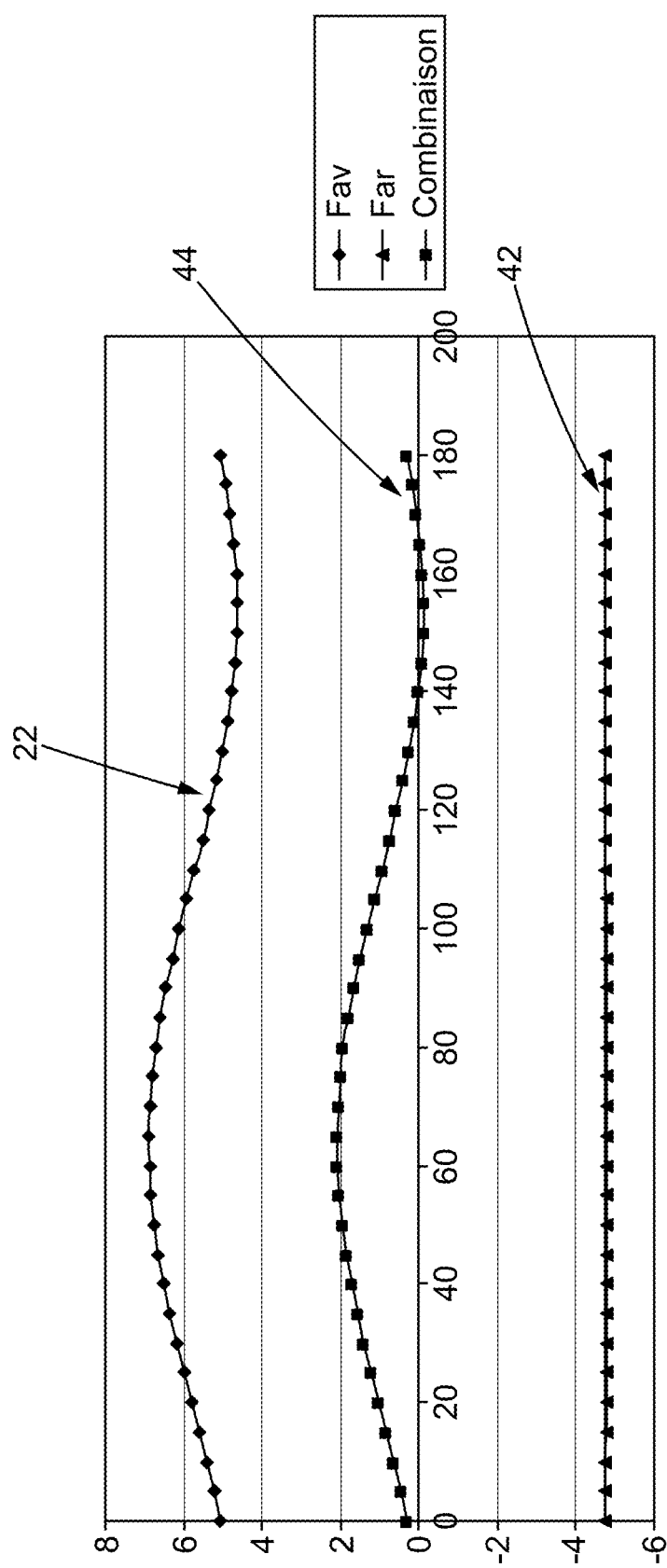
FIG. 5 is an illustration of the variation of a local sphere value in accordance with Gauss Formula.

FIG. 5 is an illustration of such variation for an example of a point of the object surface. This is the curve 22. In this particular case, the maximum sphere is 7.0 δ, the minimum sphere is 5.0 δ and $\gamma_{AX} = 65°$.

The Gauss formula can also be expressed in term of curvature so that the curvature CURV along each axis forming an angle θ with the horizontal axis by:

$$CURV(\theta) = CURV_{max} \cos^2(\theta - \gamma_{AX}) + CURV_{min} \sin^2(\theta - \gamma_{AX})$$

A surface may thus be locally defined by a triplet constituted by the maximum sphere $SPH_{max}$, the minimum sphere $SPH_{min}$ and the cylinder axis $\gamma_{AX}$. Alternatively, the triplet may be constituted by the mean sphere $SPH_{mean}$, the cylinder CYL and the cylinder axis $\gamma_{AX}$.

Figure 6:
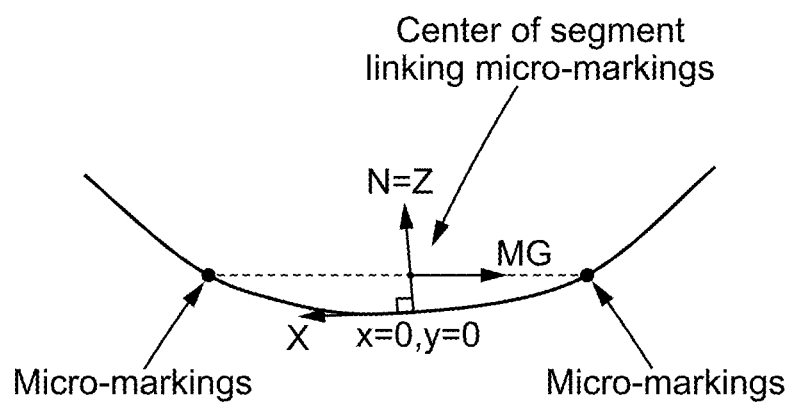
FIGS. 6 and 7 show referential defined with respect to micro-markings, for a surface bearing micro-markings and for a surface not bearing the micro-markings respectively.
Figure 7:
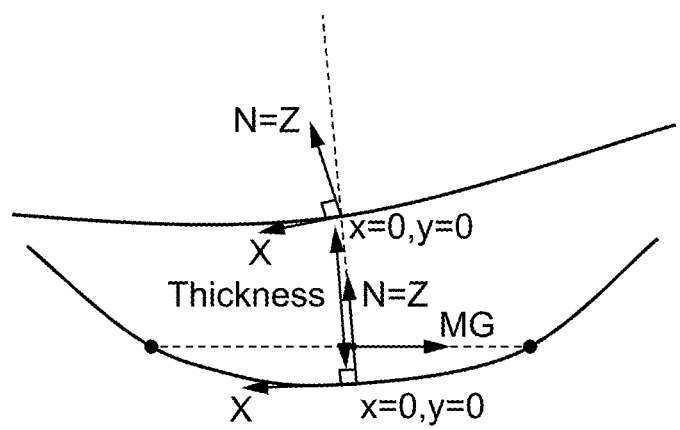

Whenever a lens is characterized by reference to one of its aspherical surfaces, a referential is defined with respect to micro-markings as illustrated in FIGS. 6 and 7, for a surface bearing micro-markings and for a surface not bearing the micro-markings respectively.

Progressive lenses comprise micro-markings that have been made mandatory by a harmonized standard ISO 8990-2. Temporary markings may also be applied on the surface of the lens, indicating positions of control points on the lens, such as a control point for far vision, a control point for near vision, a prism reference point and a fitting cross for instance. If the temporary markings are absents or have been erased, it is always possible to a skilled person to position the control points on the lens by using a mounting chart and the permanent micro-markings.

The micro-markings also make it possible to define referential for both surfaces of the lens.

FIG. 6 shows the referential for the surface bearing the micro-markings. The center of the surface (x=0, y=0) is the point of the surface at which the normal N to the surface intersect the center of the segment linking the two micro-markings. MG is the collinear unitary vector defined by the two micro-markings. Vector Z of the referential is equal to the unitary normal (Z=N); vector Y of the referential is equal to the vector product of Z by MG; vector X of the referential is equal to the vector product of Y by Z. {X, Y, Z} thereby form a direct orthonormal trihedral. The center of the referential is the center of the surface x=0 mm, y=0 mm. The X axis is the horizontal axis and the Y axis is the vertical axis as it shown in FIG. 3.

FIG. 7 shows the referential for the surface opposite to the surface bearing the micro-markings. The center of this second surface (x=0, y=0) is the point at which the normal N intersecting the center of the segment linking the two micro-markings on the first surface intersects the second surface. Referential of the second surface is constructed the same way as the referential of the first surface, i.e. vector Z is equal to the unitary normal of the second surface; vector Y is equal to the vector product of Z by MG; vector X is equal to the vector product of Y by Z. As for the first surface, the X axis is the horizontal axis and the Y axis is the vertical axis as it shown in FIG. 3. The center of the referential of the surface is also x=0 mm, y=0 mm.

Similarly, on a semi-finished lens blank, standard ISO 10322-2 requires micro-markings to be applied. The center of the aspherical surface of a semi-finished lens blank can therefore be determined as well as a referential as described above.

Moreover, a progressive multifocal lens may also be defined by optical characteristics, taking into consideration the situation of the person wearing the lenses.

Figure 8:
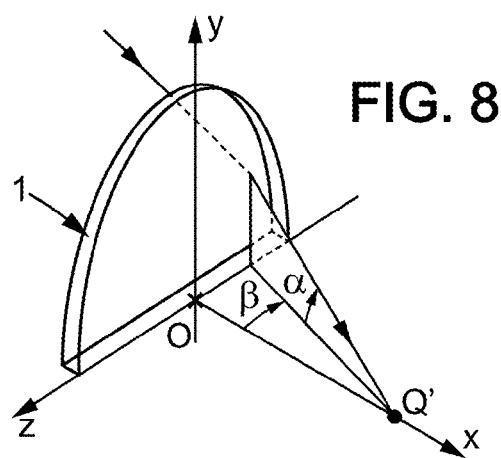
FIGS. 8 and 9 show, diagrammatically, optical systems of eye and lens.
Figure 9:
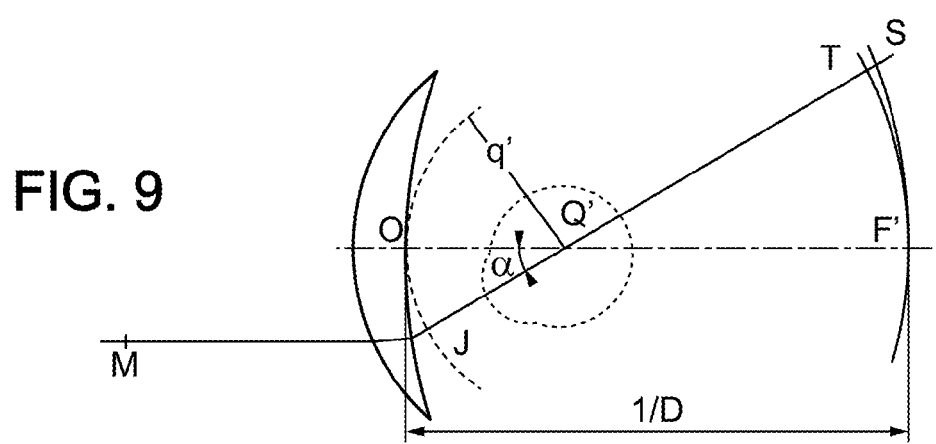

FIGS. 8 and 9 are diagrammatic illustrations of optical systems of eye and lens, thus showing the definitions used in the description. More precisely, FIG. 8 represents a perspective view of such a system illustrating parameters α and β used to define a gaze direction. FIG. 9 is a view in the vertical plane parallel to the antero-posterior axis of the wearer's head and passing through the center of rotation of the eye in the case when the parameter β is equal to 0.

The center of rotation of the eye is labeled Q'. The axis Q'F', shown on FIG. 9 in a dot-dash line, is the horizontal axis passing through the center of rotation of the eye and extending in front of the wearer—that is the axis Q'F' corresponding to the primary gaze view. This axis cuts the aspherical surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', which is tangential to the rear surface of the lens in a point of the horizontal axis. As examples, a value of radius q' of 25.5 mm corresponds to a usual value and provides satisfying results when wearing the lenses.

A given gaze direction—represented by a solid line on FIG. 8—corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 8. The angle α is the angle formed between the axis Q'J and the projection of the straight line Q'J on the horizontal plane comprising the axis Q'F'; this angle appears on the scheme on FIGS. 8 and 9. A given gaze view thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value towards the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia.

Using these elements, it is possible to define a wearer optical power and astigmatism, in each gaze direction. An object point M at an object distance given by the ergorama is considered for a gaze direction (α,β). An object proximity ProxO is defined for the point M on the corresponding light ray in the object space as the inverse of the distance MJ between point M and point J of the apex sphere:

$$ProxO=1/MJ$$

This enables to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity Prox I is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

$$Pui = ProxO + ProxI$$

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle γ. The angle γ is measured in the frame $\{Q', x_m, y_m, z_m\}$ linked to the eye. It corresponds to the angle with which the image S or T is formed depending on the convention used with relation to the direction $z_m$ in the plane $\{Q', z_m, y_m\}$.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng. Standard wearing conditions are to be understood as the position of the lens with relation to the eye of a standard wearer, notably defined by a pantoscopic angle of −8°, a lens-pupil distance of 12 mm, a pupil-eye rotation center of 13.5 mm and a wrap angle of 0°. The pantoscopic angle is the angle in the vertical plane between the optical axis of the spectacle lens and the visual axis of the eye in the primary position, usually taken to be the horizontal. The wrap angle is the angle in the horizontal plane between the optical axis of the spectacle lens and the visual axis of the eye in the primary position, usually taken to be the horizontal. Other conditions may be used. Wearing conditions may be calculated from a ray-tracing program, for a given lens. Further, the optical power and the astigmatism may be calculated so that the prescription is either fulfilled at the reference points (i.e control points in far vision) and for a wearer wearing his spectacles in the wearing conditions or measured by a frontofocometer.

Figure 10:
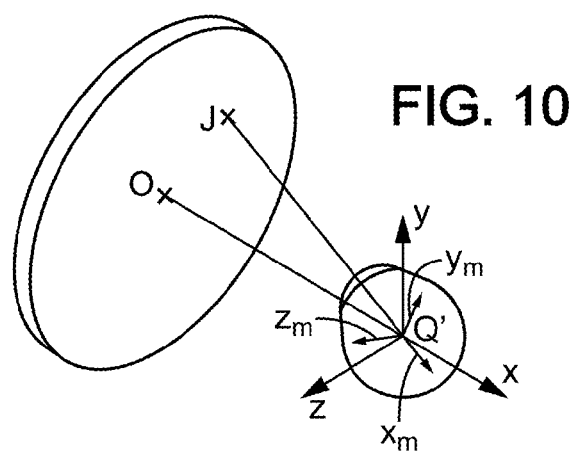
FIG. 10 shows a ray tracing from the center of rotation of the eye.

FIG. 10 represents a perspective view of a configuration wherein the parameters α and β are non zero. The effect of rotation of the eye can thus be illustrated by showing a fixed frame $\{x, y, z\}$ and a frame $\{x_m, y_m, z_m\}$ linked to the eye. Frame $\{x, y, z\}$ has its origin at the point Q'. The axis x is the axis Q'O and it is orientated from the lens towards the eye. The y axis is vertical and orientated upwardly. The z axis is such that the frame $\{x, y, z\}$ be orthonormal and direct. The frame $\{x_m, y_m, z_m\}$ is linked to the eye and its center is the point Q'. The $x_m$ axis corresponds to the gaze direction JQ'. Thus, for a primary gaze direction, the two frames $\{x, y, z\}$ and $\{x_m, y_m, z_m\}$ are the same. It is known that the properties for a lens may be expressed in several different ways and notably in surface and optically. A surface characterization is thus equivalent to an optical characterization. In the case of a blank, only a surface characterization may be used. It has to be understood that an optical characterization requires that the lens has been machined to the wearer's prescription. In contrast, in the case of an ophthalmic lens, the characterization may be of a surface or optical kind, both characterizations enabling to describe the same object from two different points of view. Whenever the characterization of the lens is of optical kind, it refers to the ergorama-eye-lens system described above. For simplicity, the term 'lens' is used in the description but it has to be understood as the 'ergorama-eye-lens system'. The value in surface terms can be expressed with relation to points. The points are located with the help of abscissa or ordinate in a frame as defined above with respect to FIGS. 3, 6 and 7.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle α of 0° and an azimuth angle β of 0° whatever surface of the lens the fitting cross is positioned—rear surface or front surface.

The above description made with reference to FIGS. 8-10 was given for central vision. In peripheral vision, as the gaze direction is fixed, the center of the pupil is considered instead of center of rotation of the eye and peripheral ray directions are considered instead of gaze directions. When peripheral vision is considered, angle α and angle β correspond to ray directions instead of gaze directions.

In the remainder of the description, terms like <<up>>, <<bottom>>, <<horizontal>>, <<vertical>>, <<above>>, <<below>>, or other words indicating relative position may be used. These terms are to be understood in the wearing conditions of the lens. Notably, the "upper" part of the lens corresponds to a negative lowering angle α<0° and the "lower" part of the lens corresponds to a positive lowering angle α>0°. Similarly, the "upper" part of the surface of a lens—or of a semi-finished lens blank—corresponds to a positive value along the y axis, and preferably to a value along the y axis greater than the y_value at the fitting cross and the "lower" part of the surface of a lens—or of a semi-finished lens blank—corresponds to a negative value along the y axis in the frame as defined above with respect to FIGS. 3, 6 and 7, and preferably to a value along the y axis inferior to the y_value at the fitting cross.

Figure 14:
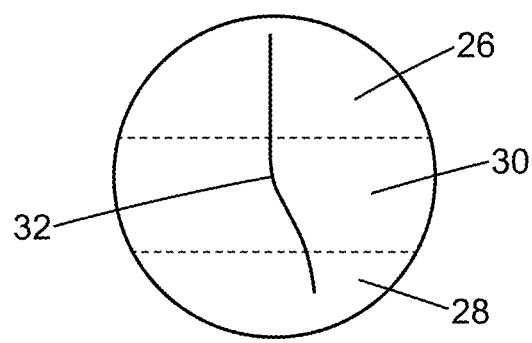
FIGS. 14 and 15 show field vision zones of a lens.
Figure 15:
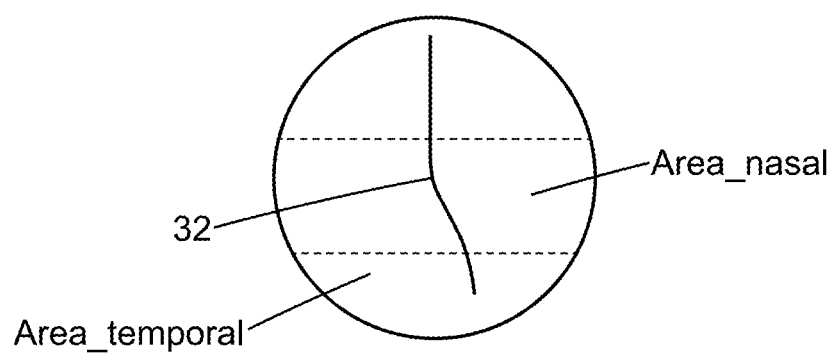

The visual field zones seen through a lens are schematically illustrated in FIGS. 14 and 15. The lens comprises a far vision zone 26 located in the upper part of the lens, a near vision zone 28 located in the lower part of the lens and an intermediate zone 30 situated in the lower part of the lens between the far vision zone 26 and the near vision zone 28. The lens also has a main meridian 32 passing through the three zones and defining a nasal side and a temporal side.

For the purpose of the invention, the meridian line 32 of a progressive lens is defined as follow: for each lowering of the view of an angle $\alpha=\alpha_1$ between the gaze direction corresponding to the fitting cross and a gaze direction being in the near vision zone, the gaze direction $(\alpha_1, \beta_1)$ is searched for which the local residual astigmatism is minimum. Thus, all the gaze directions defined in that way form the meridian line of the ergorama-eye-lens system. The meridian line of the lens represents the locus of mean gaze directions of a wearer when he is looking from far to near visions. The meridian line 32 of a surface of the lens is defined as follow: each gaze direction (α, β) belonging to the optical meridian line of the lens intersects the surface in a point (x, y). The meridian line of the surface is the set of points corresponding to the gaze directions of the meridian line of the lens.

As shown in FIG. 15, the meridian 32 separates the lens in a nasal area and a temporal area. As expected, the nasal area is the area of the lens which is between the meridian and the nose of the wearer whereas the temporal area is the area which is between the meridian and the temple of the wearer. The nasal area is labeled Area_nasal and the temporal area is labeled Area_temporal, as it will in the remainder of the description.

The invention relies on a study by the applicant of the distortion. Distortion is a defect which is not related to the resolution of images impacting the sharpness or the contrast of the image formed by the periphery of the visual field of the lens but merely to their shape. In ophthalmic optics, "barrel" distortion occurs with minus lenses whereas "pincushion" distortion occurs with plus lenses; these are inherent in the optical characteristics of simple plus or minus lenses. Distortion can be evaluated in different situations of use of the lens.

Figure 11:
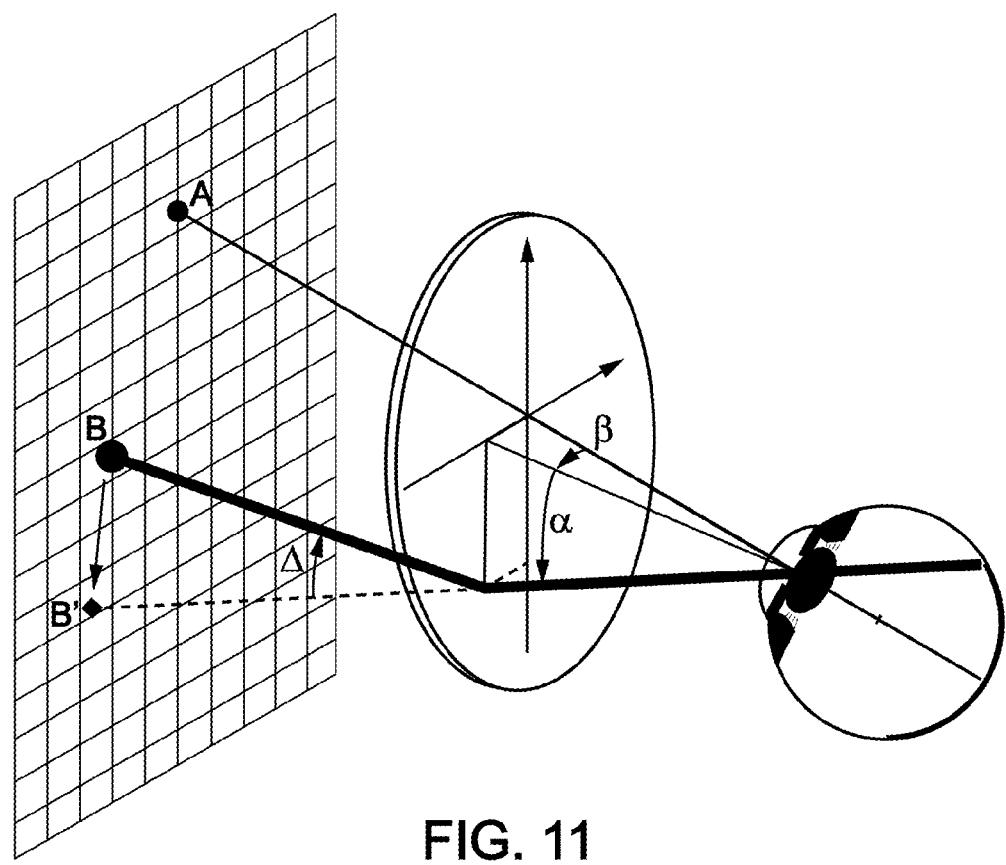
FIGS. 11, 12 and 13 show the effect of distortion in static vision and ways to quantify this phenomenon.
Figure 12:
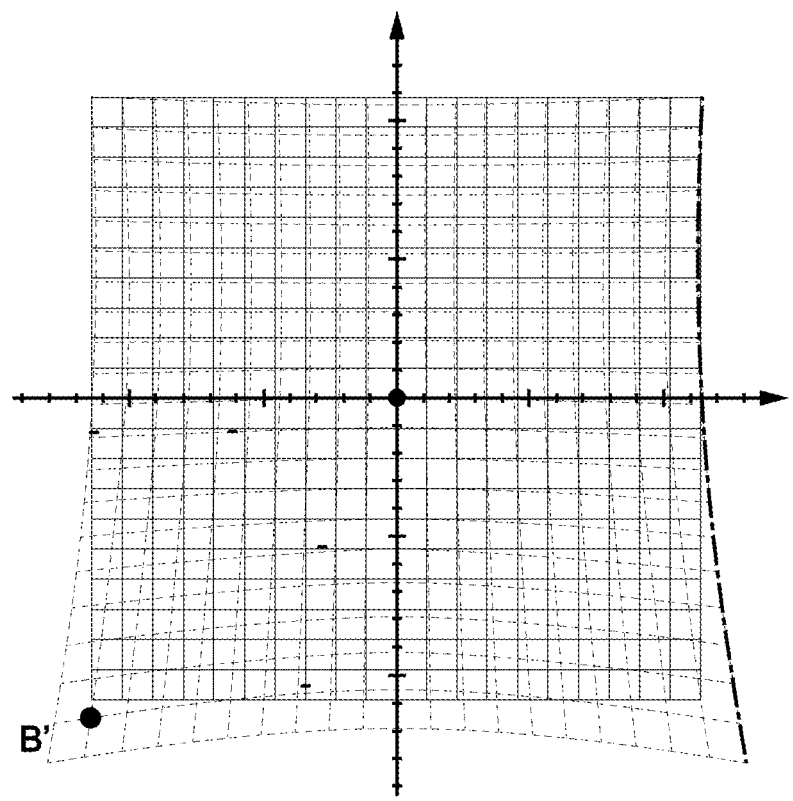
Figure 13:
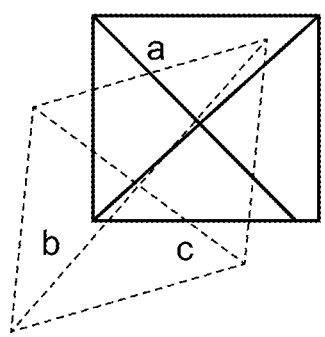

First, a fixation point is imposed to the wearer so that he keeps his eye immobile (thus the gaze direction is fixed). In this case, the distortion which is evaluated is called static distortion and it is evaluated in peripheral vision (named also indirect vision). FIG. 11 illustrates the effect of distortion along a ray seen by a viewer in his peripheral field of vision after passing through a lens. Thus, while the wearer is looking at a point A in central vision, some peripheral points as point B are also seen. Due to prismatic deviation, the wearer has the feeling that the object point is in B' and not in point B. The angle Δ is a quantitative way of expressing the prismatic deviation which gives to the wearer the illusion that point B is located at point B'. Several quantities can be calculated to evaluate distortion. For instance, we can quantify how a vertical and/or a horizontal line of an object grid seen in the peripheral vision is being curved as it can be seen in FIG. 12. In this figure, the grid seen without the lens which is not deformed is superimposed with the distorted grid seen through the lens. Therefore, it becomes apparent that the distortion has an impact on peripheral vision. Moreover, it also appears that the distortion can be quantified by calculating how a peripheral square is deformed. For this calculation, FIG. 13 is an enlarged view of one square of the grid seen without the lens over which is superimposed the deformed square of the deformed grid seen through the lens. The square has two diagonals whose lengths are labeled a. Thus, the division of the length of each diagonal is a/a=1 in the case of the square of the grid seen without the lens. The corresponding deformed square has two diagonals whose lengths are different and are respectively labeled b and c, b corresponding to a diagonal longer than c. For this deformed square b/c is different from 1. The more this ratio is different from 1 and the more the distortion is important in this area of the lens. Calculating the ratio of the diagonal is thus a way of quantifying distortion.

Distortion can also be evaluated considering that the eye is moving behind the lens and this kind of distortion is named dynamic distortion. It appears in the periphery of the central visual field and it is evaluated in central vision (named also direct vision).

Thus distortion can be evaluated in static vision, i.e. the direction of gaze is fixed and distortion is analyzed in peripheral vision. Distortion can also be evaluated in dynamic vision, i.e. the direction of gaze is free and distortion is analyzed in central vision. Evaluation in static or dynamic vision is made depending on the intended use of the lens. Reference can be made to publication <<La distortion en optique de lunetterie>> by Yves LE GRAND Annales d'Optique Oculaire 5ème année No 1 Janvier 1956.

FIG. 11 illustrates distortion in static vision. In dynamic vision, the quantities analyzed would be different—magnification in peripheral or central vision respectively—but the conclusions remain the same, i.e. magnification variations must be mastered.

So as to reduce distortion, the phenomena which trigger distortion should be pointed out. Concerning progressive multifocal lenses, two phenomena are involved. First, in the periphery of the field of view, the optical mean power in central vision (and consequently the optical mean power in peripheral vision) increases when lowering the gaze direction (or for when lowering the peripheral ray direction) from the upper part of the lens to the lower part of the lens. This effect is due to the fact that to suit the presbyopic wearer needs, the optical power between the far and near visions of the multifocal lens is increasing. In the following, the expression 'upper/lower parts of the lens' means the upper/lower parts of the central or peripheral field of view depending on whether static vision or dynamic vision is considered. This implies that the mean central or peripheral magnifications of the eye-lens system also increases when lowering the gaze or peripheral ray direction from the central or peripheral far vision zone to the central or peripheral near vision zone since mean magnification is, at least at first order, proportional to mean power. A way of reducing distortion is thus to minimize the difference in mean central or peripheral magnification between the far vision zone and the near vision zone.

Figure 16:
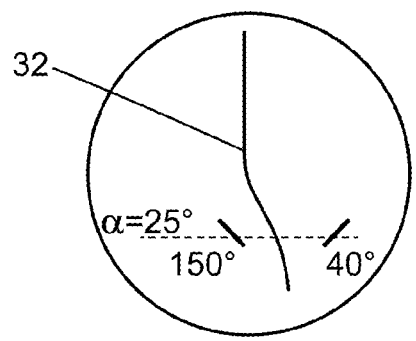
FIGS. 16 and 17 show the phenomena responsible for the distortion.
Figure 17:
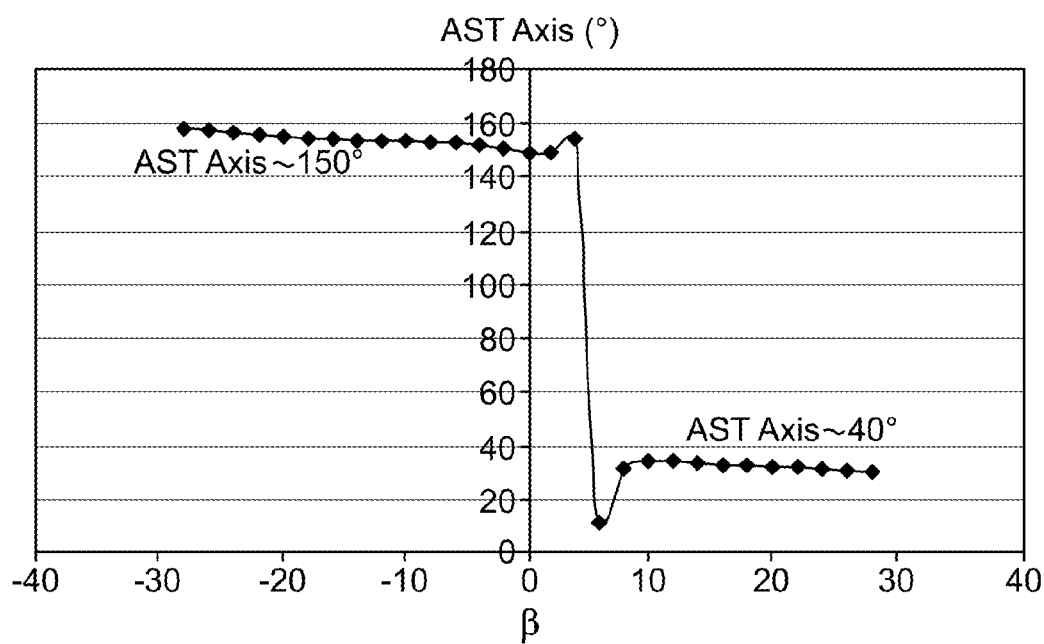

Second, the power progression also generates residual astigmatism on both sides of the meridian line. This observation can be shown by commenting FIGS. 16 and 17 which represent a part of the characteristics of a lens suitable for a wearer whose prescription is a spherical prescription (no astigmatism in the prescription). FIG. 16 is a schematic view of the mean orientation of the astigmatism axis of the lens, the mean value being calculated in the lower part of the lens for a lowering gaze direction equal to 25°. FIG. 17 corresponds to the variation of the axis of the resulting astigmatism evaluated in central vision as a function of azimuth angle β for a given fixed lowering angle $\alpha_1$ as it is shown in FIG. 16. It can be observed that on each side of the meridian 32, for a given fixed angle $\alpha_1$, the residual astigmatism axes are nearly constant for all given gaze direction ($\alpha_1, \beta$). For example, for the selected lens, and for $\alpha_1$, on the temporal side, the axis of resulting astigmatism is about 150° and on the nasal side, it is about 40°. These indications are reported schematically on FIG. 16. Residual astigmatism can be evaluated, such as mean power, in peripheral vision or in central vision. Residual astigmatism is the astigmatism defect that means the astigmatism that is not required to correct the wearer's vision.

Astigmatism has an impact on distortion. Indeed, for each gaze direction, the astigmatism value is the difference between the minimal optical power (optical power along the axis of astigmatism) and the maximal optical power (optical power along the counter axis of astigmatism, the counter axis being defined as equal to the axis of astigmatism+90°), thereby resulting in difference in magnification between the two axes (the axis and the counter axis). Another way of reducing distortion is thus to minimize the difference in central or peripheral magnification between these two axes for each gaze direction.

Minimizing the difference in magnification between these two axes for each gaze direction while maintaining optical criteria, for example of power and astigmatism, thus enables to improve the performance of the lens relative to distortion while guaranteeing a good sharpness of the image for the wearer.

Figure 18:
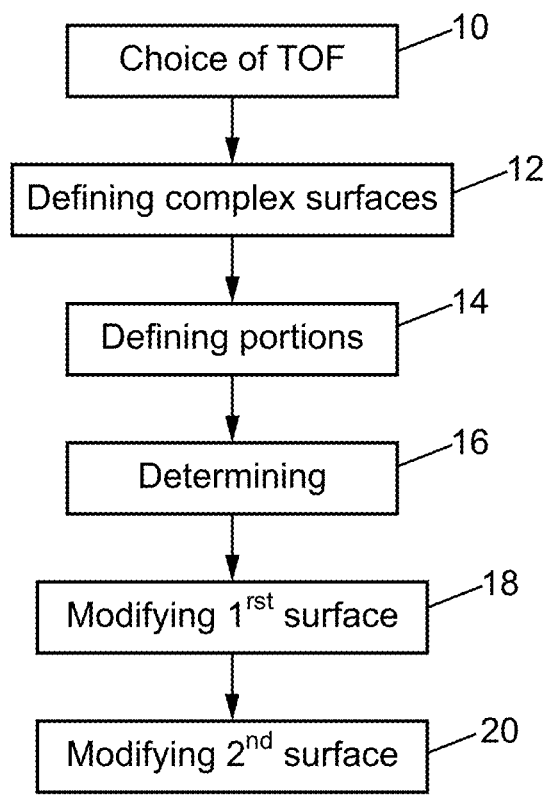
FIG. 18 is a schematic flowchart of the steps of the method for determining a progressive lens according to an embodiment of the invention.

FIG. 18 illustrates a flowchart of an example of the method according to the invention for determining a progressive ophthalmic lens. In this embodiment, the method comprises the step 10 of choosing a target optical function suited to the wearer. As known, to improve the optical performances of an ophthalmic lens, methods for optimizing the parameters of the ophthalmic lens are thus used. Such optimization methods are designed so as to get the optical function of the ophthalmic lens as close as possible to a predetermined target optical function.

The target optical function represents the optical characteristics the ophthalmic lens should have. In the context of the present invention and in the remainder of the description, the term "target optical function of the lens" is used for convenience. This use is not strictly correct in so far as a target optical function has only a sense for a wearer—ophthalmic lens and ergorama system. Indeed, the optical target function of such system is a set of optical criteria defined for given gaze directions. This means that an evaluation of an optical criterion for one gaze direction gives an optical criterion value. The set of optical criteria values obtained is the target optical function. The target optical function then represents the performance to be reached. In the simplest case, there will only be one optical criterion such as optical power or astigmatism; however, more elaborate criteria may be used such as mean power which is a linear combination of optical power and astigmatism. Optical criteria involving aberrations of higher order may be considered. The number of criteria N considered depends on the precision desired. Indeed, the more criteria considered, the more the lens obtained is likely to satisfy the wearer's needs. However, increasing the number N of criteria may result in increasing the time taken for calculation and the complexity to the optimization problem to be solved. The choice of the number N of criteria considered will then be a trade-off between these two requirements. More details about target optical functions, optical criteria definition and optical criteria evaluation can be found in patent application EP-A-2 207 118.

The method also comprises a step 12 of defining a first aspherical surface of the lens and a second aspherical surface of the lens. For instance, the first surface is an object side surface and the second surface is an eyeball side surface. Each surface has in each point a mean sphere value $SPH_{mean}$, a cylinder value CYL and a cylinder axis $\gamma_{AX}$.

The method further encompasses a step 14 of defining at least one first portion Portion1 in the temporal area and at least one second portion Portion2 in the nasal area. Therefore, Portion1 is included in Area_temporal and Portion2 is included in Area_nasal.

Figure 19:
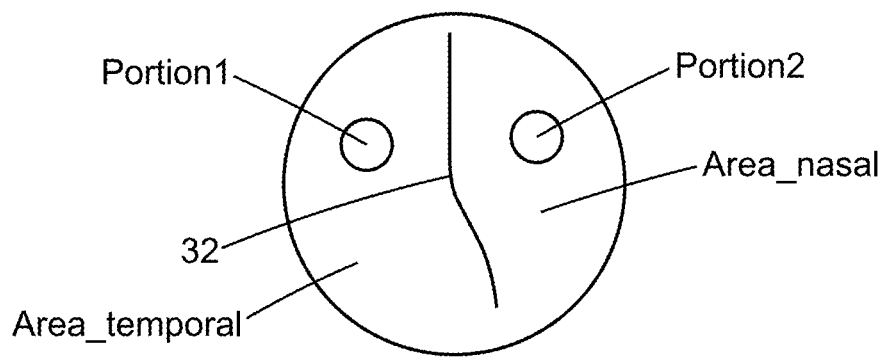
FIG. 19 shows elements of the lens.

Examples of choice of these portions Portion1 and Portion2 are illustrated in FIG. 19. In the example of FIG. 19, the portions are discs which are symmetrical with respect to the meridian 32 of the lens. Those optical zones Portion1 and Portion2 have corresponding portions on the front surface of the lens. Each gaze direction delimiting the optical portions intersects the first aspherical surface (the front surface) so as to define corresponding portions on the front surface Portion1_Front_Surface and Portion2_Front_Surface.

According to embodiments, portions Portion1 and Portion2 in the temporal area and in the nasal area may be defined on the lens as follow: When central vision is considered, Portion1 in the temporal area may be delimited by gaze directions of $0°<\alpha<30°$ and $-40°<\beta<-5°$ and such that resulting astigmatism in the portion considered is more than 0.50 diopters. Portion2 in the nasal area may be delimited by gaze directions of $0°<\alpha<30°$ and $5°<\beta<40°$ and such that resulting astigmatism in the portion considered is more than 0.50 diopters.

When central vision is considered, Portion1 in the temporal area may be further delimited by gaze directions of $5°<\alpha<30°$ and $-30°<\beta<-10°$ and such that resulting astigmatism in the portion considered is more than 0.50 diopters. Portion2 in the nasal area may be further delimited by gaze directions of $5°<\alpha<30°$ and $10°<\beta<30°$ and such that resulting astigmatism in the portion considered is more than 0.50 diopters.

When peripheral vision is considered, for a fixed gaze direction in primary gaze direction, Portion1 in the temporal area may be delimited by ray directions of $0°<\alpha<50°$ and $-50°<\beta<-10°$ and such that resulting astigmatism in the portion considered is more than 0.50 diopters. Portion2 in the nasal area may be delimited by ray directions of $0°<\alpha<50°$ and $10°<\beta<50°$ and such that resulting astigmatism in the portion considered is more than 0.50 diopters.

When peripheral vision is considered, Portion1 in the temporal area may be further delimited by ray directions of $10°<\alpha<50°$ and $-40°<\beta<-20°$ and such that resulting astigmatism in the portion considered is more than 0.50 diopters. Portion2 in the nasal area may be further delimited by ray directions of $10°<\alpha<50°$ and $20°<\beta<40°$ and such that resulting astigmatism in the portion considered is more than 0.50 diopters.

When peripheral vision is considered, for a fixed gaze direction in the intermediate or near visions, Portion1 in the temporal area may be delimited by ray directions of $-20°<\alpha<20°$ and $-50°<\beta<-10°$ and such that resulting astigmatism in the portion considered is more than 0.50 diopters. Portion2 in the nasal area may be delimited by ray directions of $-20°<\alpha<20°$ and $10°<\beta<50°$ and such that resulting astigmatism in the portion considered is more than 0.50 diopters.

When peripheral vision is considered, for a fixed gaze direction in the intermediate or near visions, Portion1 in the temporal area may be further delimited by ray directions of $-20°<\alpha<20$ and $-40°<\beta<-20°$ and such that resulting astigmatism in the portion considered is more than 0.50 diopters. Portion2 in the nasal area may be further delimited by ray directions of $-20°<\alpha<20$ and $20°<\beta<40°$ and such that resulting astigmatism in the portion considered is more than 0.50 diopters.

When the lens is mounted, portions Portion1 and Portion2 may be further reduced.

When a surface of the lens is considered, portions Portion1 and Portion2 are defined as the projection of the above defined portions on the surface. In an embodiment, Portion1 could be delimited on the front surface by $-20$ mm$<x<-2.5$ mm and $4>y>-11$ mm and Portion2 could be delimited on the front surface by $2.5$ mm$<x<20$ mm and $4>y>-11$ mm. In an embodiment, Portion1 could be further delimited on the front surface by $-15$ mm$<x<-5$ mm and $0>y>-11$ mm and Portion2 could be further delimited on the front surface by $5$ mm$<x<15$ mm and $0>y>-11$ mm.

The method also comprises a determining step 16. During this step, for the first portion of the first surface Portion1_Front_Surface, a first reference axis $\Gamma_1$ is determined based on the mean axis of astigmatism $\gamma_T$ of the target optical function for gaze directions belonging to Portion1. The value of the angle $\Gamma_1$ is expressed with relation to the horizontal axis by using convention as described earlier. $\gamma_T$ corresponds to a mean value of the different axis of astigmatism $\gamma_{\alpha,\beta}$ for gaze directions intersecting the first surface in the first portion Portion1. Mathematically, this means that $\gamma_T = \langle \gamma_{\alpha,\beta} \rangle_{Portion1}$. For the second portion of the first surface Portion2_Front_Surface, a second reference axis $\Gamma_2$ is also determined based on the mean axis of astigmatism $\gamma_N$ of the target optical function for gaze directions belonging to Portion2. Similarly, the value of the angle $\Gamma_2$ is expressed with relation to the horizontal axis by using the convention described earlier and $\gamma_N$ corresponds to a mean value of the different axis of astigmatism $\gamma_{\alpha,\beta}$ for gaze directions intersecting the first surface in the second portion Portion2. Mathematically, this means that $\gamma_N = \langle \gamma_{\alpha,\beta} \rangle_{Portion2}$.

During the determining step 16, a combined reference axis $\Gamma$ is determined. Such a combined reference axis $\Gamma$ can be defined as a linear combination of the first and the second reference axes $\Gamma_1$, $\Gamma_2$. The combined reference axis $\Gamma$ can be expressed mathematically as:

$$\Gamma = \alpha_1 * \Gamma_1 + \alpha_2 * \Gamma_2,$$

where $\alpha_1$ and $\alpha_2$ are weights associated to first and second reference axes respectively. Weights $\alpha_1$ and $\alpha_2$ are comprised between 0 and 1; and $\alpha_1 + \alpha_2 = 1$.

According to embodiments, equal weights can be applied to the first and the second reference axes, i.e. $\alpha_1 = \alpha_2 = 0.5$; or total weight can be applied to one of the first or second reference axes, i.e. $\alpha_1 = 0$ and $\alpha_2 = 1$ or $\alpha_1 = 1$ and $\alpha_2 = 0$. Of course, other values of weights $\alpha_1$ and $\alpha_2$ can be applied depending on applications.

The method further comprises a step 18 of modifying the first surface. The first surface is modified so that over the first portion Portion1_Front_Surface, the sphere value along the combined reference axis $\Gamma$ is greater than the sphere value along a perpendicular axis to the combined reference axis $\Gamma$ (condition 1) and over the second portion Portion2_Front_Surface, the sphere value along the combined reference axis $\Gamma$ is greater than the sphere value along a perpendicular axis to the combined reference axis $\Gamma$ (condition 2). These conditions can be expressed mathematically as:

condition 1: over the first portion, $SPH(\Gamma) > SPH(\perp\Gamma)$ and
condition 2: over the second portion, $SPH(\Gamma) > SPH(\perp\Gamma)$ where $SPH(\Gamma)$ is the sphere value along the combined reference axis $\Gamma$ and $SPH(\perp\Gamma)$ is the sphere value along a perpendicular axis to the combined reference axis $\Gamma$.

In term of curvature, the first surface being the object side surface, the conditions 1 and 2 can be expressed as:

condition 1: over the first portion, $CURV(\Gamma) > CURV(\perp\Gamma)$ and
condition 2: over the second portion, $CURV(\Gamma) > CURV(\perp\Gamma)$ where $CURV(\Gamma)$ is the curvature value along the combined reference axis $\Gamma$, $CURV(\perp\Gamma)$ the curvature value along a perpendicular axis to the combined reference axis $\Gamma$.

Figure 20:
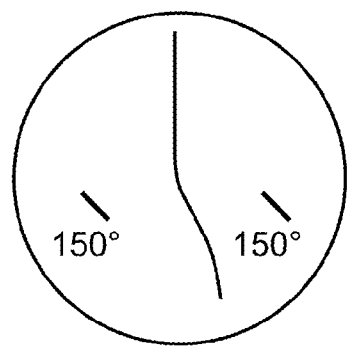
FIG. 20 shows schematically a front surface of a lens obtained by the method for determining a progressive lens according to a first embodiment of the invention.
Figure 21:
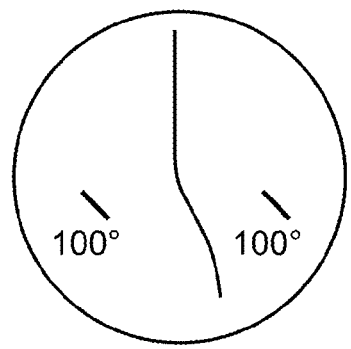
FIG. 21 shows schematically a front surface of a lens obtained by the method for determining a progressive lens according to a second embodiment of the invention.
Figure 22:
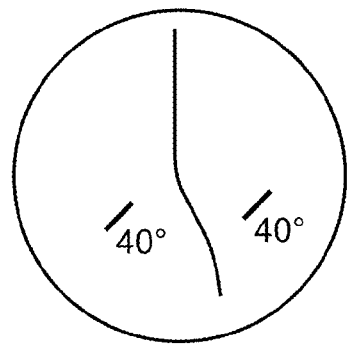
FIG. 22 shows schematically a front surface of a lens obtained by the method for determining a progressive lens according to a third embodiment of the invention.

Examples of variations of the sphere value obtained when such conditions 1 and 2 are taken into account are illustrated by FIGS. 20, 21 and 22. In the illustrated examples, the first reference axis $\Gamma_1$ was determined as being equal to the mean axis of astigmatism over the first temporal portion: $\Gamma_1 = \gamma_T = 150°$; and the second reference axis $\Gamma_2$ was determined as being equal to the mean axis of astigmatism over for the second nasal portion: $\Gamma_2 = \gamma_N = 40°$.

FIG. 20 illustrates an embodiment in which all the weight was given to the temporal side and the combined reference axis $\Gamma$ was set equal to the first reference axis $\Gamma_1$. Such an embodiment will improve distortion in the temporal side and can be implemented for wearers being sensitive to distortion in dynamic vision.

FIG. 21 illustrates an embodiment in which the combined reference axis $\Gamma$ was set to an average value of the first and second reference axes $\Gamma_1$, $\Gamma_2$. Such an embodiment will improve global distortion of the lens.

FIG. 22 illustrates an embodiment in which all the weight was given to the nasal side and the combined reference axis $\Gamma$ was set equal to the second reference axis $\Gamma_2$. Such an embodiment will improve distortion in the nasal side and can be implemented for wearers being sensitive to distortion in reading conditions.

The method further comprises a step 20 of modifying the second aspherical surface so as to reach the target optical function for the lens and guarantee an optimum sharpness for the lens. The modifying of the second surface is carried out by optical optimization for minimizing the difference between a current optical function and the target optical function with a cost function. A cost function is a mathematical quantity expressing the distance between two optical functions. It can be expressed in different ways according to the optical criteria favored in the optimization. In the sense of the invention, "carrying out an optimization" should preferably be understood as "minimizing" the cost function. Of course, the person skilled in the art will understand that the invention is not limited to a minimization per se. The optimization could also be a maximization of a real function, according to the expression of the cost function which is considered by the person skilled in the art. Namely "maximizing" a real function is equivalent to "minimizing" its opposite. With such conditions 1 and 2, the lens obtained (such as the one of FIGS. 20, 21 and 22) thus exhibits reduced distortion properties while guaranteeing the target optical function, the target optical function being defined to provide an optimal sharpness of the image to the wearer. Such effect can be qualitatively understood by the fact that the orientations of the curvatures for the first surface are modified which implies that the impact on the magnification of the lens is modified, resulting in a reduced distortion. In other words, the geometry of the first surface is chosen so that the distortion of the lens is reduced. The second surface is determined to ensure optimal optical performances impacting the sharpness of the image.

Steps 18 and 20 of modifying the first and second surfaces can be carried out by toggling between first and second surfaces with a first target optical function associated to the front surface dedicated to minimizing distortion and a second target optical function associated to the rear surface dedicated to ensuring sharpness of the lens. Such toggling between first and second surfaces optimization is described for instance in EP-A-2 207 118.

The determining step 16 of the method can be carried out in different ways.

For instance, the first and second reference axes $\Gamma_1$ and $\Gamma_2$ may further be determined based on the prescribed astigmatism. The first and second reference axes $\Gamma_1$ and $\Gamma_2$ are therefore more relevantly determined, since they are suited to the wearer. Notably, when prescribed astigmatism is high, the axis of total astigmatism is equal to about the axis of prescribed astigmatism.

In the determining step 16, the first and second reference axes $\Gamma_1$ and $\Gamma_2$ may also be set to a value comprised between [$\gamma$−20°, $\gamma$+20°], where $\gamma$ is the axis of astigmatism in the portions (Portion1, Portion2) considered. $\gamma_T$ is the mean axis of astigmatism over the first temporal portion Portion1. $\gamma_N$ is the mean axis of astigmatism over the second nasal portion Portion2.

Then, for the first portion Portion1_Front_Surface, the value of the first reference axis $\Gamma_1$ is comprised in the range [$\gamma_T$−20°; $\gamma_T$+20°], $\gamma_T$ being the axis of astigmatism in the first portion ($\Gamma_1$ and $\gamma_T$ are expressed in degrees). Similarly, for the second portion Portion2_Front_Surface, the value of the second reference axis $\Gamma_2$ is comprised in the range [$\gamma_N$−20°; $\gamma_N$+20°], $\gamma_N$ being the axis of astigmatism in the second portion ($\Gamma_2$ and $\gamma_N$ are expressed in degrees). According to an embodiment, the reference axes $\Gamma_1$ and/or $\Gamma_2$ can be set to a value equal to $\gamma_T$ and/or $\gamma_N$ respectively.

According to another embodiment, each respective reference axis $\Gamma_1$ and $\Gamma_2$ may also be defined by optical optimization that minimizes the distortion over the respective portion Portion1 and Portion2. The optimization could also be a maximization of a real function. According to this embodiment, modifying the first and second surfaces can be carried out by toggling between first and second surfaces with a first target optical function that minimizes the distortion over the respective portion Portion1 and Portion2 and a second target optical function ensuring sharpness of the lens. Such toggling between first and second surfaces optimization is described in EP-A-2 207 118 previously mentioned.

Such embodiment with an optimization minimizing the distortion over the respective portions Portion1 and Portion2 enables to determine the reference axes $\Gamma_1$ and $\Gamma_2$ that give a lens with the most reduced distortion. In the following, we will detail a way to carry out such optimization by using approximated analytical formulas.

The optical power $P_{\alpha,\beta}(\theta)$ of the lens in a given gaze direction ($\alpha,\beta$), along an axis forming an angle $\theta$ with the horizontal axis, is the combination of the spheres along this axis of the rear surface and the front surface. If SPH_front$_{x,y}$($\theta$) is the sphere of the front face at the intersection point of the gaze direction ($\alpha,\beta$) with the front surface, along the axis $\theta$, and SPH_rear$_{x',y'}$($\theta$) is the sphere of the rear surface at the intersection point of the gaze direction ($\alpha,\beta$) with the rear surface, the optical power along the axis $\theta$ is about the sum of these two quantities which means that $P_{\alpha,\beta}(\theta)$=SPH_front$_{x,y}$($\theta$)+SPH_rear$_{x',y'}$($\theta$).

FIG. 5 is an illustration of this formula for a point of a front surface with a maximum sphere of 7.0 δ, a minimum sphere of 5.0 δ and a cylinder axis $\gamma_{AX}$ of 65° (curve 22 commented before) and a spherical rear surface (curve 42). As expected, the optical power $P_{\alpha,\beta}(\theta)$ (curve 44) of the lens for the gaze direction ($\alpha,\beta$) along the axis is equal to the sum of the sphere of the front surface along the same axis in the corresponding point (x,y) and the sphere of the back surface along the same axis in the corresponding point (x',y'), the corresponding points are the intersection points between the gaze direction ($\alpha,\beta$) and the surfaces. In this example, for simplicity, the thickness of the lens is considered to be equal to 0 mm so that x=x' and y=y'.

Then, approximation formulas enable to give an estimation of the magnification along a given axis forming an angle $\theta$ with the horizontal axis as a function of optical power along this axis and the sphere of the front surface along the same axis:

$$G_{\alpha,\beta}(\theta) = \frac{1}{1 - L \cdot P_{\alpha,\beta}(\theta)} \frac{1}{1 - \frac{t}{n}\text{SPH\_front}_{x,y}(\theta)}$$

where $G_{\alpha,\beta}$ ($\theta$) is the magnification along the axis forming an angle $\theta$ with the horizontal axis, L is the distance from the eyeball side surface of the lens to the eye rotation center if central vision is considered or L is the distance from the eyeball side surface of the lens to pupil if peripheral vision is considered, t the thickness of the lens and n the refractive index of the lens.

Figure 23:
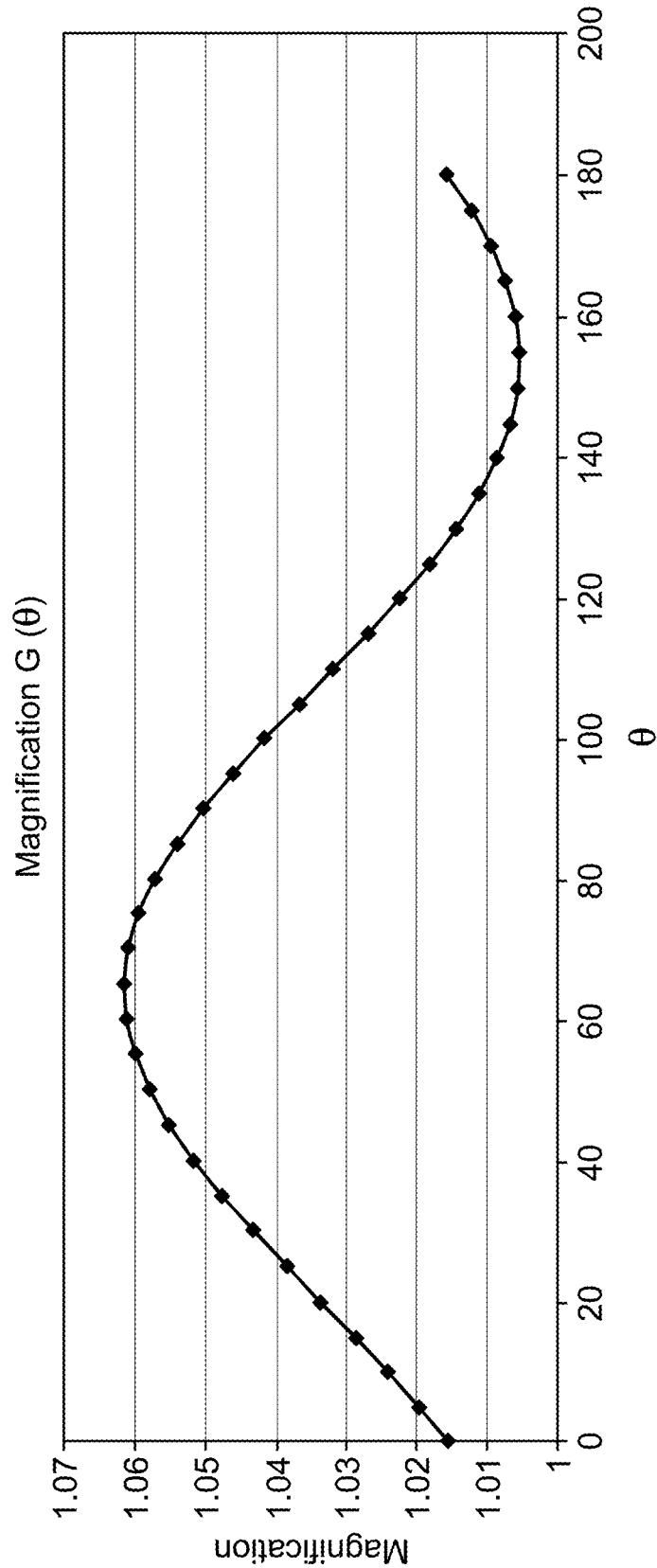
FIG. 23 shows the evolution of magnification value as a function of θ.

With the Gauss formula given before, the evolution of magnification $G_{\alpha,\beta}$ as a function of the angle $\theta$ is thus known. FIG. 23 is a representation of such variation for a gaze direction belonging to Portion1 (Temporal Area)

The axis of astigmatism is $\gamma$ as explained before. For any gaze direction, the axis of astigmatism is the axis along which the optical power is minimal. The maximum optical power is thus along the axis $\gamma$+90°. Accordingly, the minimum magnification is $G_{\alpha,\beta}(\gamma)$ and the maximum magnification is $G_{\alpha,\beta}(\gamma+90°)$. The quantity $DG_{\alpha,\beta}(\gamma)=G_{\alpha,\beta}(\gamma+90°)-G_{\alpha,\beta}(\gamma)$ is thus an evaluation of the difference of principal magnifications, which is the quantity that is searched to be minimized for each gaze direction ($\alpha,\beta$). Indeed, the presence of this difference generates distortion.

With the above formula, the quantity $DG_{\alpha,\beta}(\gamma)=G_{\alpha,\beta}(\gamma+90°)-G_{\alpha,\beta}(\gamma)$ may be expressed. The minimum $G_{\alpha,\beta}(\gamma)$ magnification can thus be calculated:

$$G_{\alpha,\beta}(\theta) = \frac{1}{1 - L * P(\gamma)} \frac{1}{1 - \frac{t}{n}\text{SPH\_front}_{x,y}(\gamma)}$$
$$= \frac{1}{1 - L * P_{min}} \frac{1}{1 - \frac{t}{n}\text{SPH\_front}_{x,y}(\gamma)}.$$

Similarly, the maximum magnification G($\gamma$+90°) can also be calculated:

$$G_{\alpha,\beta}(\gamma + 90°) = \frac{1}{1 - L * P(\gamma + 90°)} \frac{1}{1 - \frac{t}{n}\text{SPH\_front}_{x,y}(\gamma + 90°)}$$
$$= \frac{1}{1 - L * P_{max}} \frac{1}{1 - \frac{t}{n}\text{SPH\_front}_{x,y}(\gamma + 90°)}.$$

In fact, as the target optical function has already been defined, the values of minimal optical power $P_{min}$ and maximal optical power $P_{max}$ are imposed for any gaze direction. They should therefore be considered as constant in the formulas for the quantity $DG_{\alpha,\beta}(\gamma)$.

However, the value of the sphere of the front surface along the axis $\gamma$ and the value of the sphere of the front surface along the axis $\gamma$+90° given by the Gauss formula depends on the cylinder axis. This implies that the value of $DG_{\alpha,\beta}(\gamma)$ depends on the chosen cylinder axis. In other words, $DG_{\alpha,\beta}(\gamma)$ is a function of $\gamma_{AX}$. This function when represented enables to obtain FIG. 24. The example was carried out with a value of L of 25 mm for the distance from the eyeball side surface of the lens to the eyeball, a value t of 1.4 mm for the thickness of the lens and a value n of 1.665 for the refractive index.

Figure 24:
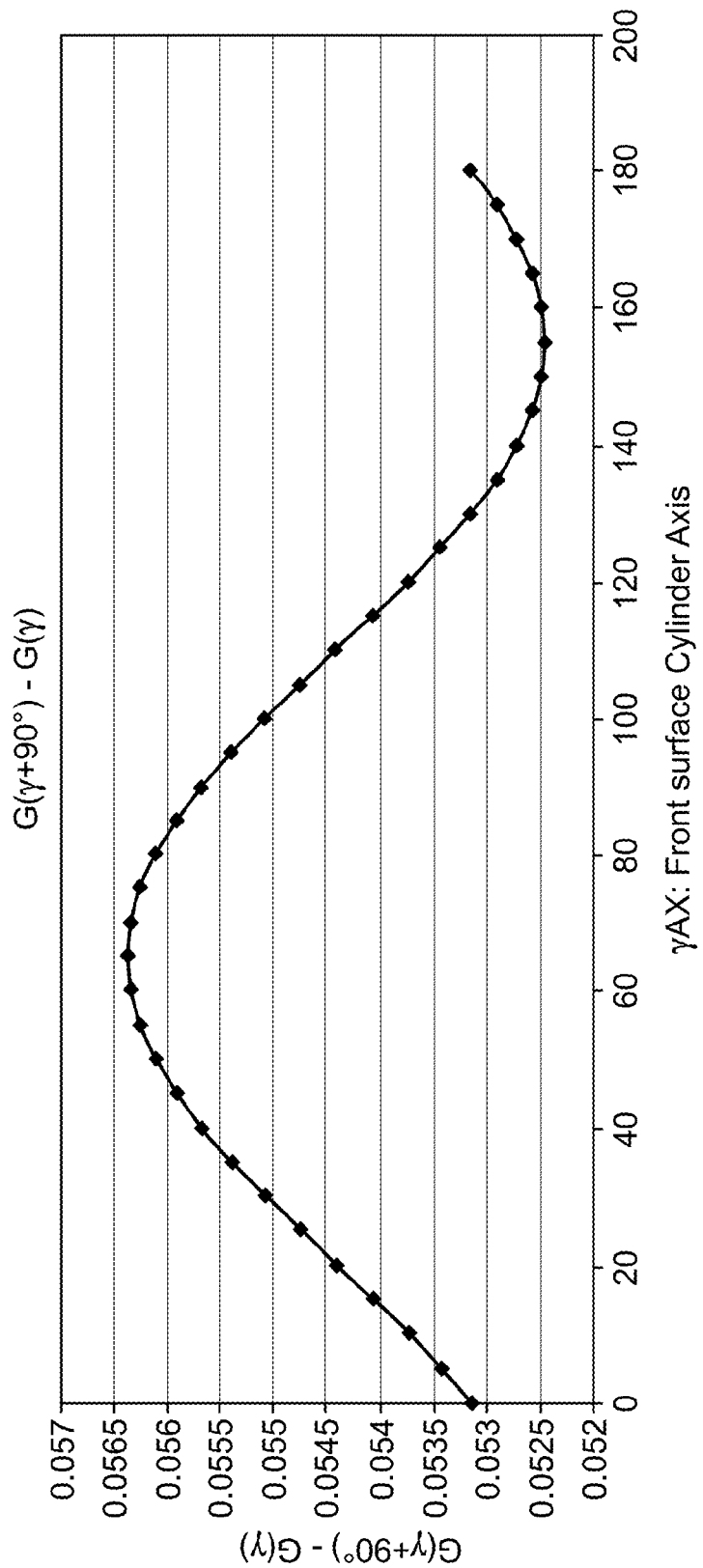
FIG. 24 shows the evolution for one gaze direction of the difference between the magnification along the axis of astigmatism of the lens and the magnification along the axis perpendicular to the axis of astigmatism of the lens as a function of the cylinder axis of the front surface.

The graphic of FIG. 24 shows that the quantity $DG_{\alpha,\beta}(\gamma)$ is minimal for a value of the cylinder axis. In case of the temporal area, the value obtained is 155°. A similar calculation made for the nasal area would lead to a value of 40°. By choosing the reference axes $\Gamma_1$ and $\Gamma_2$ as being equal to these values ($\Gamma_1=155°$ and $\Gamma_2=40°$), the quantity $DG_{\alpha,\beta}(\gamma)$ will be minimized, resulting in a reduced distortion. An example of carrying out of an optimization for the step 16 of the method according to the flowchart of FIG. 18 has thus been described.

The method for determining an ophthalmic lens as described above enables an ophthalmic lens to be obtained with reduced distortion.

Notably, the front surface of the lens according to the invention has a cylinder axis $\gamma_{AX\_T}$ in the first portion Portion1 of the temporal area comprised between $[\gamma-20'; \gamma+20°]$; and a cylinder axis $\gamma_{AX\_N}$ in the second portion Portion2 of the nasal area comprised between $[\gamma-20'; \gamma+20°]$, with $\gamma$ being a weighted average value of axis of astigmatism expressed as:

$$\gamma=\alpha_1*\gamma_T+\alpha_2*\gamma_N,$$

where $\alpha_1$ and $\alpha_2$ are weights, and where $\gamma_T$ is the mean axis of astigmatism of the lens over the first portion of the temporal area and $\gamma_N$ is the mean axis of astigmatism of the lens over the second portion of the nasal area.

The cylinder axis in the front surface of the lens according to the invention is controlled to be equal to a weighted average value of axis of astigmatism over the first portion in the temporal area and the second portion of the nasal area. The axes of astigmatism $\gamma_N$ and $\gamma_T$ may be the mean axes of residual astigmatism of the lens in the portion considered. Alternatively, the axes of astigmatism $\gamma_N$ and $\gamma_T$ may be the mean axes of prescribed astigmatism or total astigmatism of the lens in the portion considered.

According to an embodiment, the weighted average value of axis of astigmatism is equal to a medium value of the mean axis of astigmatism of the lens over the first portion of the temporal area and of the mean axis of astigmatism of the lens over the second portion of the nasal area ($\gamma=\frac{1}{2}*\gamma_T+\frac{1}{2}*\gamma_N$), with equal weights being applied to the mean axis of astigmatism of the lens over the temporal and the nasal portions, i.e. $\alpha_1=\alpha_2=0.5$.

A lens which fulfils such property exhibits improved properties relative to the distortion while guaranteeing an optimal sharpness to the image perceived by the wearer. The comfort of the wearer with such kind of lens is thus increased.

According to another embodiment, the weighted average value of axis of astigmatism is equal to the mean axis of astigmatism of the lens over the first portion of the temporal area ($\gamma=\gamma_T$), with total weight being applied to the temporal portion, i.e. $\alpha_1=1$ and $\alpha_2=0$.

A lens which fulfils such property exhibits improved properties relative to the distortion notably in dynamic vision.

According to another embodiment, the weighted average value of axis of astigmatism is equal to the mean axis of astigmatism of the lens over the second portion of the nasal area ($y=\gamma_N$), with total weight being applied to the nasal portion, i.e. $\alpha_1=0$ and $\alpha_2=1$.

A lens which fulfils such property exhibits improved properties relative to the distortion notably for reading conditions.

For instance, the front surface of the lens may have a cylinder axis $\gamma_{AX\_T}$ in the first portion Portion1 of the temporal area equal to the cylinder axis $\gamma_{AX\_N}$ in the second portion Portion2 of the nasal area. A toric surface is one possible solution for such a front surface. A toric surface is also advantageous for manufacturing process.

Each one of the lens previously described may be obtained by the method of determining an ophthalmic lens as previously described. This method can be implemented on a computer. In this context, unless specifically stated otherwise, it is appreciated that throughout this specification discussions utilizing terms such as "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

A computer program product comprising one or more stored sequence of instruction that is accessible to a processor and which, when executed by the processor, causes the processor to carry out the steps of the method is also proposed.

Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EE-PROMs), magnetic or optical cards, or any other type of media suitable for storing electronic instructions, and capable of being coupled to a computer system bus. A computer-readable medium carrying one or more sequences of instructions of the computer program product is thus proposed. This enables to carry out the method in any location.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Many apparatuses or processes may be used to obtain the pair of lenses using a first surface of a lens determined according to the method previously described. The processes often imply an exchange of a set of data. For instance, this set of data may comprise only the first surface of a lens determined according to the method. This set of data may preferably further comprise data relating to the eyes of the wearer such that with this set, the progressive ophthalmic lens can be manufactured.

Figure 25:
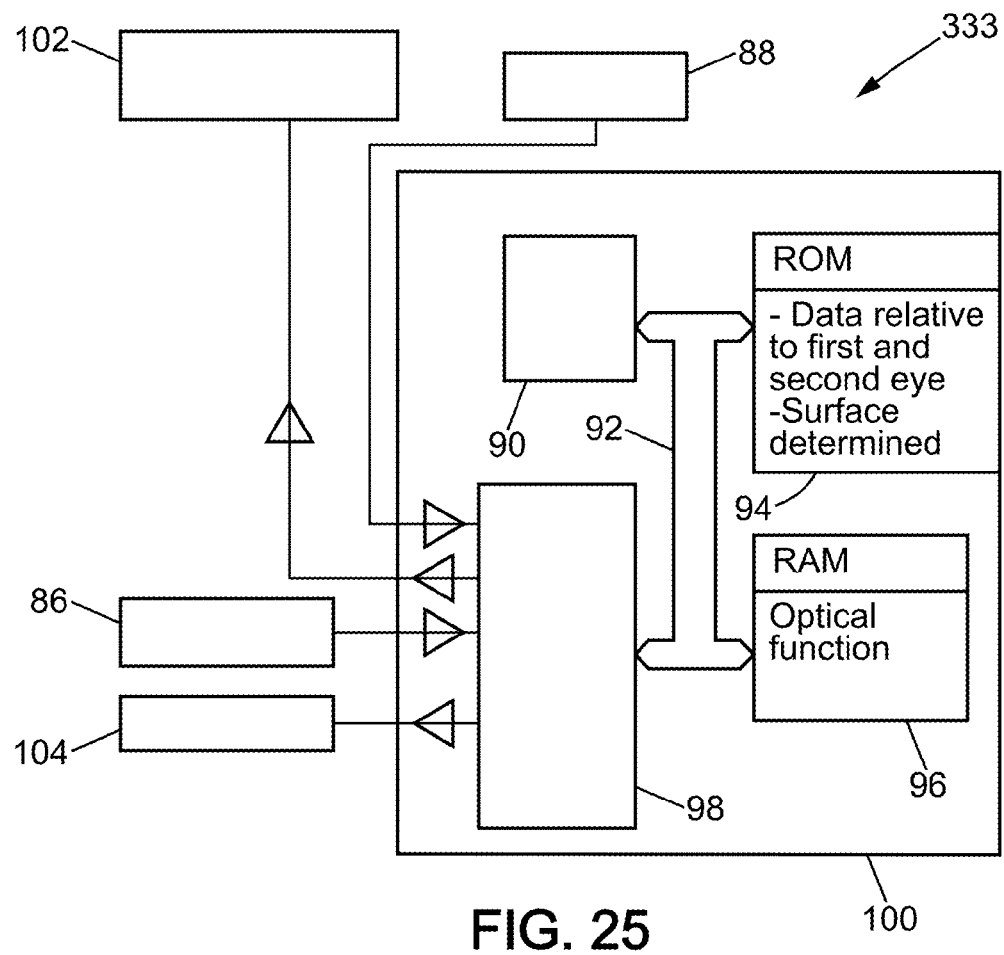
FIG. 25 illustrates an apparatus for processing the method of the invention.

This exchange of data may be schematically understood by the apparatus of FIG. 25 which represents an apparatus 333 for receiving numerical data. It comprises a keyboard 88, a display 104, an external information center 86, a receiver of data 102, linked to an input/output device 98 of an apparatus for data processing 100 which is realized there as a logic unit.

The apparatus for data processing 100 comprises, linked between them by a data and address bus 92:

a central processing unit 90;
a RAM memory 96,
a ROM memory 94, and
said input/output device 98.

Said elements illustrated in FIG. 25 are well known for the person skilled in the art. Those elements are not described any further.

To obtain a progressive ophthalmic lens corresponding to a wearer prescription, semi-finished ophthalmic lens blanks can be provided by a lens manufacturer to the prescription labs. Generally, a semi-finished ophthalmic lens blank comprises a first surface corresponding to an optical reference surface, for example a progressive surface in the case of progressive addition lenses, and a second unfinished surface. A semi-finished lens blank having suitable optical characteristics, is selected based on the wearer prescription. The unfinished surface is finally machined and polished by the prescription lab so as to obtain a surface complying with the prescription. An ophthalmic lens complying with the prescription is thus obtained.

Notably, according to the invention, semi-finished lens blanks can be provided with a first surface meeting the conditions previously described with reference to the first surface of a progressive ophthalmic lens.

To provide such semi-finished lens blanks, a target optical function must be chosen for each set of prescriptions (similarly to step 10 in FIG. 18). A first aspherical surface and a second unfinished surface are defined (similarly to step 12 in FIG. 18). Reference axis $\Gamma_1$ and $\Gamma_2$ are determined not only based on the mean axis of astigmatism $\gamma_T$ and $\gamma_N$ of the target optical function for gaze directions belonging to Portion1 and Portion2 but also on mean axis of astigmatism for lenses of the set of prescriptions. A combined reference axis $\Gamma$ is then determined as described above and the first aspherical surface of the semi-finished lens blank is modified to meet the conditions 1 and 2 defined above.

According to an embodiment, a progressive ophthalmic lens may be manufactured by selecting a semi-finished lens blank having a front first surface defined to meet the conditions defined above. The semi-finished lens is further selected having a front first surface with a given cylinder axis $\gamma_{AX}$ in each point comprised between [$\gamma-20'$; $\gamma+20°$] with $\gamma$ being a mean value of cylinder axis over the first and the second portions in the temporal area and in the nasal area.

Such a semi-finished lens blank can then be positioned to align the mean value of cylinder axis of the front surface with the combined reference axis $\Gamma$. The second surface of the lens is then calculated based on the chosen target optical function and on data relating to the first surface—including data relating to the positioning of the first surface. The second surface of the lens may then be manufactured by digital surfacing for instance.

Such a semi-finished lens blank having a first surface with a controlled cylinder axis $\gamma_{AX}$ may be used for a set of prescriptions including different prescribed axis of astigmatism, by simply aligning the blank correctly on the blocker.

Figure 26:
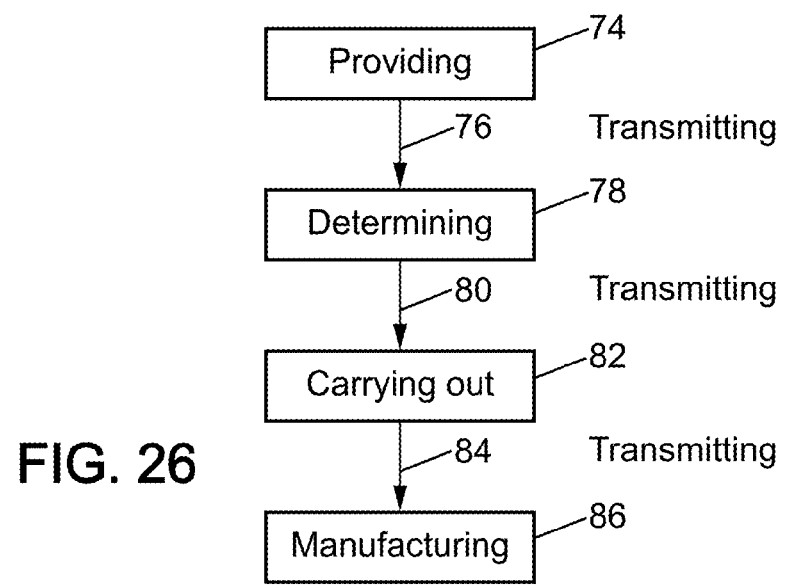
FIG. 26 is a flow chart of a method for manufacturing a lens according to the invention.

Other method for manufacturing may be used. The method according to FIG. 26 is an example. The method for manufacturing comprises a step 74 of providing data relating to the eyes of the wearer at a first location. The data are transmitted from the first location to a second location at the step 76 of the method. The progressive ophthalmic lens is then determined at step 78 at the second location according to the method for determining previously described. The method for manufacturing further comprises a step 80 of transmitting relative to the first surface to the first location.

The method also comprises a step 82 of carrying out an optical optimization based on the data relative to the first surface transmitted. The method further encompasses a step of transmitting 84 the result of the optical optimization to a third location. The method further encompasses a step of manufacturing 86 the progressive ophthalmic lens according to the result of the optical optimization.

Such method of manufacturing makes it possible to obtain a progressive ophthalmic lens with a reduced distortion without degrading the other optical performances of the lens.

The transmitting steps 76 and 80 can be achieved electronically. This enables to accelerate the method. The progressive ophthalmic lens is manufactured more rapidly.

To improve this effect, the first location, the second location and the third location may just be three different systems, one devoted to the collecting of data, one to calculation and the other to manufacturing, the three systems being situated in the same building. However, the three locations may also be three different companies, for instance one being a spectacle seller (optician), one being a laboratory and the other one a lens designer.

A set of apparatuses for manufacturing a progressive ophthalmic lens, wherein the apparatuses are adapted to carry out the method for manufacturing is also disclosed.

The invention shall be further illustrated by the use of the following examples. Although the examples are given for progressive ophthalmic lenses, the invention also applies to non progressive lenses having aspheric surfaces.

General Description of the Figures of the Examples

As explained before, a surface may thus be locally defined by a triplet constituted by the maximum sphere $SPH_{max}$, the minimum sphere $SPH_{min}$ and the cylinder axis $\gamma_{AX}$.

Surface characterizations of the examples are thus given by giving map of the maximum sphere, the minimum sphere and the cylinder axis for each surface considered.

Figure 27:
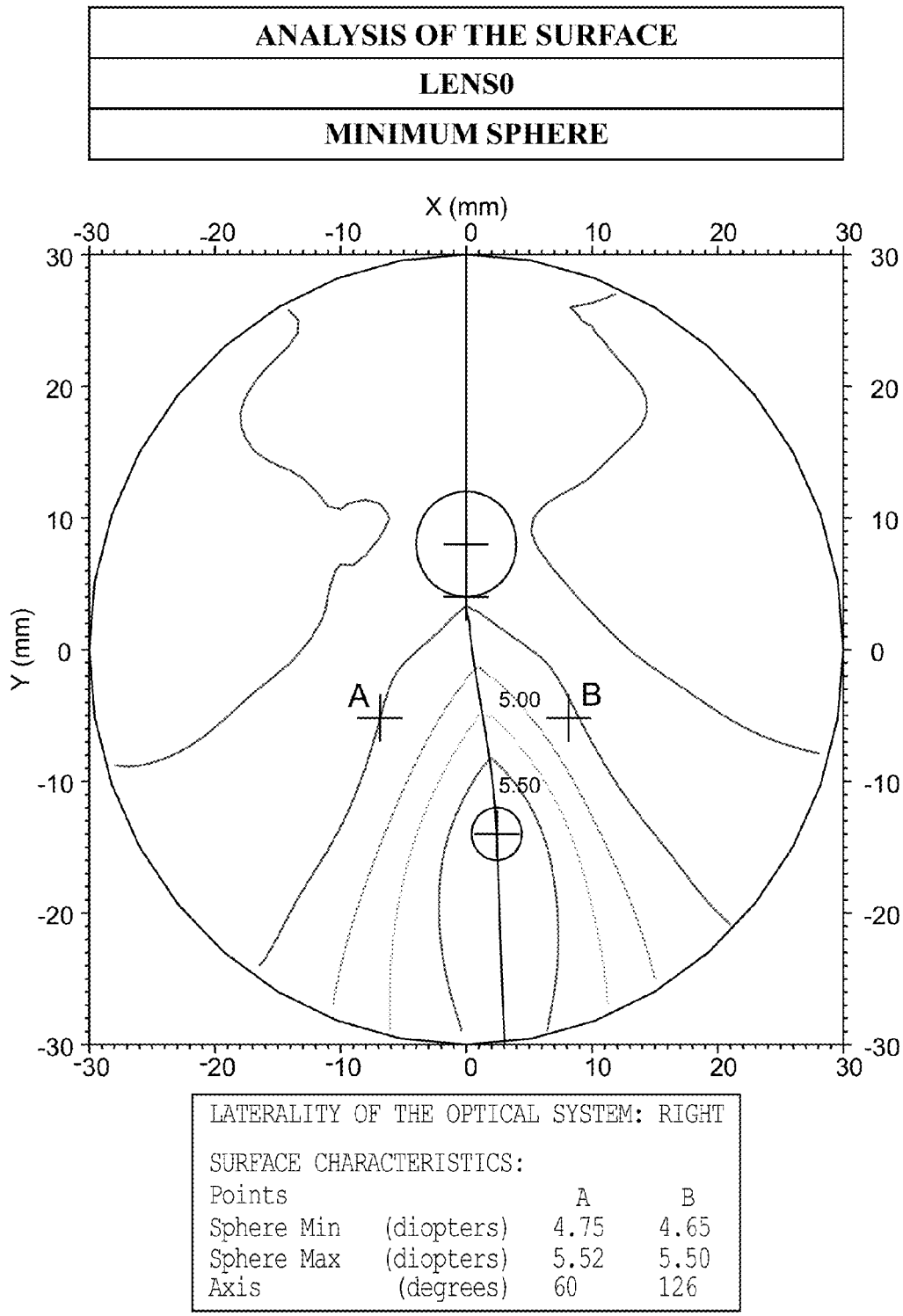
FIGS. 27 to 48 give surface characteristic and optical performances for 4 examples of lenses.
Figure 32:
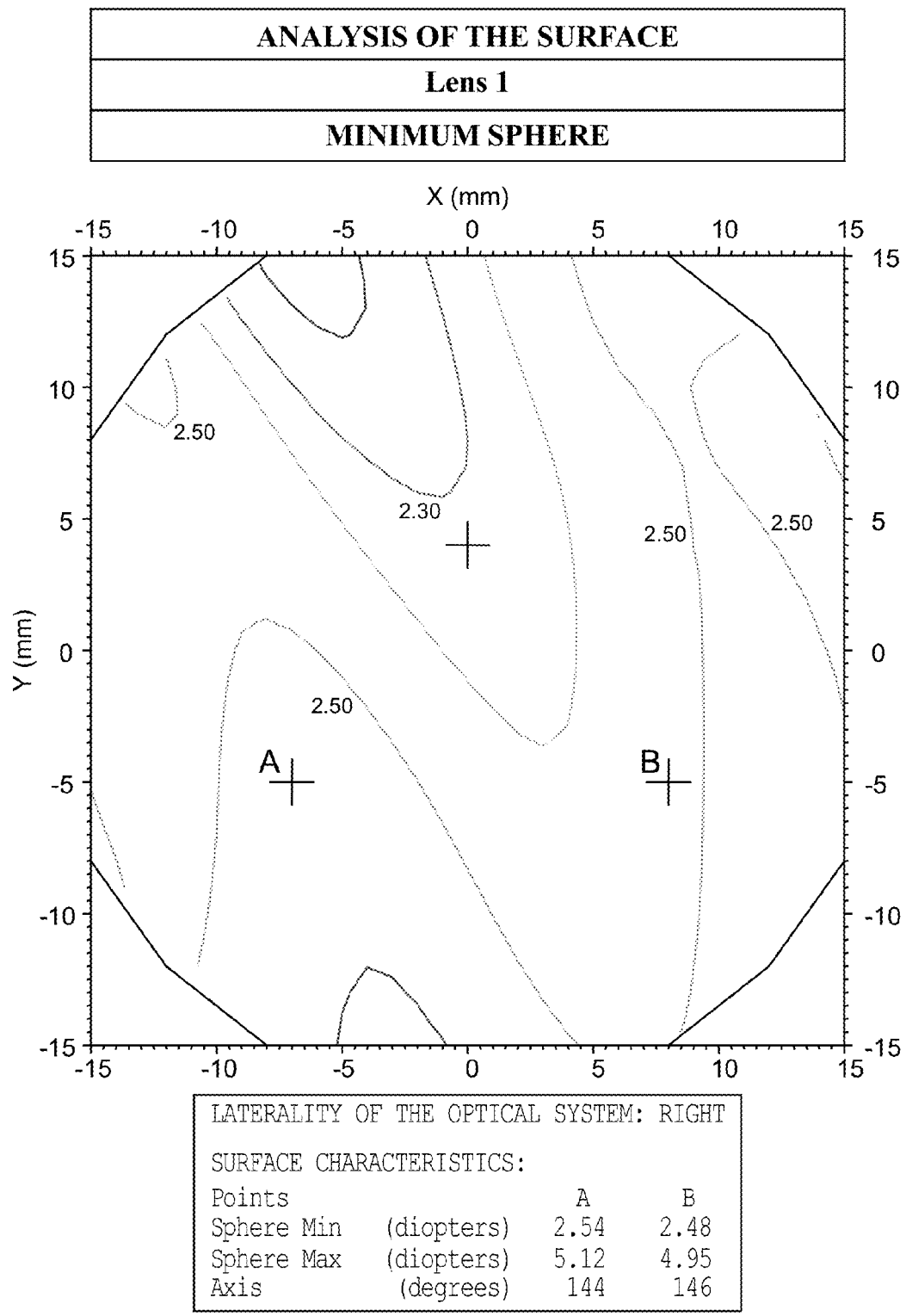
Figure 39:
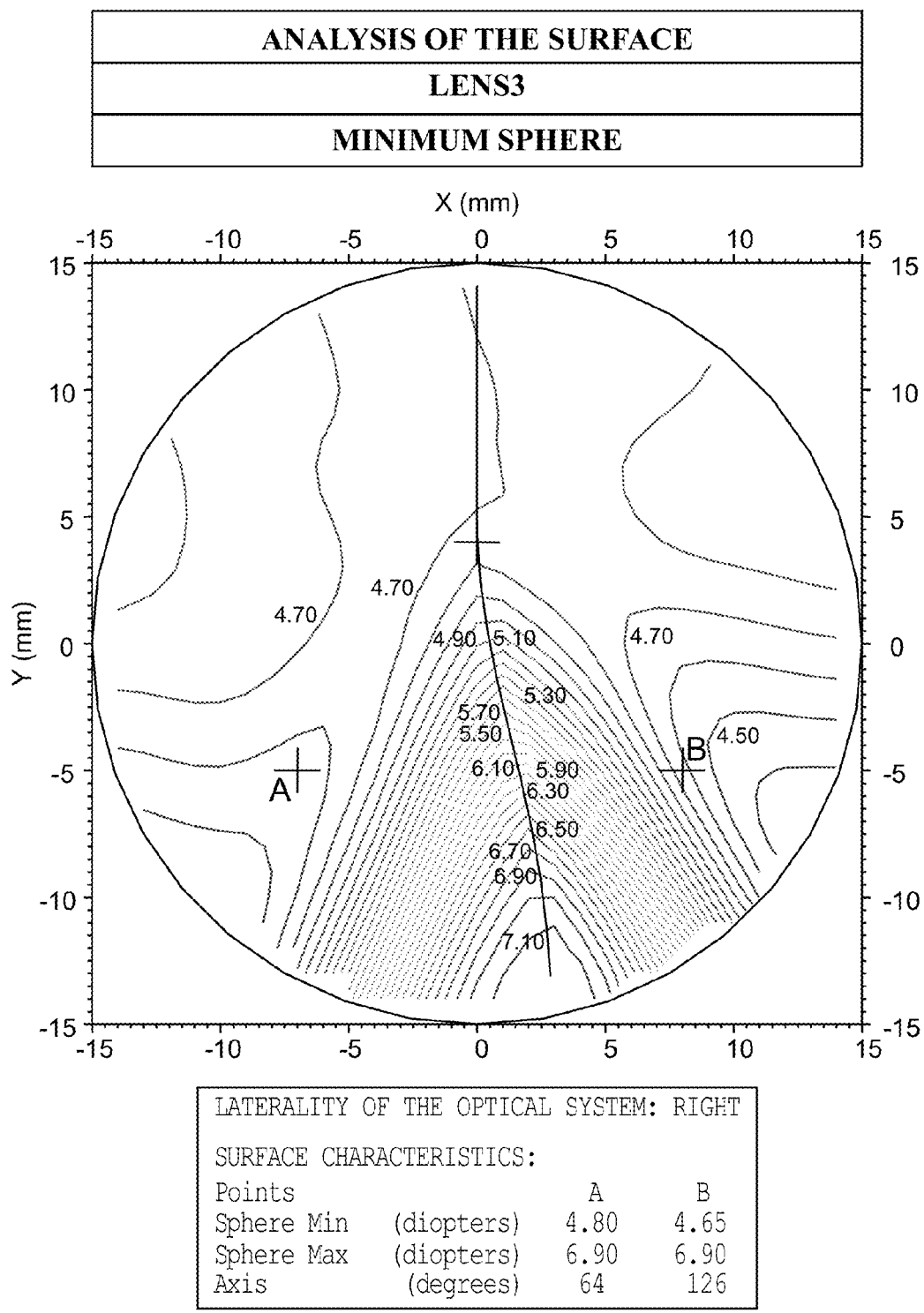

FIGS. 27, 32 and 39 are minimum sphere maps. The vertical and horizontal axis of the maps are the values of the abscissa X (in mm) and of the ordinate Y (in mm). The iso-value curves indicated in these maps connect points which correspond to a same minimum sphere value. The respective minimum sphere values for the curves are incremented by 0.10 diopter between neighboring curves, and are indicated on some of these curves.

Figure 28:
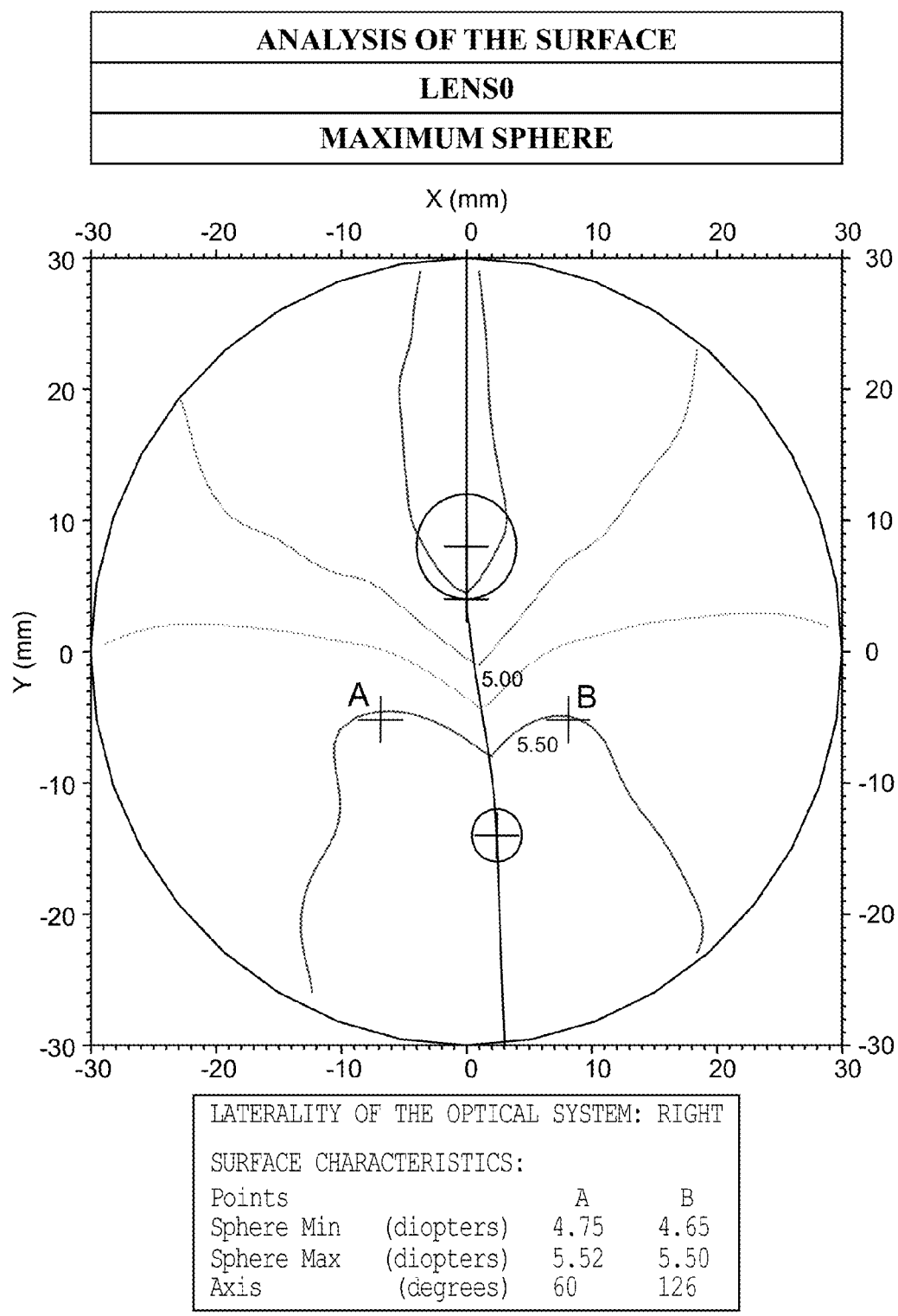
Figure 33:
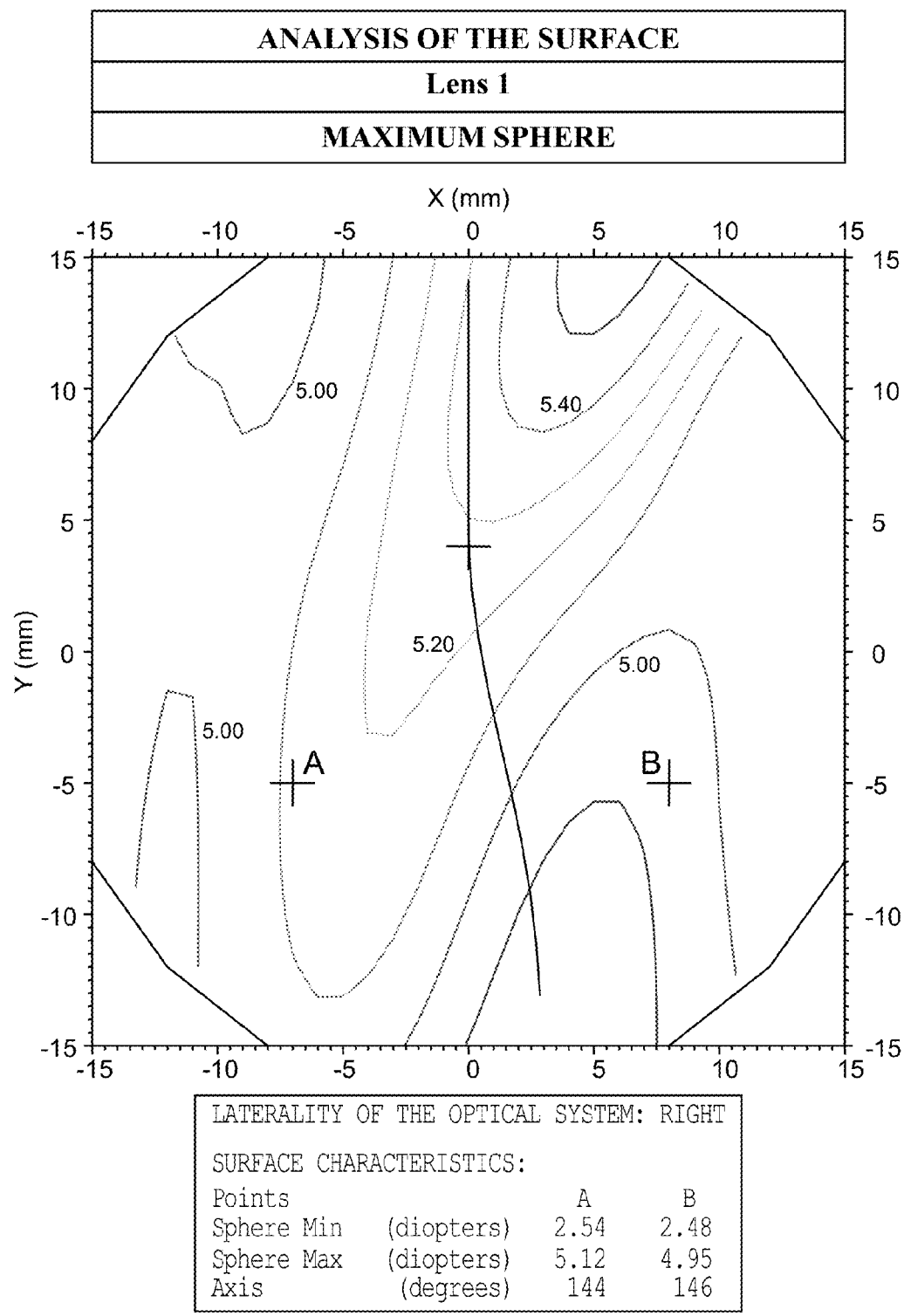
Figure 40:
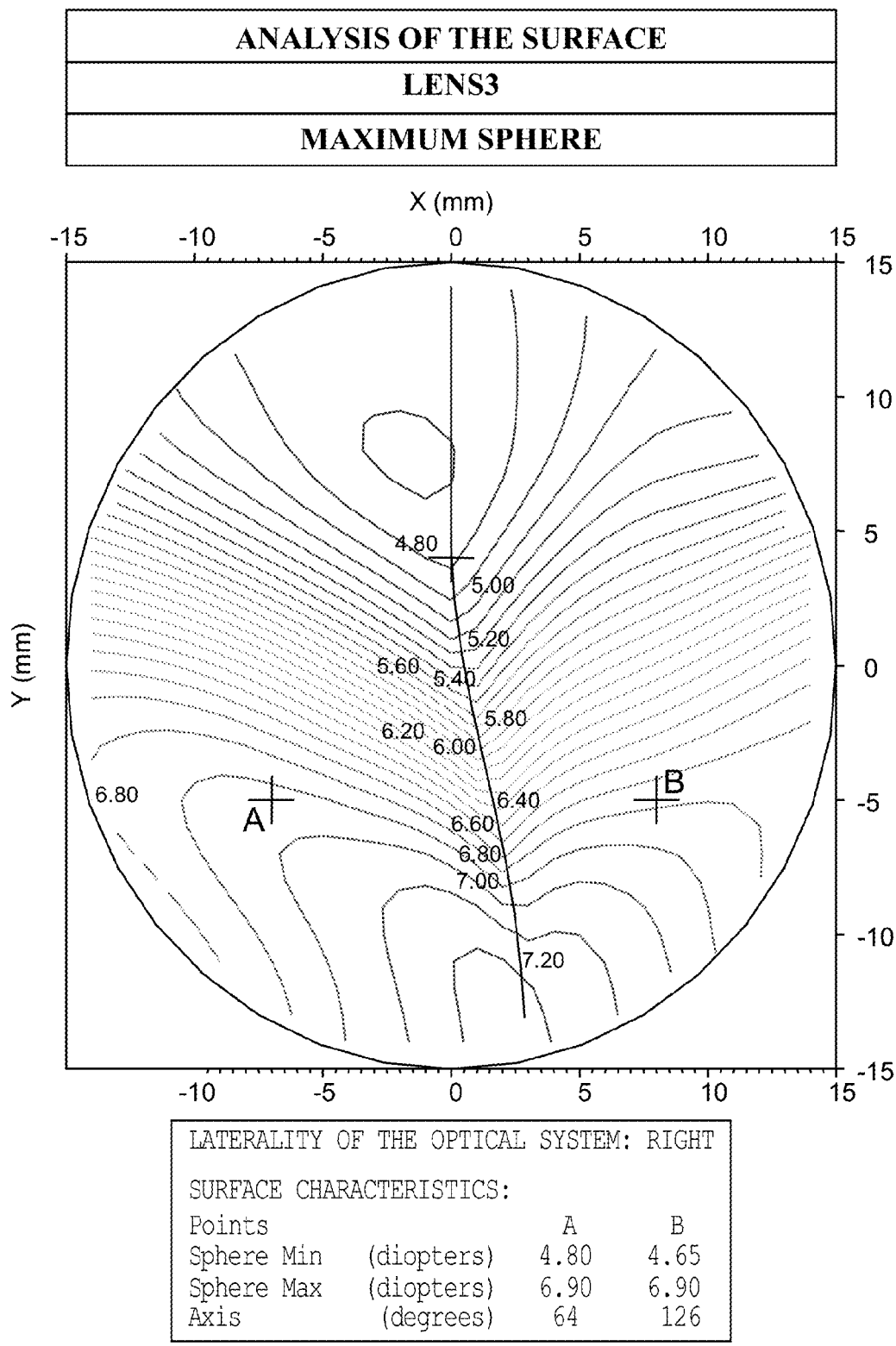

FIGS. 28, 33 and 40 are maximum sphere maps. The vertical and horizontal axis of the maps are the values of the abscissa X (in mm) and of the ordinate Y (in mm). The iso-value curves indicated in these maps connect points which correspond to a same maximum sphere value. The respective maximum sphere values for the curves are incremented by 0.10 diopter between neighboring curves, and are indicated on some of these curves.

Figure 36:
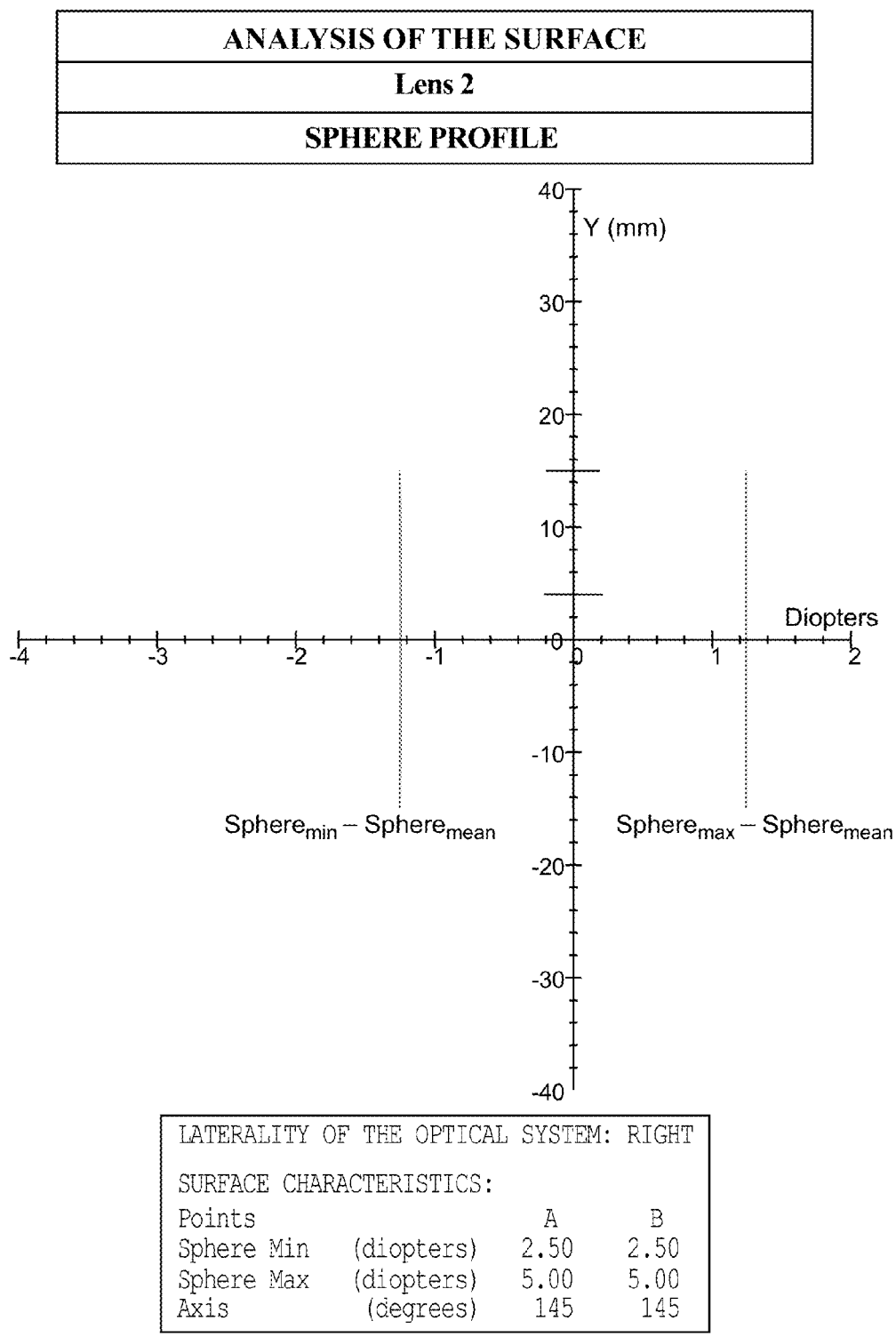
Figure 45:
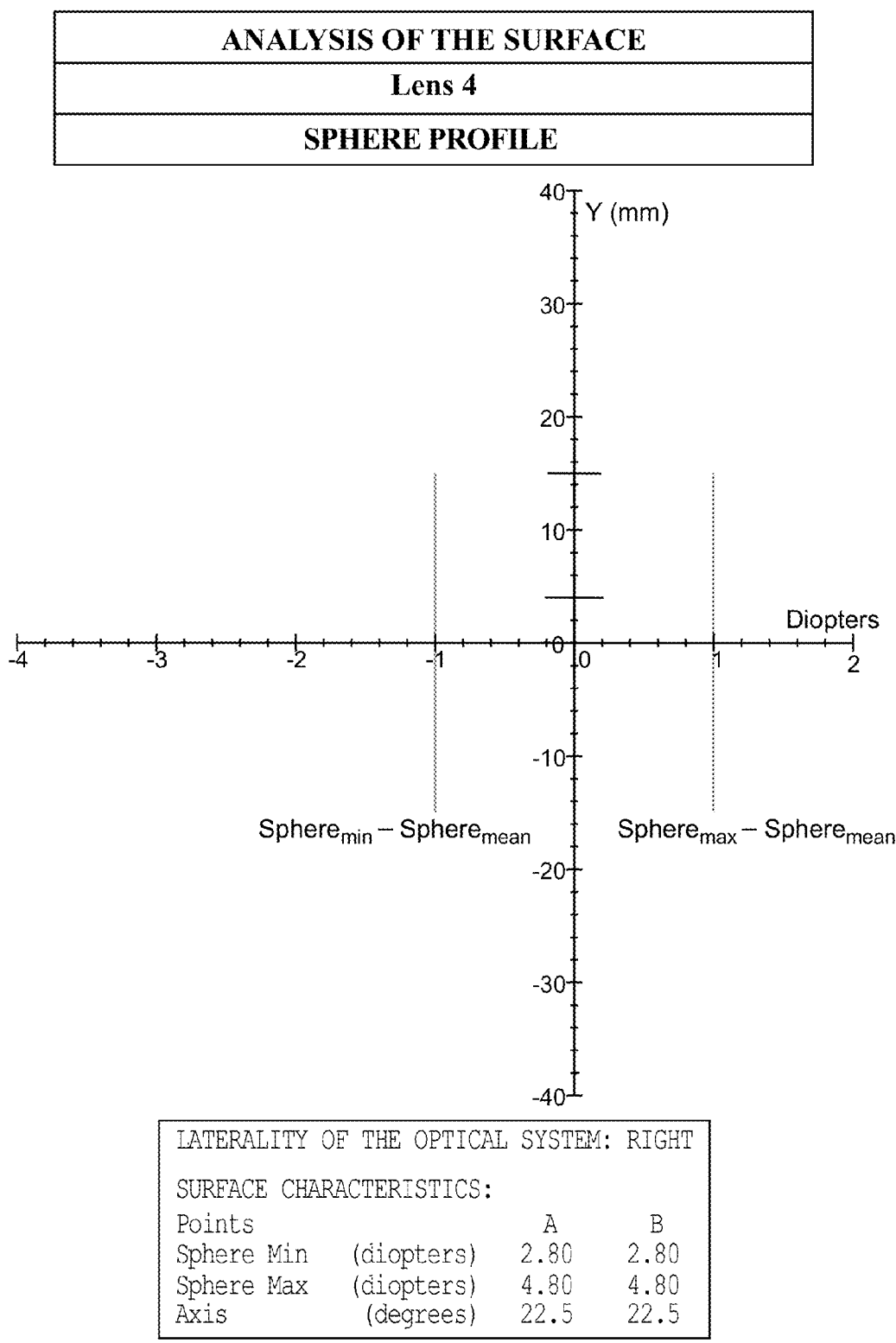

FIGS. 36 and 45 are sphere profiles of toric surfaces.

Figure 29:
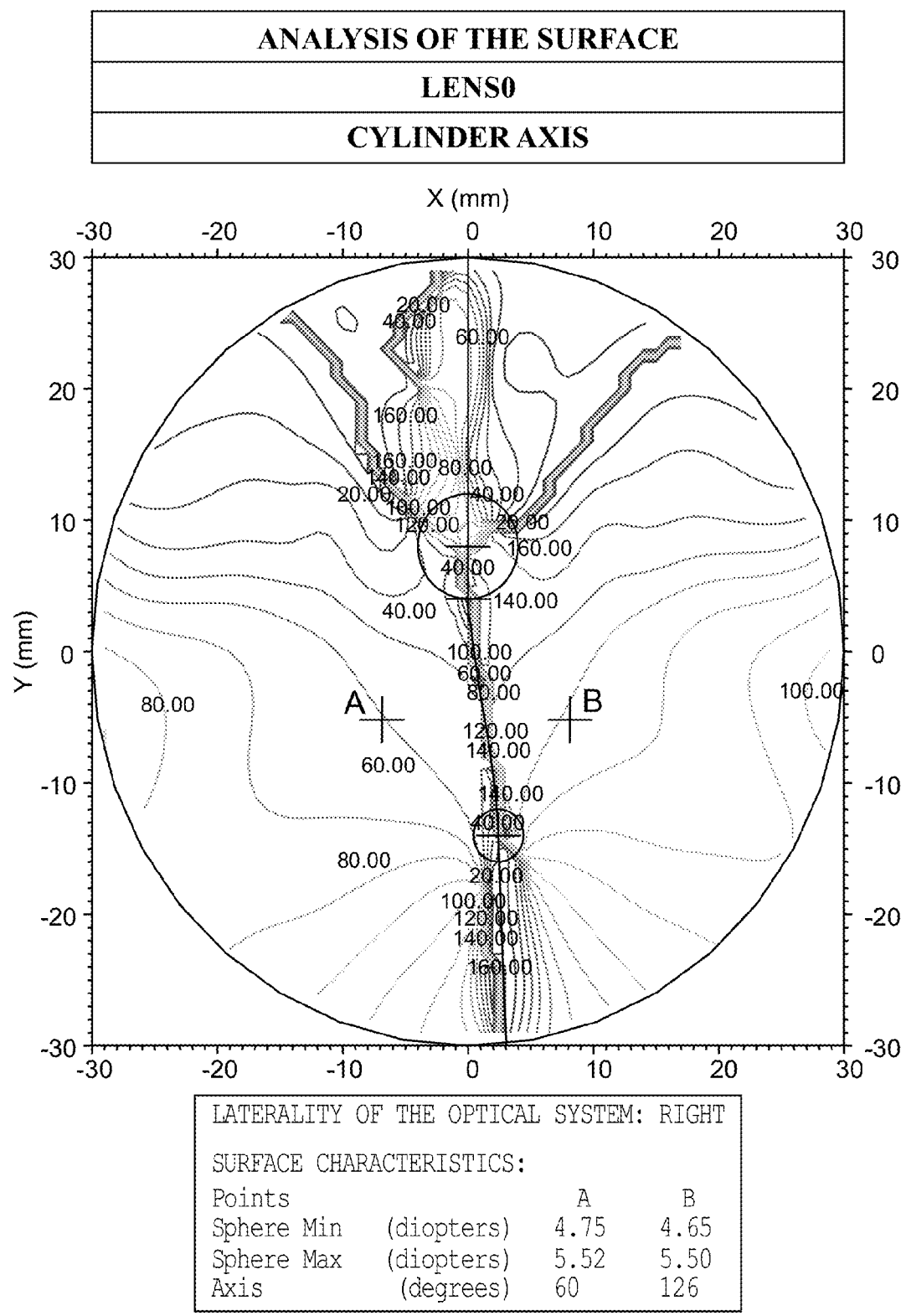
Figure 41:
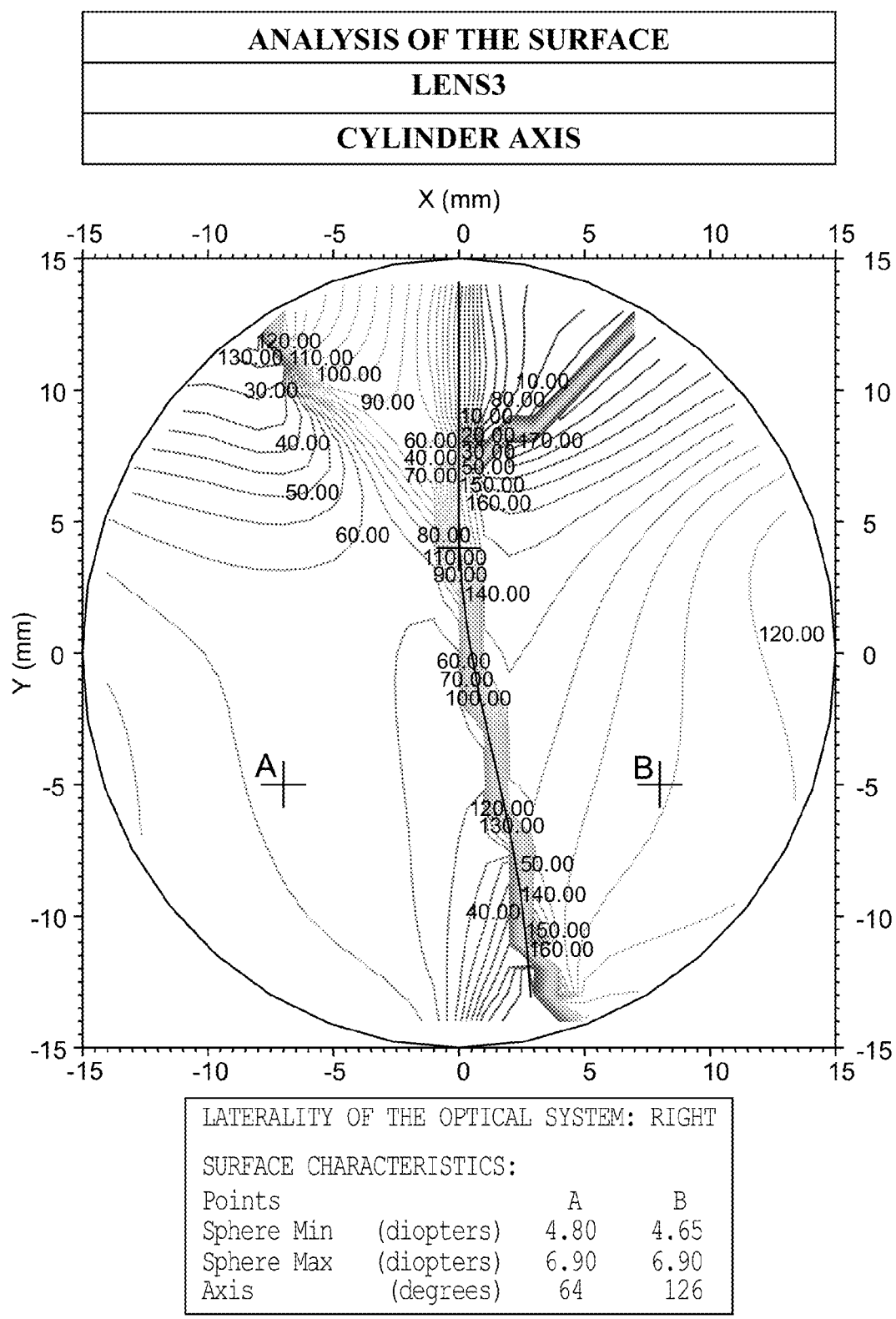

FIGS. 29 and 41 are cylinder axis maps. The vertical and horizontal axis of the maps are the values of the abscissa X (in mm) and of the ordinate Y (in mm). The isometric curves indicated in these maps connect points which correspond to a same cylinder axis value. The respective cylinder axis values for the curves are incremented by 5° between neighboring curves, and are indicated on some of these curves. The front surfaces of exemplified lenses have a mean cylinder of at least 0.25 diopter on the portions considered, preferentially of at least 1 diopter, and preferentially 2 diopters. The more the cylinder is high and well oriented, the lowest would be the distortion and the least sensible is the distortion to the axis orientation over the front surface.

FIGS. 30, 31, 34, 35, 37, 38, 42, 43, 44, 46, 47 and 48 give optical analyses of the performance of the lenses considered.

FIGS. 30, 34, 37, 42 and 46 are optical power maps. The vertical and horizontal axis of the maps are the values of the eye declination angle α and the eye azimuth angle β. The isometric curves indicated in these maps connect gaze directions which correspond to a same optical power value. The respective optical power values for the curves are incremented by 0.25 diopter between neighboring curves, and are indicated on some of these curves.

Figure 43:
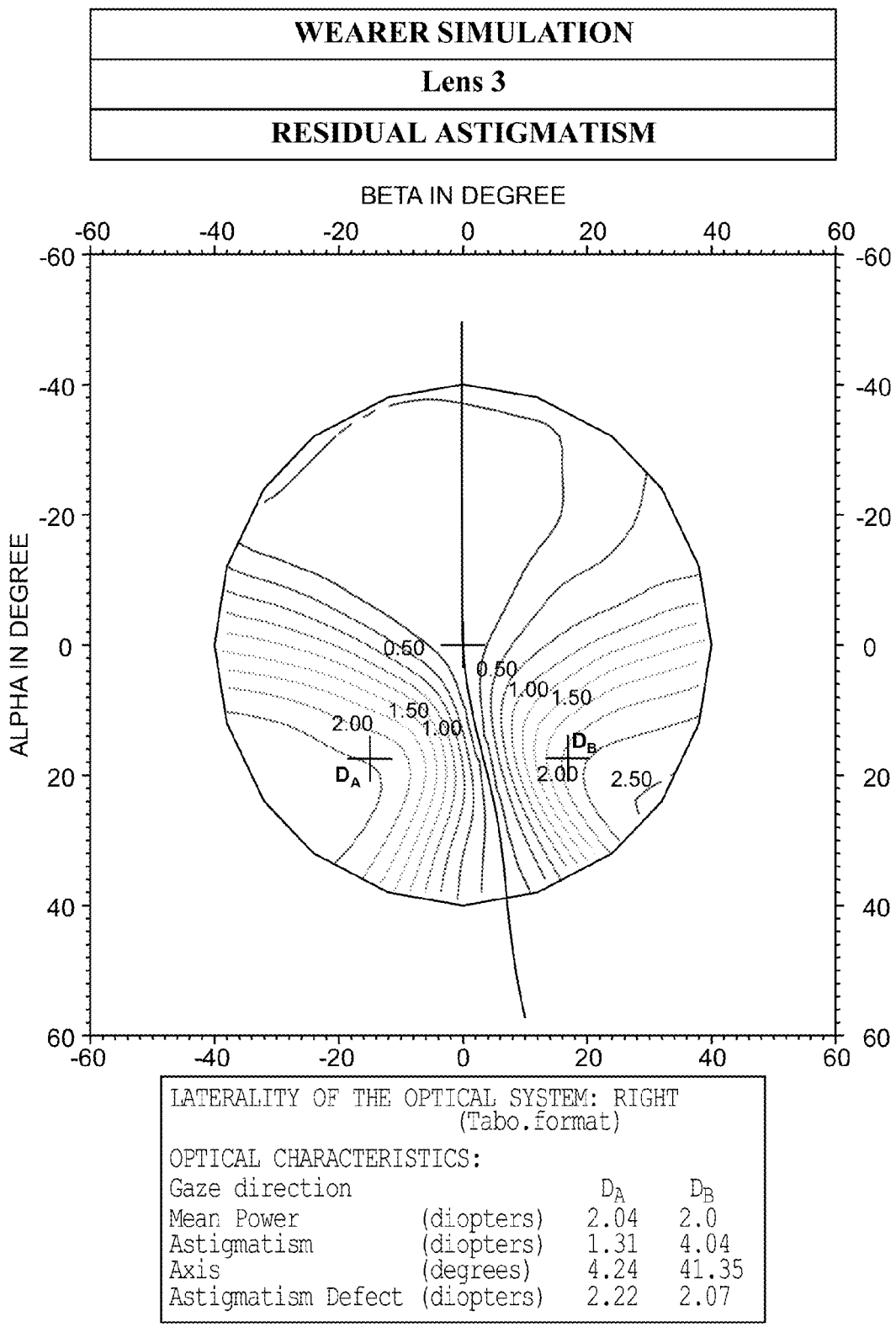
Figure 47:
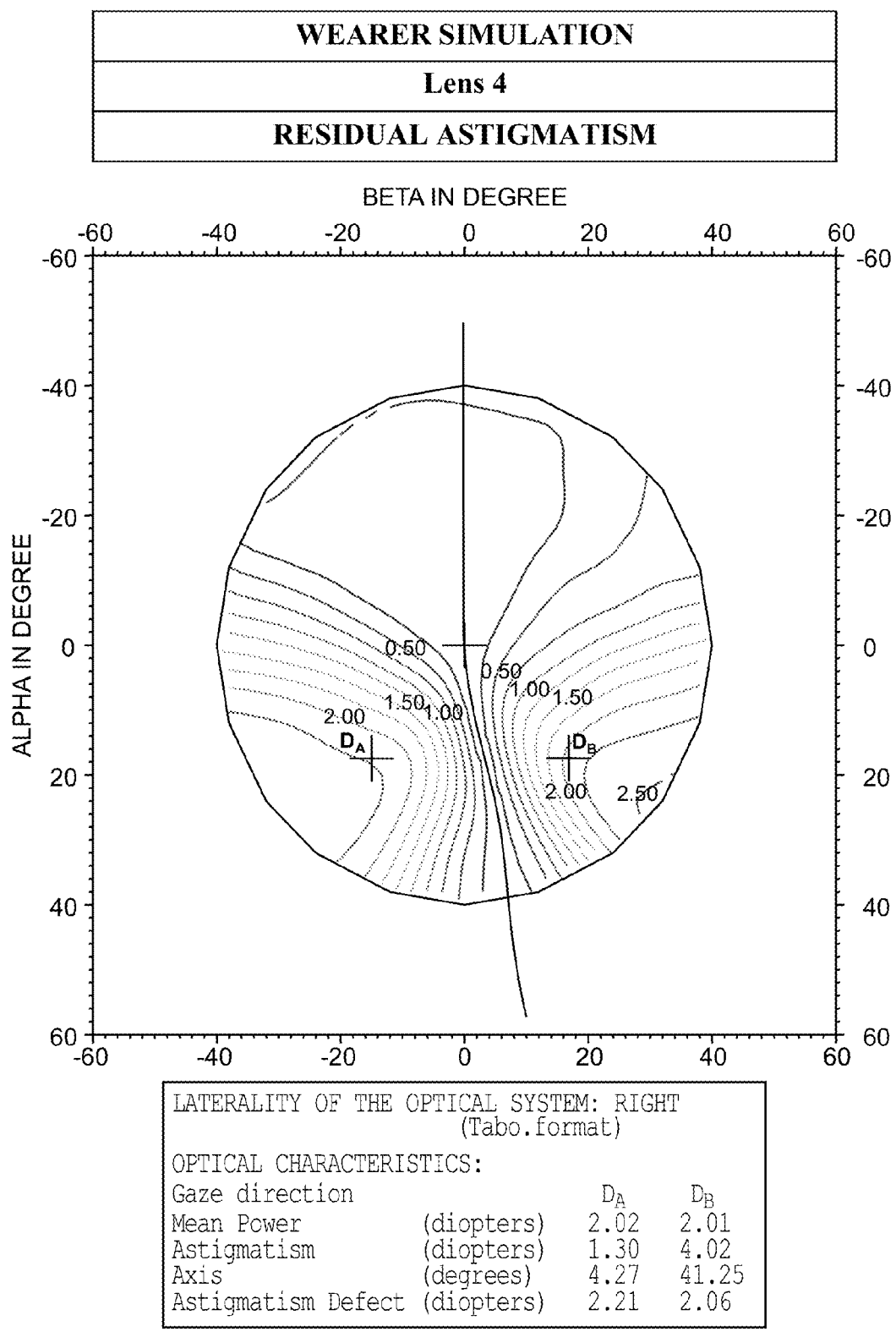

FIGS. 43 and 47 are residual astigmatism contour plots, with axis similar to those of the optical power maps. The isometric curves indicated connect gaze directions corresponding to a same residual astigmatism value.

FIGS. 31, 35, 38, 44 and 48 are total astigmatism contour plots, with axis similar to those of the optical power maps. The isometric curves indicated connect gaze directions corresponding to a same total astigmatism value.

Example 0

Prior Art

Example 0 corresponds to a lens LENS0 according to prior art. In this case, the power prescription is 0.0 δ and the addition is 1.00 δ. For this example 0, the astigmatism prescribed for the wearer is 2.00 δ, with an axis of 140°.

FIGS. 27, 28 and 29 are the surface characteristics of the front surface for LENS0. For the sake of comparison, two specific points A and B are considered. Point A is located on the temporal area whereas point B is located on the nasal area. For point A, the maximum sphere $SPH_{max\_A}$ is equal to 5.52 δ, the minimum sphere $SPH_{min\_A}$ is equal to 4.75 δ and the cylinder axis $\gamma_{AX\_A}=60°$. For point B, the maximum sphere $SPH_{max\_B}$ is equal to 5.50 δ, the minimum sphere $SPH_{min\_B}$ is equal to 4.65 δ and the cylinder axis $\gamma_{AX\_B}=126°$.

Figure 30:
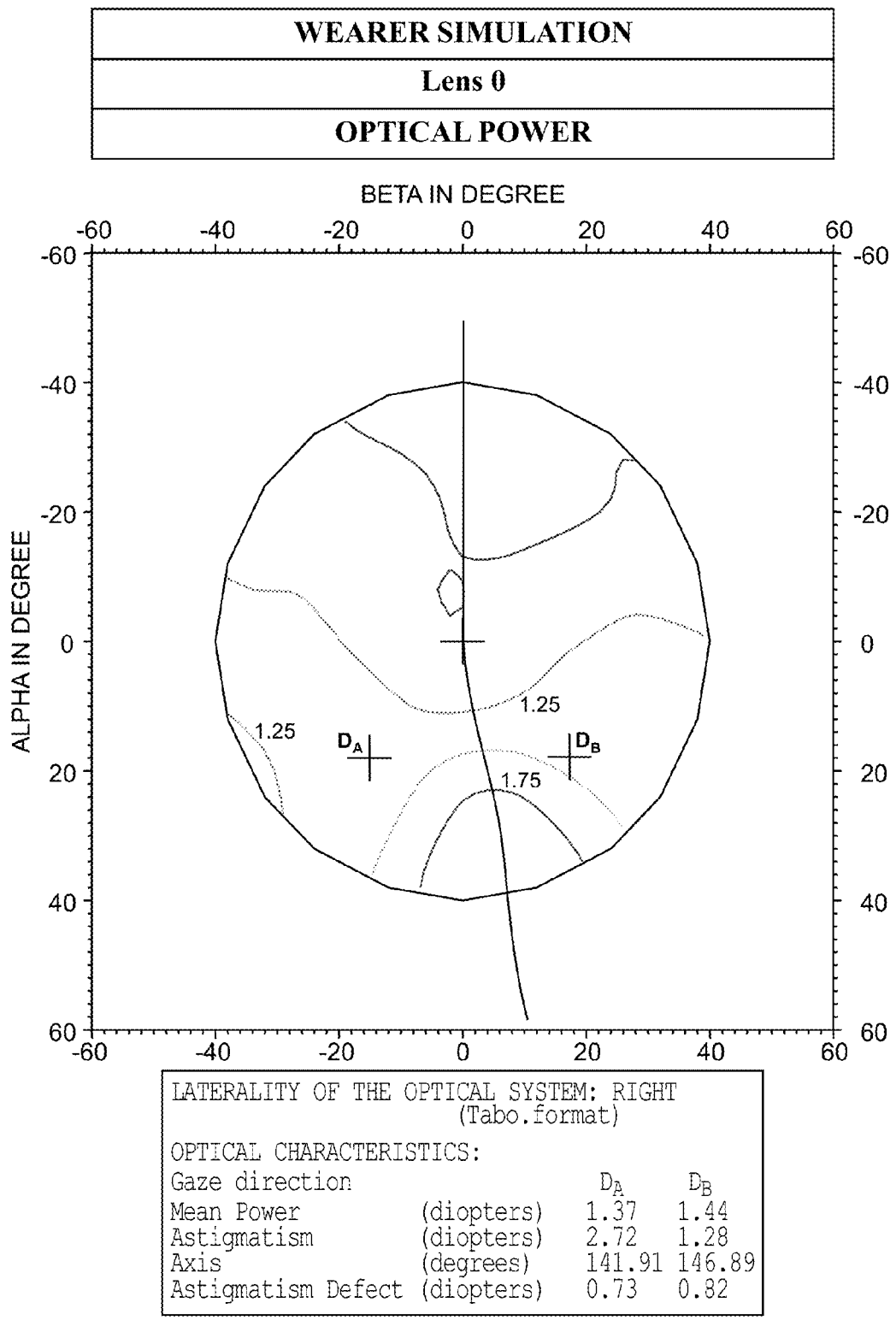
Figure 31:
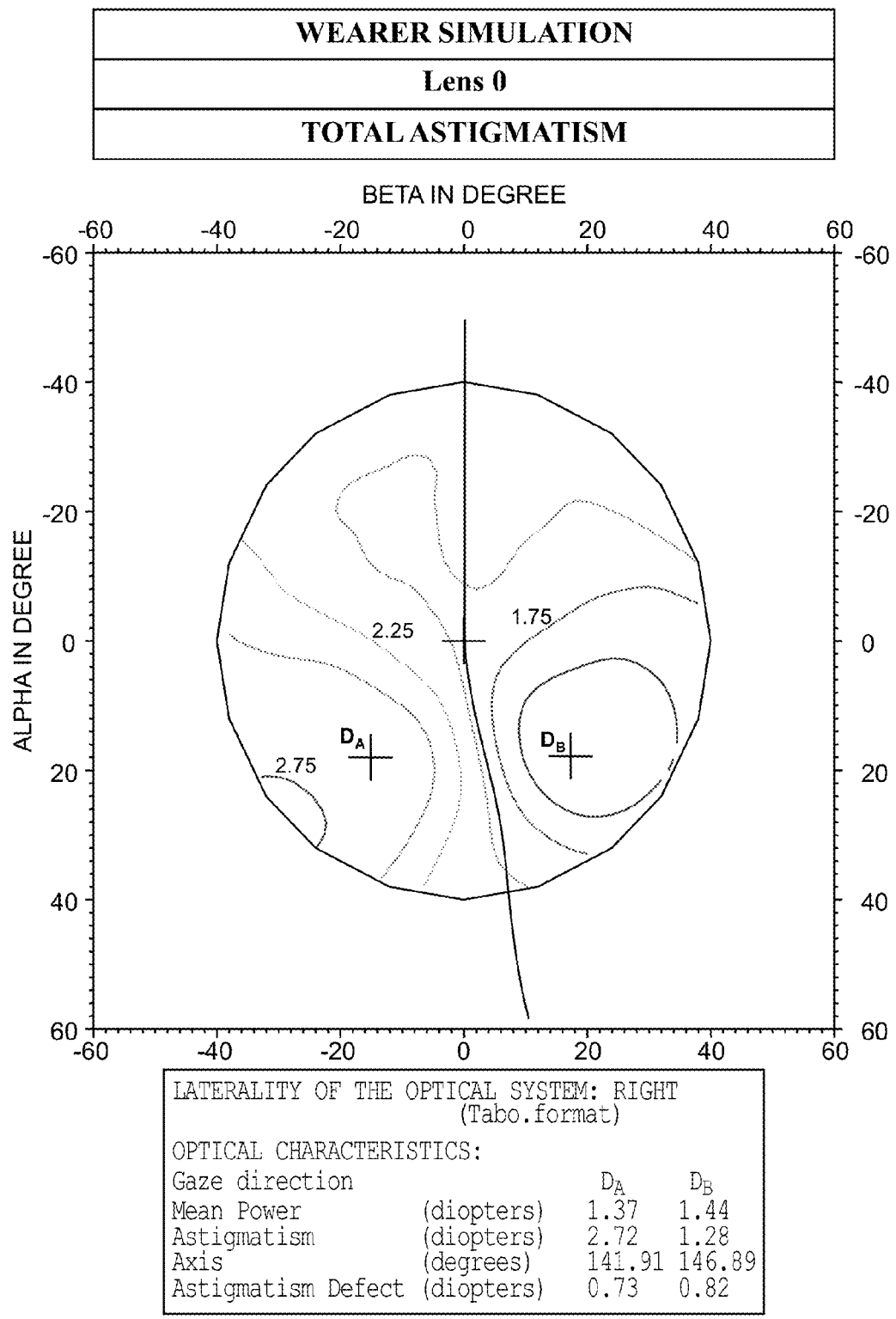

FIGS. 30 and 31 give optical analyses of the performance of the LENS0. For the sake of comparison, two specific directions $D_A$ and $D_B$ are considered. $D_A$ and $D_B$ intersect the front surface of LENS0 at points A and B.

For direction $D_A$, mean power is 1.37 δ, astigmatism is 2.72 δ, axis of the defect astigmatism $\gamma_A$ is 142° and astigmatism defect is 0.73 δ. In addition, the distortion in this direction $D_A$ may be indicated by the value of $G(\gamma_A+90°)-G(\gamma_A)$ which amounts to 0.07396544. The corresponding value of $G(\gamma_A+90°)*G(\gamma_A)$ is 1.08283716.

For direction $D_B$, mean power is 1.44 δ, astigmatism is 1.28 δ, axis of the defect astigmatism $\gamma_B$ is 147° and astigmatism defect is 0.82 δ. The distortion in this direction $D_B$ may be indicated by the value of $G(\gamma_B+90°)-G(\gamma_B)$ which amounts to 0.03403641. The corresponding value of $G(\gamma_B+90°)*G(\gamma_B)$ is 1.08561437.

Further to this local analysis for two gaze directions of the performance of LENS0, a global analysis may also be carried out. Portion1 in the temporal area may be delimited by ray directions of 0°<alpha<50° and −50°<beta<−10° and such that resulting astigmatism in the portion considered is more than 0.50 diopters. Portion2 in the nasal area may be delimited by ray directions of 0°<alpha<50° and 50°>beta>10° and such that resulting astigmatism in the portion considered is more than 0.50 diopters.

The same evaluation can be done in peripheral vision. $D_A$ and $D_B$ are thus the peripheral ray directions intersecting the front surface of LENS0 at points A and B.

These different characterizations will enable a comparison with LENS1 and LENS2 whose characteristics are developed in examples 1 and 2.

Example 1

This example is a lens according to the invention made for the same prescription of the one of LENS0. Then, for this prescription, reference axes determined at step 16 of the method are $\Gamma_1=140°$ in Portion 1 (Temporal_Area) and $\Gamma_2=145°$ in Portion2 (Nasal Area), Portion 1 and Portion 2 of the front surface being determined from optical Portion1 and Portion 2 defined in the example 0.

FIGS. 32 and 33 are the surface characteristics of the front surface of LENS1 obtained at step 18 when $\Gamma=145°$ is determined as the combined reference axis. For point A, the maximum sphere $SPH_{max\_A}$ is equal to 5.12 δ, the minimum sphere $SPH_{min\_A}$ is equal to 2.54 δ and the cylinder axis $\gamma_{AX\_A}=144°$. For point B, the maximum sphere $SPH_{max\_B}$ is equal to 4.95 δ, the minimum sphere $SPH_{min\_B}$ is equal to 2.48 δ and the cylinder axis $\gamma_{AX\_B}=146°$.

Figure 34:
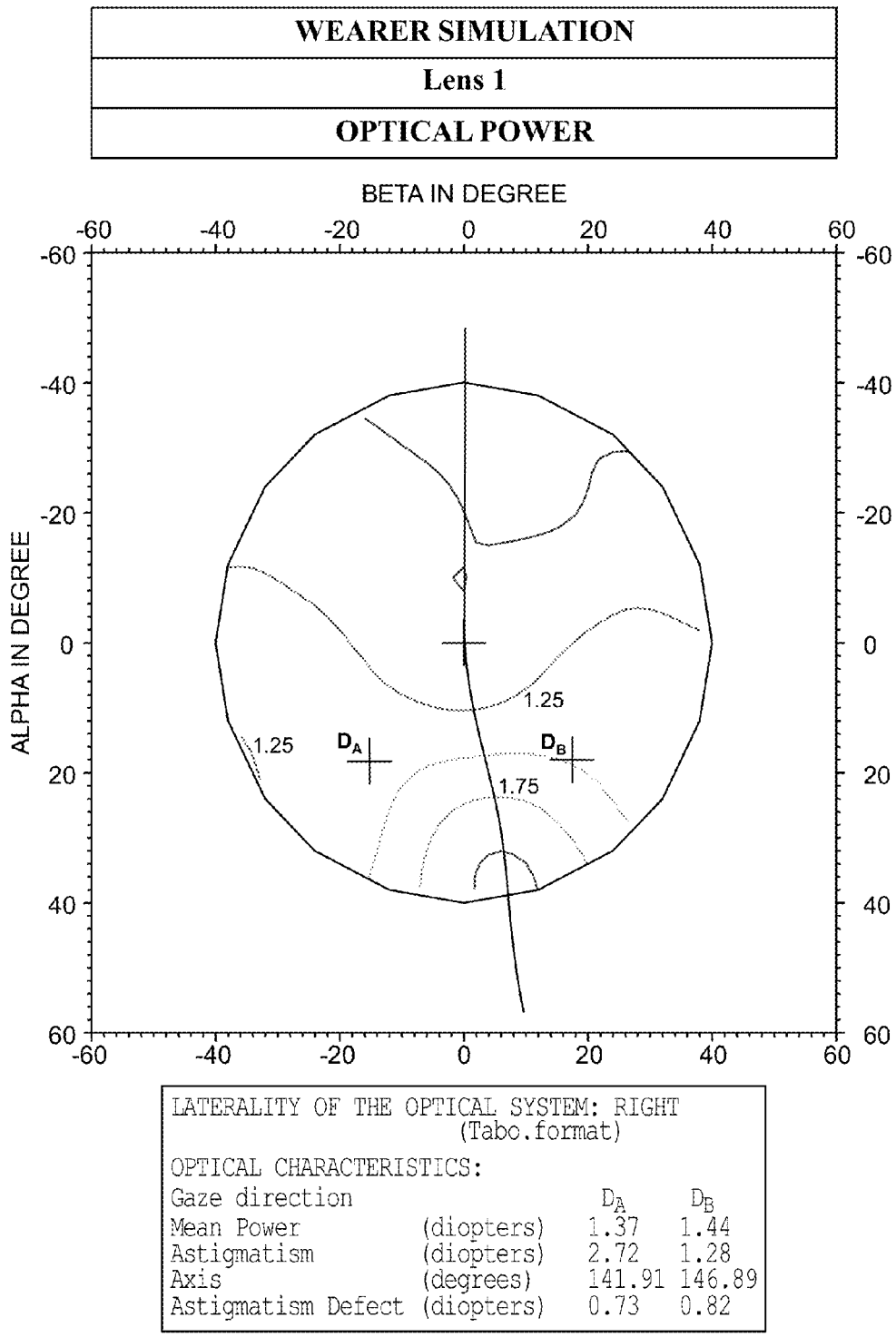
Figure 35:
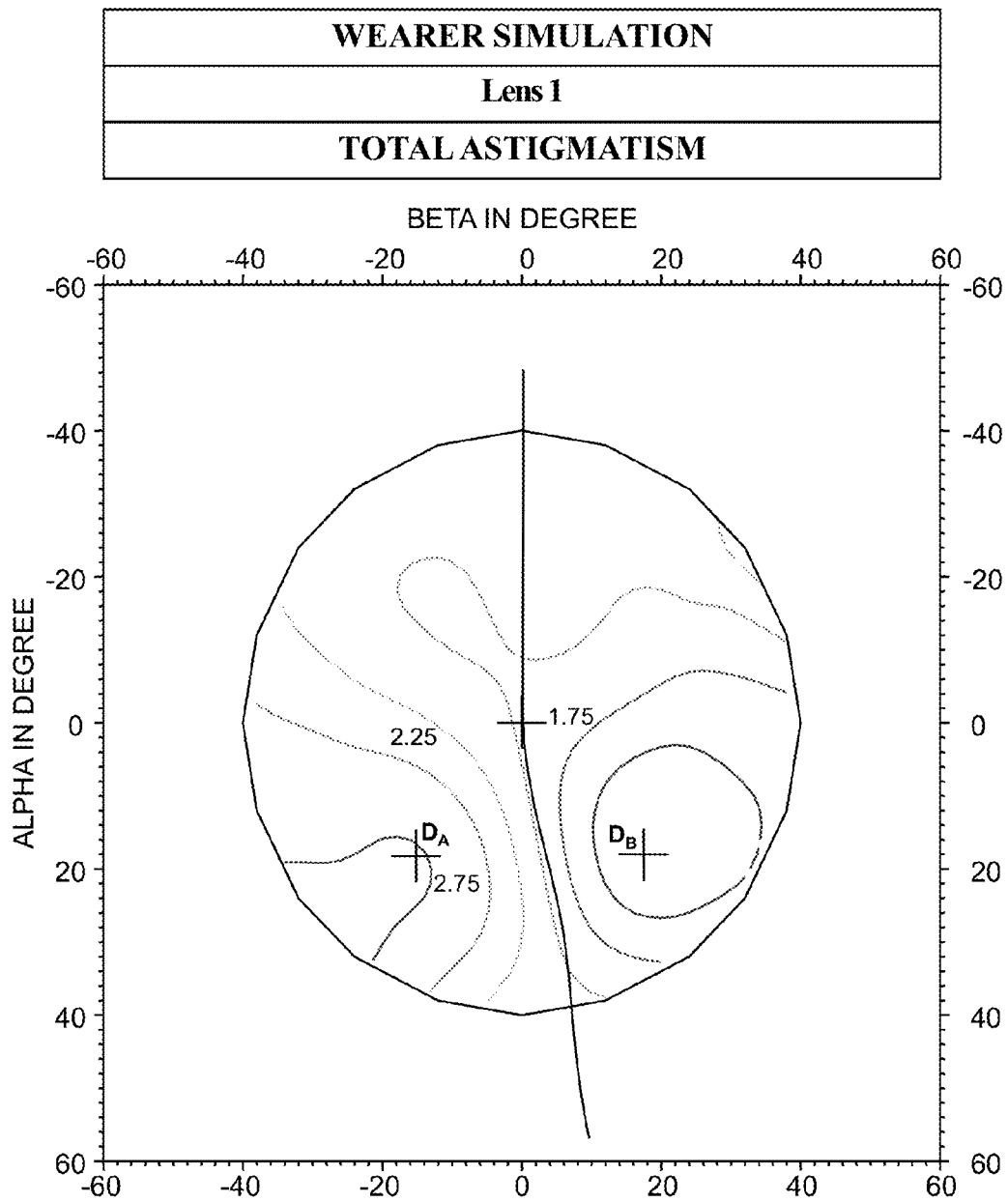

FIGS. 34 and 35 give optical analyses of the performance of the LENS1. For the sake of comparison, the two specific directions $D_A$ and $D_B$ previously defined are considered.

For direction $D_A$, mean power is 1.37 δ, astigmatism is 2.72 δ, axis of the defect astigmatism $\gamma_A$ is 142° and astigmatism defect is 0.73 δ. For direction $D_B$, mean power is 1.44 δ, astigmatism is 1.28 δ, axis of the defect astigmatism $\gamma_B$ is 147° and astigmatism defect is 0.82 δ. This means that the optical performances of LENS1 in $D_A$ and $D_B$ are substantially the same as the optical performances of LENS0 regarding power and astigmatism values in central vision.

The distortion in this direction $D_A$ may be indicated by the value of $G(\gamma_A+90°)-G(\gamma_A)$ which amounts to 0.07097944. Compared to the value of LENS0, there is a reduction of 4.04%. Corresponding value of $G(\gamma_A+90°)*G(\gamma_A)$ is 1.08045844. Compared to the value of LENS0, there is a reduction of 0.22%.

The distortion in this direction $D_B$ may be indicated by the value of $G(\gamma_B+90°)-G(\gamma_B)$ which amounts to 0.03238737. Compared to the value of LENS0, there is a reduction of 4.84%. The corresponding value of $G(\gamma_B+90°)*G(\gamma_B)$ is 1.08312921. Compared to the value of LENS0, there is a reduction of 0.23%.

Example 2

FIG. 36 is the surface characteristics of the front surface of LENS2 which is a toric surface also obtained at step 18 when $\Gamma=145°$ is determined as the combined reference axis. The maximum sphere, the minimum sphere and the axis values are constant over the surface. For all points and particularly for points A and B, the maximum sphere $SPH_{max}$ is equal to 5.0 δ, the minimum sphere $SPH_{min}$ is equal to 2.50 δ and the cylinder axis $\gamma_{AX}=145°$.

Figure 37:
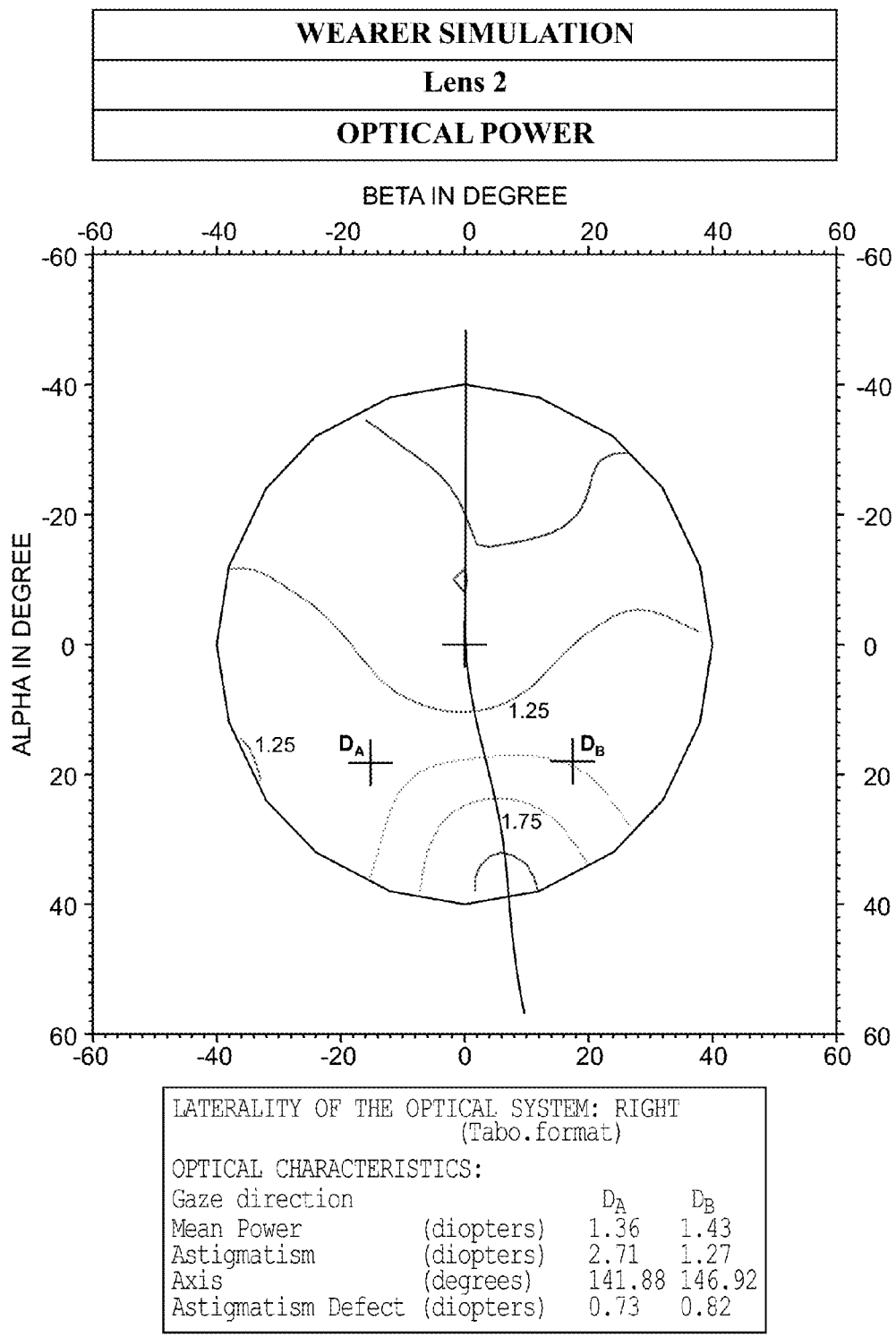
Figure 38:
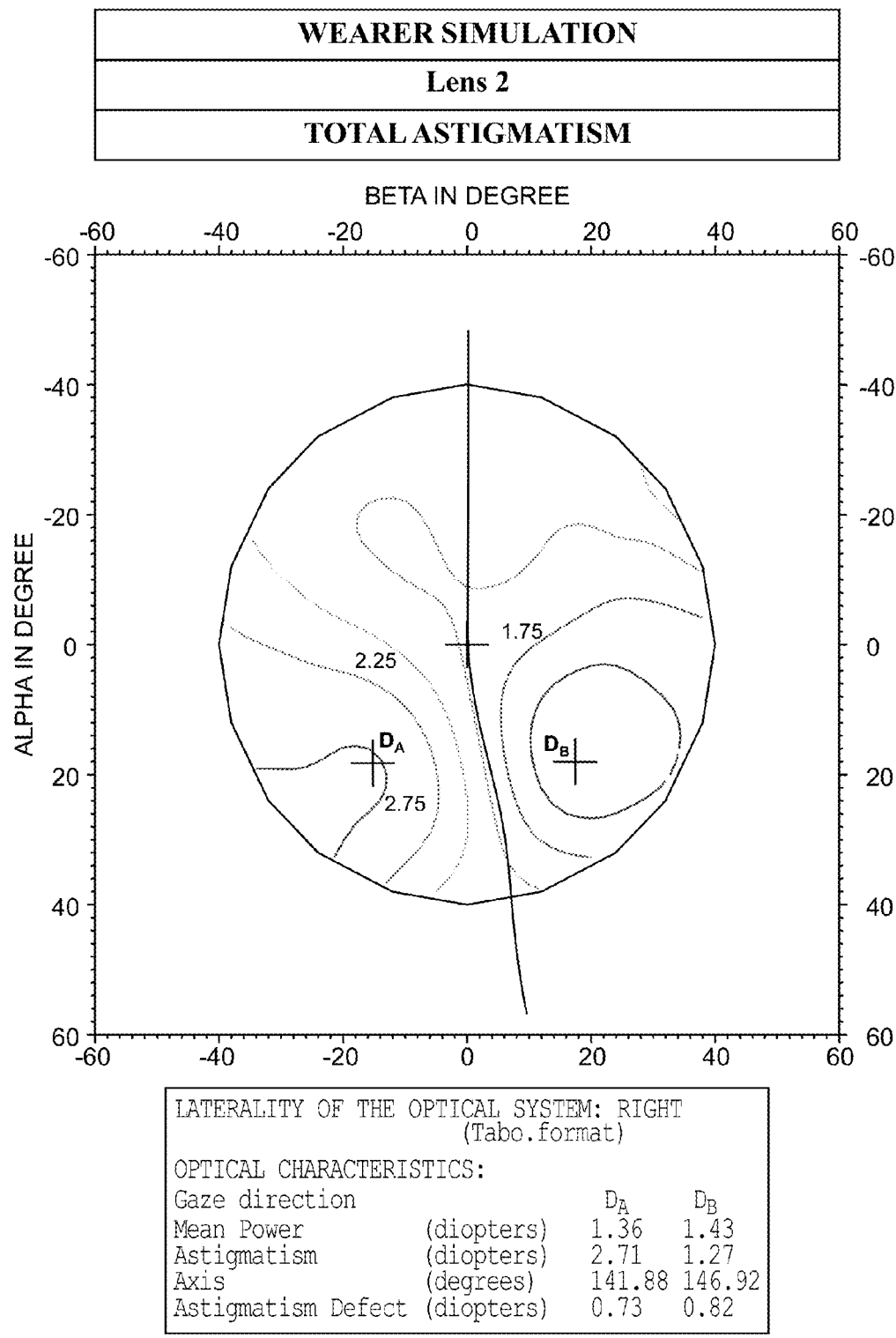

FIGS. 37 and 38 give optical analyses of the performance of the LENS2. For the sake of comparison, the two specific directions $D_A$ and $D_B$ previously defined are considered.

For direction $D_A$, mean power is 1.36 δ, astigmatism is 2.71 δ, axis of the defect astigmatism $\gamma_A$ is 142° and astigmatism defect is 0.73 δ. For direction $D_B$, mean power is 1.43 δ, astigmatism is 1.27 δ, axis of the defect astigmatism $\gamma_B$ is 147° and astigmatism defect is 0.82 δ. This means that the optical performances of LENS2 in $D_A$ and $D_B$ are substantially the same as the optical performances of LENS0 regarding power and astigmatism values in central vision.

The distortion in this direction $D_A$ may be indicated by the value of $G(\gamma_A+90°)-G(\gamma_A)$ which amounts to 0.07105139. Compared to the value of LENS0, there is a reduction of 3.94%. Corresponding value of $G(\gamma_A+90°)*G(\gamma_A)$ is 1.08031271. Compared to the value of LENS0, there is a reduction of 0.23%.

The distortion in this direction $D_B$ may be indicated by the value of $G(\gamma_B+90°)-G(\gamma_B)$ which amounts to 0.03236598. Compared to the value of LENS0, there is a reduction of 4.91%. The corresponding value of $G(\gamma_B+90°)*G(\gamma_B)$ is 1.08319312. Compared to the value of LENS0, there is a reduction of 0.22%.

LENS2 with a toric front surface provides about the same result in term of the reduction in distortion as LENS1.

Example 3

Prior Art

Example 3 corresponds to a lens LENS3 according to prior art. In this case, the power prescription is 0.0 δ and the addition is 2.5 δ. For this example 3, the astigmatism prescribed for the wearer is 2.00 δ, with an axis of 45°.

FIGS. 39, 40 and 41 are the surface characteristics of the front surface of LENS3. For the sake of comparison, the same points A and B are considered. For point A, the maximum sphere $SPH_{max\_A}$ is equal to 6.90 δ, the minimum sphere $SPH_{min\_A}$ is equal to 4.80 δ and the cylinder axis $\gamma_{AX\_A}=64°$. For point B, the maximum sphere $SPH_{max\_B}$ is equal to 6.90 δ, the minimum sphere $SPH_{min\_B}$ is equal to 4.65 δ and the cylinder axis $\gamma_{AX\_B}=126°$.

Figure 42:
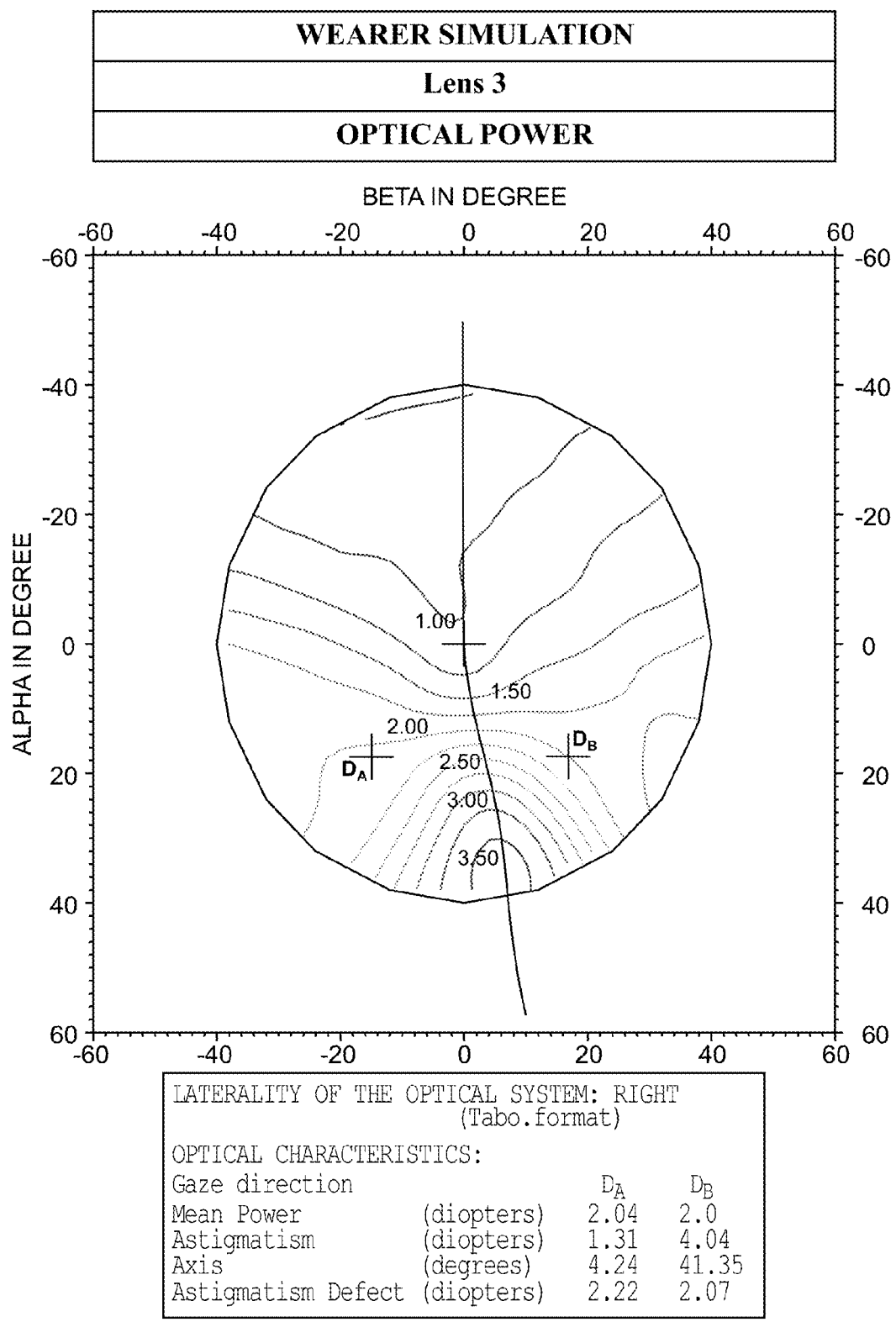
Figure 44:
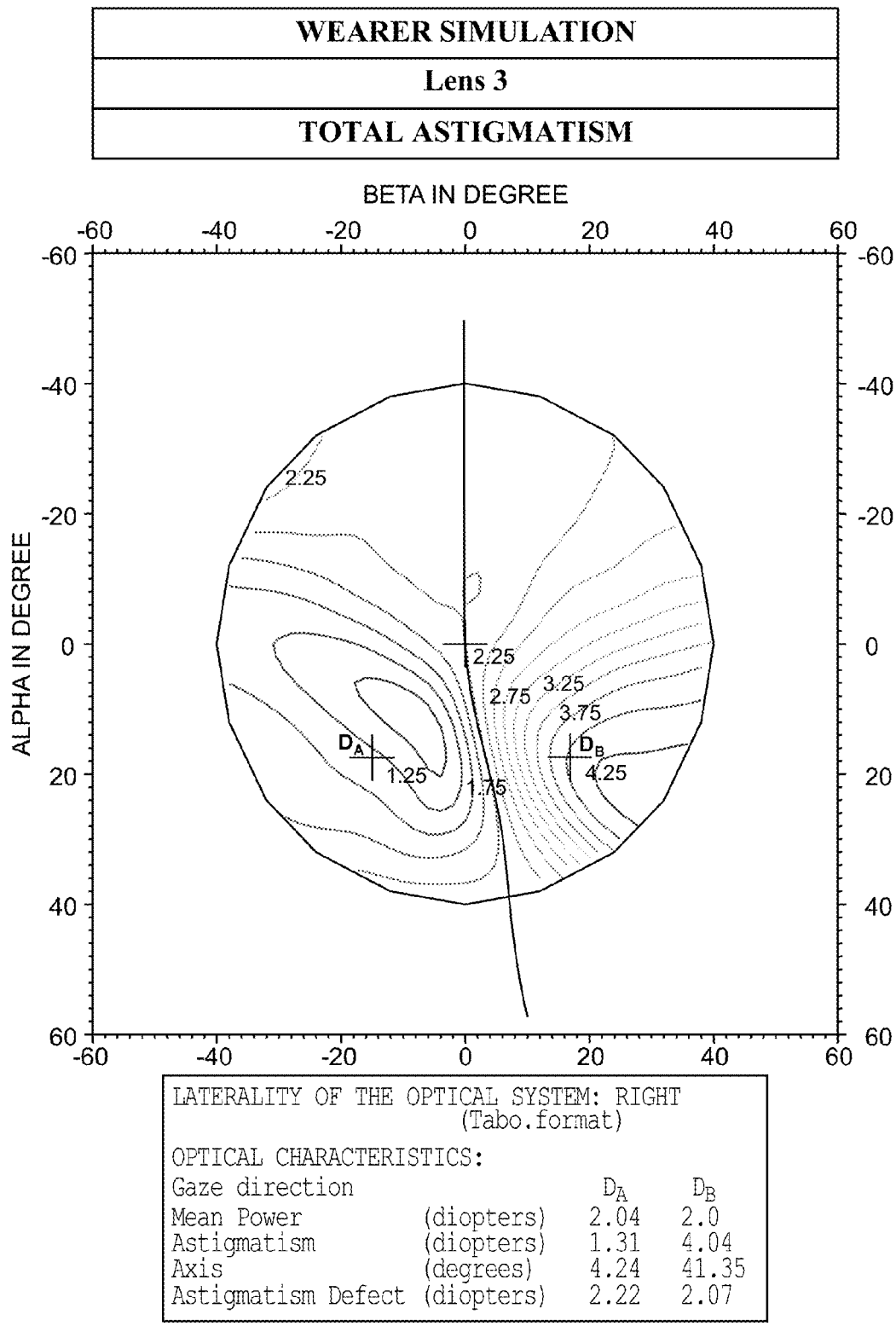

FIGS. 42, 43 and 44 give optical analyses of the performances of the LENS3. For the sake of comparison, the same directions $D_A$ and $D_B$ of example 1 are considered.

FIGS. 43, 44 and 45 give optical analyses of the performances of the LENS3. For the sake of comparison, the same directions $D_A$ and $D_B$ of example 1 are considered.

For direction $D_A$, mean power is 2.04 δ, astigmatism is 1.31 δ, axis of the defect astigmatism $\gamma_A$ is 4° and astigmatism defect is 2.22 δ. In addition, the distortion in this direction $D_A$ may be indicated by the value of $G(\gamma_A+90°)-G(\gamma_A)$ which amounts to 0.03749373. The corresponding value of $G(\gamma_A+90°)*G(\gamma_A)$ is 1.12169529.

For direction $D_B$, mean power is 2.00 δ, astigmatism is 4.04 δ, axis of the defect astigmatism $\gamma_B$ is 41° and astigmatism defect is 2.07 δ. In addition, the distortion in this direction $D_B$ may be indicated by the value of $G(\gamma_B+90°)-G(\gamma_B)$ which amounts to 0.11475916. The corresponding value of $G(\gamma_N+90°)*G(\gamma_N)$ is 1.1220315.

These different characterizations will enable a comparison with LENS4, LENS5 and LENS6 whose characteristics are developed in examples 4, 5 and 6. These 3 examples are lenses according to the invention made for the same prescription of the one of LENS3. Thus, for this prescription, reference axes determined at step 16 of the method are $\Gamma_1=5°$ in Portion 1 (Temporal_Area) and $\Gamma_2=40°$ in Portion2 (Nasal Area), Portion 1 and Portion 2 of the front surface being determined from optical Portion1 and Portion 2 defined in the example 0.

The first step of the method (step 10 in FIG. 18) is to define a target optical function. The predetermined target optical function is the same for LENS3 to LENS6.

Example 4

FIG. 45 is the surface characteristics of the front surface of LENS4 which is a toric surface. For all points and particularly for points A and B, the maximum sphere $SPH_{max}$ is equal to 4.80 δ, the minimum sphere $SPH_{min}$ is equal to 2.80 δ and the cylinder axis $\gamma_{AX}=22.5°$. This surface is obtained when the combined reference axis $\Gamma=\frac{1}{2}*\Gamma_1+\frac{1}{2}*\Gamma_2=22.5°$ is determined at step 18.

Figure 46:
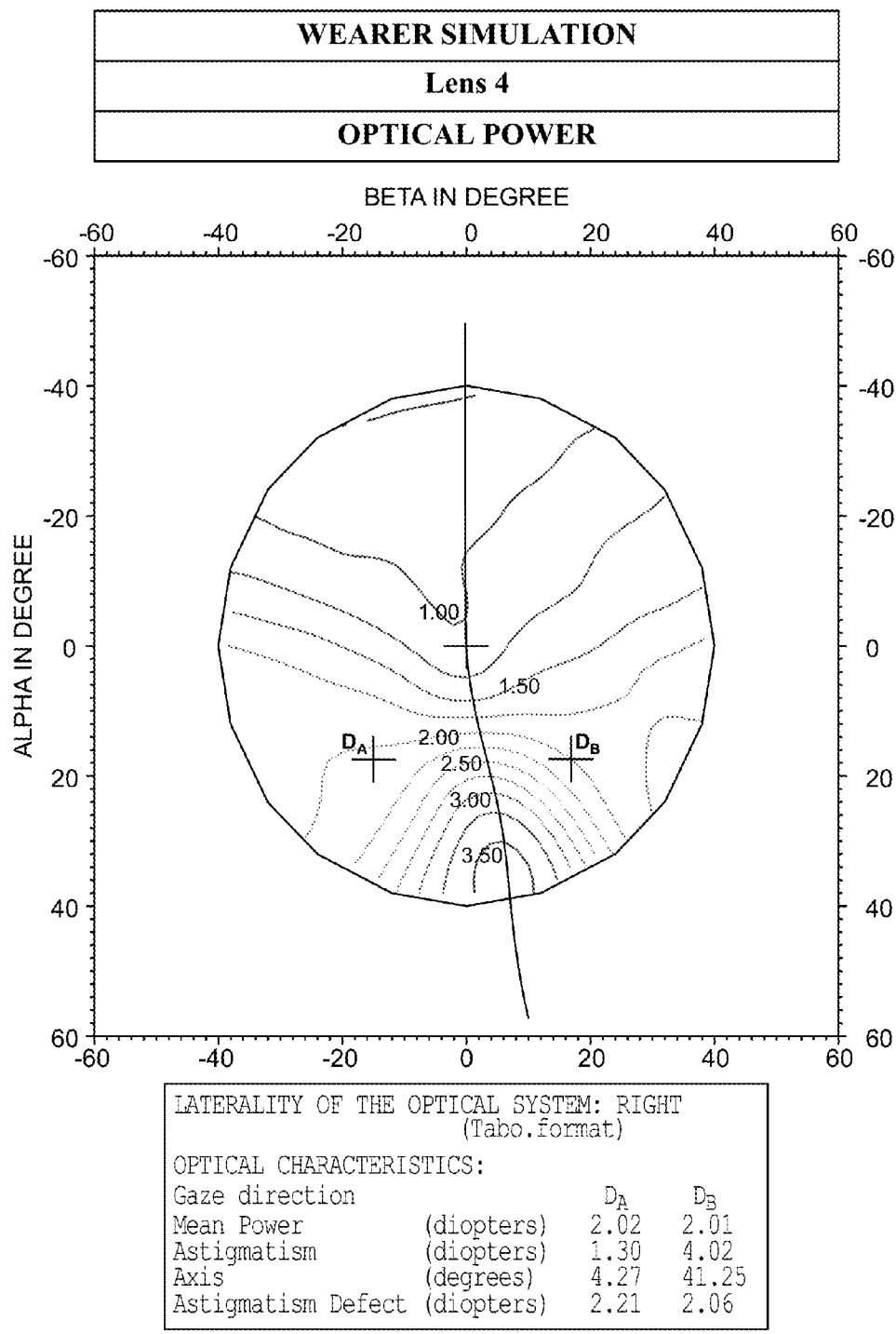
Figure 48:
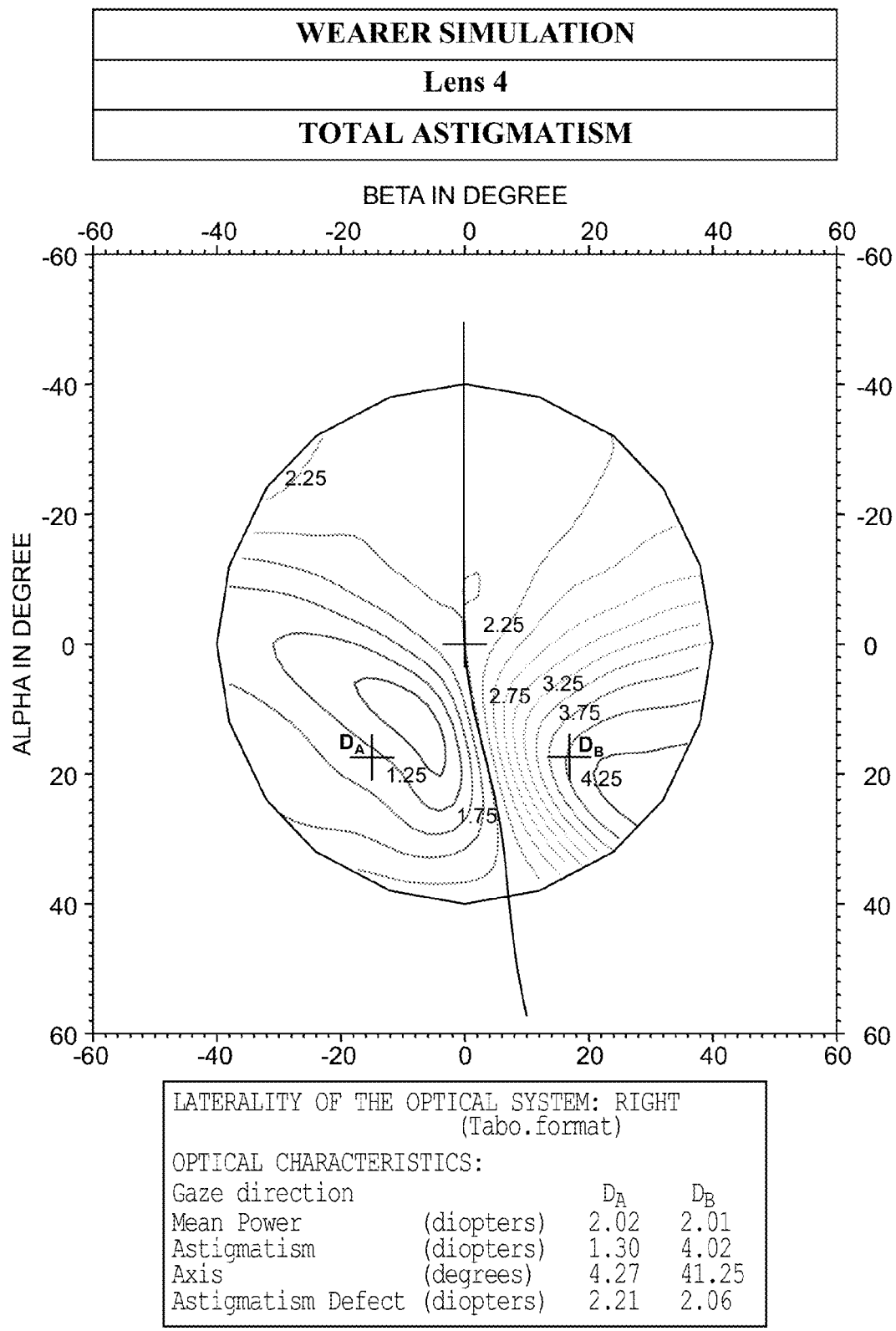

FIGS. 46, 47 and 48 give optical analyses of the performance of the LENS4. For the sake of comparison, the two specific directions $D_A$ and $D_B$ previously defined are considered.

For direction $D_A$, mean power is 2.02 δ, astigmatism is 1.30 δ, axis of the defect astigmatism $\gamma_A$ is 4° and astigmatism defect is 2.21 δ. For direction $D_B$, mean power is 2.01 δ, astigmatism is 4.02 δ, axis of the defect astigmatism $\gamma_B$ is 41° and astigmatism defect is 2.06 δ.

The distortion in this direction $D_A$ may be indicated by the value of $G(\gamma_A+90°)-G(\gamma_A)$ which amounts to 0.03506889. Compared to the value of LENS3, there is a reduction of 6.47%. Corresponding value of $G(\gamma_A+90°)*G(\gamma_A)$ is 1.11782421. Compared to the value of LENS3, there is a reduction of 0.35%.

The distortion in this direction $D_B$ may be indicated by the value of $G(\gamma_B+90°)-G(\gamma_B)$ which amounts to 0.11116272. Compared to the value of LENS3, there is a reduction of 3.13%. The corresponding value of $G(\gamma_B+90°)*G(\gamma_B)$ is 1.11830007. Compared to the value of LENS3, there is a reduction of 0.33%.

LENS2 with a toric front surface which axis orientation is defined by the mean value of $\Gamma_1$ and $\Gamma_2$ provides good result in term of the reduction in distortion. It can be noticed that the reduction in distortion is higher for the temporal side. This is due to the fact that total astigmatism is lower for temporal side. To reduce distortion in nasal side in the same proportion of the temporal one, it would be necessary to define a higher local torus in portion 2 of the front surface (means Sphmax−Sphmin higher).

Example 5

The surface of LENS5 is obtained when the combined reference axis determined at step 18 is $\Gamma=\Gamma_1=4°$.

The surface characteristics of the front surface of LENS5 is the same in term of Spheres values of the front surface of LENS4 but the orientation of the Torus $\gamma_{AX}$ is different. For all points and particularly for points A and B, the maximum sphere $SPH_{max}$ is equal to 4.80 δ, the minimum sphere $SPH_{min}$ is equal to 2.80 δ and the cylinder axis $\gamma_{AX\_}=4°$.

The optical performances of the LENS5 are the same as LENS4. For the sake of comparison, the two specific directions $D_A$ and $D_B$ previously defined are considered.

For direction $D_A$, mean power is 2.02 δ, astigmatism is 1.30 δ, axis of the defect astigmatism $\gamma_A$ is 4° and astigmatism defect is 2.21 δ. For direction $D_B$, mean power is 2.01 δ, astigmatism is 4.02 δ, axis of the defect astigmatism $\gamma_B$ is 41° and astigmatism defect is 2.06 δ.

The distortion in this direction $D_A$ may be indicated by the value of $G(\gamma_A+90°)-G(\gamma_A)$ which amounts to 0.03471011. Compared to the value of LENS3, there is a reduction of 7.42%. Corresponding value of $G(\gamma_A+90°)*G(\gamma_A)$ is 1.11782449. Compared to the value of LENS3, there is a reduction of 0.35%.

The distortion in this direction $D_B$ may be indicated by the value of $G(\gamma_B+90°)-G(\gamma_B)$ which amounts to 0.11209594. Compared to the value of LENS3, there is a reduction of 2.32%. The corresponding value of $G(\gamma_B+90°)*G(\gamma_B)$ is 1.11829962. Compared to the value of LENS3, there is a reduction of 0.33%.

LENS5 with a toric front surface which cylinder axis $\gamma_{AX}$ orientation is defined as almost equal to the first reference axis $\Gamma_1=4°$ (about equal to $\gamma_A$) provides good result in term of the reduction in distortion, particularly in the temporal side.

Example 6

The surface of LENS6 is obtained when the combined reference axis determined at step 18 is $\Gamma=\Gamma_2=41°$.

The surface characteristics of the front surface of LENS6 is the same in term of Spheres values of the front surface of LENS4 but the orientation of the Torus $\gamma_{AX}$ is different. For all points and particularly for points A and B, the maximum sphere $SPH_{max}$ is equal to 4.80 δ, the minimum sphere $SPH_{min}$ is equal to 2.80 δ and the cylinder axis $\gamma_{AX}=41°$.

The optical performances of the LENS6 are the same as LENS4. For the sake of comparison, the two specific directions $D_A$ and $D_B$ previously defined are considered.

For direction $D_A$, mean power is 2.02 δ, astigmatism is 1.30 δ, axis of the defect astigmatism $\gamma_A$ is 4° and astigmatism defect is 2.21 δ. For direction $D_B$, mean power is 2.01 δ, astigmatism is 4.02 δ, axis of the defect astigmatism $\gamma_B$ is 41° and astigmatism defect is 2.06 δ.

The distortion in this direction $D_A$ may be indicated by the value of $G(\gamma_A+90°)-G(\gamma_A)$ which amounts to 0.03600076. Compared to the value of LENS3, there is a reduction of 3.98%. Corresponding value of $G(\gamma_A+90°)*G(\gamma_A)$ is 1.11782376. Compared to the value of LENS3, there is a reduction of 0.35%.

The distortion in this direction $D_B$ may be indicated by the value of $G(\gamma_B+90°)-G(\gamma_B)$ which amounts to 0.11080343. Compared to the value of LENS3, there is a reduction of 3.45%. The corresponding value of $G(\gamma_B+90°)*G(\gamma_B)$ is 1.11830035. Compared to the value of LENS3, there is a reduction of 0.33%.

LENS6 with a toric front surface which cylinder axis $\gamma_{AX}$ orientation is defined as almost equal to the first reference axis $\Gamma_2=41°$ (about equal to $\gamma_B$) provides good result in term of the reduction in distortion, particularly in the nasal side. But the improvement would be higher if the value of the cylinder of the Torus $(Sph_{max}-Sph_{min})$ was higher (due to the fact that the value of the total astigmatism is high on the nasal side).

The invention claimed is:

1. A method for manufacturing a progressive ophthalmic lens, the lens comprising a main meridian separating the lens in a nasal area (Area_nasal) and a temporal area (Area_temporal), comprising:
    providing data relative to the eyes of a wearer;
    transmitting the data relative to the wearer;
    determining a front surface of a lens according to a determining method comprising the steps of:
        choosing a target optical function suited to a wearer, the target optical function defining, for each gaze direction when the lens is worn, a refractive power (Pα,β), a module of astigmatism (Astα, β) and an axis of astigmatism (γα,β), each gaze direction corresponding to a lowering angle (α) and to an azimuth angle (β);
        defining a front surface of the lens and a rear surface of the lens, each surface having in each point a mean sphere value (SPHmean), a cylinder value (CYL) and a cylinder axis $(\gamma_{AX})$;
        defining at least one first surface portion (Portion1) of the front surface in the temporal area (Area_temporal) and at least one second surface portion (Portion2) of the front surface in the nasal area (Area_nasal);
        for the first and second surface portions of the front surface (Portion1, Portion2), determining respectively a first or a second reference axes ($\Gamma_1$, $\Gamma_2$), the first reference axis ($\Gamma_1$) being set to a value comprised between [$\gamma_T-20°$, $\gamma_T+20°$] with $\gamma_T$ being a mean axis of astigmatism of the target optical function for gaze directions intersecting the front surface over the first temporal surface portion (Portion1), and the second reference axis ($\Gamma_2$) being set to a value comprised between [$\gamma_N-20°$, $\gamma_N+20°$] with $\gamma_N$ being a mean axis of astigmatism of the target optical function for gaze directions intersecting the front surface over the second nasal surface portion (Portion2);
        determining a combined reference axis (Γ) as a linear combination of the first and second reference axes: $\Gamma=\alpha_1*\Gamma_1+\alpha_2*\Gamma_2$, where $\alpha_1$ and $\alpha_2$ are weights, wherein weights $\alpha_1$ and $\alpha_2$ are between 0 and 1, and $\alpha_1+\alpha_2=1$; and
        modifying the front surface so that:
            over the first surface portion (Portion1), a sphere value (SPH(Γ)) along the combined reference axis is greater than a sphere value (SPH(⊥Γ)) along an axis perpendicular to the combined reference axis (SPH(Γ)>SPH(⊥Γ)); and
            over the second surface portion (Portion2), a sphere value (SPH(Γ)) along the combined reference axis is greater than a sphere value (SPH(⊥Γ)) along an axis perpendicular to the combined reference axis (SPH(Γ)>SPH(⊥Γ));
        wherein the first surface portion (Portion1) in the temporal area is delimited by a gaze direction with a lowering angle (α) between 0° and 50° and an azimuth angle (β) between −50° and −10° and such that a resulting astigmatism in the first surface portion (Portion1) is more than 0.50 diopters, and
        wherein the second surface portion (Portion2) in the nasal area is delimited by a gaze direction with a lowering angle (α) between 0° and 50° and an azimuth angle (β) between 10° and 50° and such that a resulting astigmatism in the second surface portion (Portion2) is more than 0.50 diopters;
    transmitting data relative to the front surface;
    carrying out an optical optimization of the lens based on the transmitted data relative to the front surface;
    transmitting the result of the optical optimization; and
    manufacturing the progressive ophthalmic lens according to the result of the optical optimization.

2. The method according to claim 1, wherein the combined reference axis (Γ) is determined by applying equal weights to the first and the second reference axes ($\alpha_1=\alpha_2=\frac{1}{2}$).

3. The method according to claim 1, wherein the combined reference axis (Γ) is determined by applying total weight to the first reference axis ($\alpha_1=1$; $\alpha_2=0$).

4. The method according to claim 1, wherein the combined reference axis (Γ) is determined by applying total weight to the second reference axis ($\alpha_1=0$; $\alpha_2=1$).

5. The method according to claim 1, wherein the front surface is modified so that the front surface is a toric surface with a cylinder axis ($\gamma_{AX}$) in each point set to the combined reference axis (Γ).

6. The method according to claim 1, wherein the mean axis of astigmatism ($\gamma_T$, $\gamma_N$) of the target optical function is the mean axis of prescribed astigmatism or the mean axis of total astigmatism or the mean axis of residual astigmatism for gaze directions intersecting the front surface over the portion considered.

7. The method according to claim 1, wherein the first reference axis ($\Gamma_1$) is set to the mean axis of astigmatism ($\gamma_T$) over the first temporal surface portion (Portion1) and wherein the second reference axis ($\Gamma_2$) is set to the mean axis of astigmatism ($\gamma_N$) over the second nasal surface portion (Portion2).

8. A non-transitory computer program product comprising one or more stored sequence of instruction that is accessible to a processor and which, when executed by the processor, causes the processor to carry out the steps of claim 1.

9. An ophthalmic lens having, when being worn and for each gaze direction, a refractive power (P$\alpha,\beta$), a module of astigmatism (Ast$\alpha,\beta$) and an axis of astigmatism ($\gamma\alpha,\beta$), each gaze direction corresponding to a lowering angle ($\alpha$) and to an azimuth angle ($\beta$),
the lens comprising a front surface and a rear surface, each surface having in each point a mean sphere value (SPHmean), a cylinder value (CYL) and a cylinder axis ($\gamma_{AX}$), the cylinder axis being the axis of the maximum sphere,
the lens comprising a main meridian separating the lens in a nasal area (Area_nasal) and a temporal area (Area_temporal),
wherein the front surface has:
in at least one first surface portion of the front surface of the temporal area (Portion1), a cylinder axis ($\gamma_{AX\_T}$) being comprised between [$\gamma-20°$, $\gamma+20°$]; and
in at least one second surface portion of the front surface of the nasal area (Portion2), a cylinder axis ($\gamma_{AX\_N}$) being comprised between [$\gamma-20°$, $\gamma+20°$], with $\gamma$ being a weighted average value of axis of astigmatism: $\gamma=\alpha_1*\gamma_T+\alpha_2*\gamma_N$, where $\alpha_1$ and $\alpha_2$ are weights, wherein weights $\alpha_1$ and $\alpha_2$ are between 0 and 1, and $\alpha_1+\alpha_2=1$, and where $\gamma_T$ is the mean axis of astigmatism of the lens defining a direction of smallest optical power over the first surface portion of the temporal area and $\gamma_N$ is the mean axis of astigmatism of the lens defining a direction of smallest optical power over the second surface portion of the nasal area;
wherein the first surface portion (Portion1) in the temporal area is delimited by a gaze direction with a lowering angle ($\alpha$) between 0° and 50° and an azimuth angle ($\beta$) between −50° and −10° and such that a resulting astigmatism in the first surface portion (Portion1) is more than 0.50 diopters, and
wherein the second surface portion (Portion2) in the nasal area is delimited by a gaze direction with a lowering angle ($\alpha$) between 0° and 50° and an azimuth angle ($\beta$) between 10° and 50° and such that a resulting astigmatism in the second surface portion (Portion2) is more than 0.50 diopters.

10. The ophthalmic lens according to claim 9, wherein the weighted average value of axis of astigmatism ($\gamma$) is equal to a medium value of the mean axis of astigmatism of the lens over the first surface portion of the temporal area and of the mean axis of astigmatism of the lens over the second surface portion of the nasal area ($\gamma=\frac{1}{2}*\gamma_T+\frac{1}{2}*\gamma_N$).

11. The ophthalmic lens according to claim 9, wherein the weighted average value of axis of astigmatism ($\gamma$) is equal to the mean axis of astigmatism of the lens over the second surface portion of the nasal area ($\gamma=\gamma_N$).

12. The ophthalmic lens according to claim 9, wherein the weighted average value of axis of astigmatism ($\gamma$) is equal to the mean axis of astigmatism of the lens over the first surface portion of the temporal area ($\gamma=\gamma_T$).

13. The ophthalmic lens according to claim 9, wherein mean axis of astigmatism ($\gamma_T$, $\gamma_N$) is the axis of prescribed astigmatism or is the mean axis of residual astigmatism of the lens in the surface portions considered or is the mean axis of total astigmatism of the lens in the surface portions considered, the total astigmatism being the combination between the residual astigmatism and the prescribed astigmatism.

14. The ophthalmic lens of claim 9 being a progressive ophthalmic lens.

15. A method for manufacturing a progressive ophthalmic lens comprising the steps of:
providing eye data relative to a wearer;
choosing a target optical function based on the eye data provided for the wearer, the target optical function defining, for each gaze direction when the lens is worn, a refractive power (P$\alpha,\beta$), a module of astigmatism (Ast$\alpha,\beta$) and an axis of astigmatism ($\gamma\alpha,\beta$), each gaze direction corresponding to a lowering angle ($\alpha$) and to an azimuth angle ($\beta$);
selecting a semi-finished lens blank determined according to a determining method comprising the steps of:
defining a front surface and a second unfinished surface, the front surface having in each point a mean sphere value (SPHmean) and a cylinder value (CYL) and a cylinder axis ($\gamma_{AX}$);
choosing target optical functions suited for a given prescription set, the target optical function defining, for each gaze direction when the lens is worn, a refractive power (P$\alpha,\beta$), a module of astigmatism (Ast$\alpha,\beta$) and an axis of astigmatism ($\gamma\alpha,\beta$), each gaze direction corresponding to a lowering angle ($\alpha$) and to an azimuth angle ($\beta$);
defining a main meridian separating the front surface in a nasal area (Area_nasal) and a temporal area (Area_temporal);
defining at least one first surface portion (Portion1) in the temporal area (Area_temporal) and at least one second surface portion (Portion2) in the nasal area (Area_nasal);
for the first and second surface portions of the front surface (Portion1, Portion2), determining respectively a first or a second reference axes ($\Gamma_1$, $\Gamma_2$), the first reference axis ($\Gamma_1$) being set to a value comprised between [$\gamma_T-20°$, $\gamma_T+20°$] with $\gamma_T$ being a mean axis of astigmatism of the target optical function for gaze directions intersecting the front surface over the first temporal surface portion (Portion1), and the second reference axis ($\Gamma_2$) being set to a value comprised between [$\gamma_N-20°$, $\gamma_N+20°$] with $\gamma_N$ being a mean axis of astigmatism of the target optical function for gaze directions intersecting the front surface over the second nasal surface portion (Portion2);
determining a combined reference axis ($\Gamma$) as a linear combination of the first and second reference axes: $\Gamma=\alpha_1*\Gamma_1+\alpha_2*\Gamma_2$, where $\alpha_1$ and $\alpha_2$ are weights, wherein weights $\alpha_1$ and $\alpha_2$ are between 0 and 1, and $\alpha_1+\alpha_2=1$; and
determining the front surface so that:
over the first surface portion (Portion1), a sphere value (SPH($\Gamma$)) along the combined reference axis is greater than a sphere value (SPH($\perp\Gamma$)) along an axis perpendicular to the combined reference axis (SPH(Γ)>SPH(⊥Γ)); and over the second surface portion (Portion2), a sphere value (SPH(Γ)) along the combined reference axis is greater than a sphere value (SPH(⊥Γ)) along an axis perpendicular to the combined reference axis (SPH(Γ)>SPH(⊥Γ));

wherein the selected semi-finished lens blank has a front surface having a cylinder axis ($\gamma_{AX}$) in each point comprised between [$\gamma_{AX\ mean}-20°$, $\gamma_{AX\ mean}+20°$] with $\gamma_{AX\ mean}$ being a mean value of cylinder axis over the first and the second portions in the temporal area and in the nasal area;

wherein the first surface portion (Portion1) in the temporal area is delimited by a gaze direction with a lowering angle (α) between 0° and 50° and an azimuth angle (β) between −50° and −10° and such that a resulting astigmatism in the first surface portion (Portion1) is more than 0.50 diopters, and wherein the second surface portion (Portion2) in the nasal area is delimited by a gaze direction with a lowering angle (α) between 0° and 50° and an azimuth angle (β) between 10° and 50° and such that a resulting astigmatism in the second surface portion (Portion2) is more than 0.50 diopters;

determining a positioning of the semi-finished lens blank to align the mean value of cylinder axis of the front surface ($\gamma_{AX\ mean}$) with the combined reference axis (Γ);

calculating a second surface of the lens based on the chosen target optical function and on data relating to the front surface;

placing the semi-finished lens blank on a blocker in the determined position; and surfacing the second surface of the lens according to the result of the calculation.

16. The method according to claim 15, wherein the combined reference axis (Γ) is determined by applying equal weights to the first and the second reference axes ($\alpha_1=\alpha_2=\frac{1}{2}$).

17. The method according to claim 15, wherein the combined reference axis (Γ) is determined by applying total weight to the first reference axis ($\alpha_1=1$; $\alpha_2=0$).

18. The method according to claim 15, wherein the combined reference axis (Γ) is determined by applying total weight to the second reference axis ($\alpha_1=0$; $\alpha_2=1$).

\* \* \* \* \*